US010192228B2

(12) United States Patent
Splaine et al.

(10) Patent No.: US 10,192,228 B2
(45) Date of Patent: *Jan. 29, 2019

(54) METHODS AND APPARATUS TO DETERMINE RATINGS INFORMATION FOR ONLINE MEDIA PRESENTATIONS

(71) Applicant: The Nielsen Company (US), LLC, New York, NY (US)

(72) Inventors: Steven J. Splaine, Tampa, FL (US); Kevin K. Gaynor, Sunnyvale, CA (US); Narasimha Reddy Goli, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 15/299,628

(22) Filed: Oct. 21, 2016

(65) Prior Publication Data

US 2017/0039581 A1 Feb. 9, 2017

Related U.S. Application Data

(63) Continuation of application No. 14/025,575, filed on Sep. 12, 2013, now Pat. No. 9,519,914.
(Continued)

(51) Int. Cl.
G06Q 30/00 (2012.01)
G06Q 10/00 (2012.01)
G06Q 30/02 (2012.01)

(52) U.S. Cl.
CPC ..... *G06Q 30/0204* (2013.01); *G06Q 30/0277* (2013.01)

(58) Field of Classification Search
CPC .. H04L 1/00–69/00; H04N 1/00–21/00; G06F 1/00–21/00; G06Q 10/00–50/00
(Continued)

(56) References Cited

U.S. PATENT DOCUMENTS 5,584,050 A 12/1996 Lyons
5,594,934 A 1/1997 Lu et al.
(Continued)

FOREIGN PATENT DOCUMENTS

AU 2013205736 5/2013
CN 1898662 1/2007
(Continued)

OTHER PUBLICATIONS

State Intellectual Property Office of China, "First Notification of Office Action," issued in connection with Chinese Patent Application No. 201480001437.5, dated Apr. 1, 2017, 12 pages.
(Continued)

*Primary Examiner* — Alan S Miller
(74) *Attorney, Agent, or Firm* — Hanley, Flight & Zimmerman, LLC

(57) ABSTRACT

Methods and apparatus to determine ratings information for online media presentations are disclosed. An example method includes receiving pingback messages corresponding to presentation of media at a client device, determining a portion of the media that was presented at the client device based on the pingback messages, obtaining demographic information associated with the client device, and determining a demographic characteristic associated with the presentation of the portion of the media based on the pingback messages and the demographic information.

20 Claims, 15 Drawing Sheets

Related U.S. Application Data

(60) Provisional application No. 61/817,829, filed on Apr. 30, 2013.

(58) Field of Classification Search
USPC .................................................. 705/7.11–7.42
See application file for complete search history.

(56) References Cited

U.S. PATENT DOCUMENTS

| | | |
|---|---|---|
| 5,675,510 A | 10/1997 | Coffey et al. |
| 5,796,952 A | 8/1998 | Davis et al. |
| 5,832,520 A | 11/1998 | Miller |
| 5,848,396 A | 12/1998 | Gerace |
| 5,870,740 A | 2/1999 | Rose et al. |
| 5,948,061 A | 9/1999 | Merriman et al. |
| 6,035,339 A | 3/2000 | Agraharam et al. |
| 6,052,730 A | 4/2000 | Feliciano et al. |
| 6,055,573 A | 4/2000 | Gardenswartz et al. |
| 6,098,093 A | 8/2000 | Bayeh et al. |
| 6,102,406 A | 8/2000 | Miles et al. |
| 6,108,637 A | 8/2000 | Blumenau |
| 6,138,155 A | 10/2000 | Davis et al. |
| 6,141,694 A | 10/2000 | Gardner |
| 6,223,215 B1 | 4/2001 | Hunt et al. |
| 6,279,036 B1 | 8/2001 | Himmel et al. |
| 6,286,140 B1 | 9/2001 | Ivanyi |
| 6,415,323 B1 | 7/2002 | McCanne et al. |
| 6,434,614 B1 | 8/2002 | Blumenau |
| 6,457,010 B1 | 9/2002 | Eldering et al. |
| 6,460,079 B1 | 10/2002 | Blumenau |
| 6,529,952 B1 | 3/2003 | Blumenau |
| 6,606,657 B1 | 8/2003 | Zilberstein et al. |
| 6,658,410 B1 | 12/2003 | Sakamaki et al. |
| 6,704,787 B1 | 3/2004 | Umbreit |
| 6,714,917 B1 | 3/2004 | Eldering et al. |
| 6,839,680 B1 | 1/2005 | Liu et al. |
| 6,877,007 B1 | 4/2005 | Hentzel et al. |
| 6,993,590 B1 | 1/2006 | Gauthier et al. |
| 7,039,699 B1 | 5/2006 | Narin et al. |
| 7,092,926 B2 | 8/2006 | Cerrato |
| 7,139,723 B2 | 11/2006 | Conkwright et al. |
| 7,146,329 B2 | 12/2006 | Conkwright et al. |
| 7,150,030 B1 | 12/2006 | Eldering et al. |
| 7,152,074 B2 | 12/2006 | Dettinger et al. |
| 7,181,412 B1 | 2/2007 | Fulgoni et al. |
| 7,257,546 B2 | 8/2007 | Ebrahimi et al. |
| 7,260,837 B2 | 8/2007 | Abraham et al. |
| 7,272,617 B1 | 9/2007 | Bayer et al. |
| 7,302,447 B2 | 11/2007 | Dettinger et al. |
| 7,343,417 B2 | 3/2008 | Baum |
| 7,363,643 B2 | 4/2008 | Drake et al. |
| 7,386,473 B2 | 6/2008 | Blumenau |
| 7,406,516 B2 | 7/2008 | Davis et al. |
| 7,546,370 B1 | 6/2009 | Acharya et al. |
| 7,590,568 B2 | 9/2009 | Blumenau |
| 7,613,635 B2 | 11/2009 | Blumenau |
| 7,634,786 B2 | 12/2009 | Knee et al. |
| 7,644,156 B2 | 1/2010 | Blumenau |
| 7,647,418 B2 | 1/2010 | Ash et al. |
| 7,650,407 B2 | 1/2010 | Blumenau |
| 7,653,724 B2 | 1/2010 | Blumenau |
| 7,716,326 B2 | 5/2010 | Blumenau |
| 7,720,963 B2 | 5/2010 | Blumenau |
| 7,720,964 B2 | 5/2010 | Blumenau |
| 7,756,974 B2 | 7/2010 | Blumenau |
| 7,788,216 B2 | 8/2010 | Li et al. |
| 7,882,054 B2 | 2/2011 | Levitan |
| 7,882,242 B2 | 2/2011 | Chen |
| 7,890,451 B2 | 2/2011 | Cancel et al. |
| 7,925,694 B2 | 4/2011 | Harris |
| 7,941,525 B1 | 5/2011 | Yavilevich |
| 7,949,565 B1 | 5/2011 | Eldering et al. |
| 7,949,639 B2 | 5/2011 | Hunt et al. |
| 7,958,234 B2 | 6/2011 | Thomas et al. |
| 7,962,603 B1 | 6/2011 | Morimoto |
| 8,006,259 B2 | 8/2011 | Drake et al. |
| 8,046,255 B2 | 10/2011 | Bistriceanu et al. |
| 8,060,601 B1 | 11/2011 | Brown et al. |
| 8,087,041 B2 | 12/2011 | Fu et al. |
| 8,131,763 B2 | 3/2012 | Tuscano et al. |
| 8,131,861 B2 | 3/2012 | Butler et al. |
| 8,151,194 B1 | 4/2012 | Chan et al. |
| 8,151,291 B2 | 4/2012 | Ramaswamy |
| 8,180,112 B2 | 5/2012 | Kurtz et al. |
| 8,229,780 B2 | 7/2012 | Davidow et al. |
| 8,235,814 B2 | 8/2012 | Willis et al. |
| 8,266,687 B2 | 9/2012 | Baldry |
| 8,271,886 B2 | 9/2012 | Lee et al. |
| 8,280,683 B2 | 10/2012 | Finkler |
| 8,302,120 B2 | 10/2012 | Ramasamy |
| 8,307,006 B2 | 11/2012 | Hannan et al. |
| 8,370,489 B2 | 2/2013 | Mazumdar et al. |
| 8,412,648 B2 | 4/2013 | Karypis et al. |
| 8,453,173 B1 | 5/2013 | Anderson et al. |
| 8,484,511 B2 | 7/2013 | Tidwell et al. |
| 8,495,198 B2 | 7/2013 | Sim et al. |
| 8,504,411 B1 | 8/2013 | Subasic et al. |
| 8,504,507 B1 | 8/2013 | Srinivasaiah |
| 8,514,907 B2 | 8/2013 | Wright et al. |
| 8,543,454 B2 | 9/2013 | Fleischman et al. |
| 8,549,552 B2 | 10/2013 | Ramaswamy et al. |
| 8,600,796 B1 | 12/2013 | Sterne et al. |
| 8,631,122 B2 | 1/2014 | Kadam et al. |
| 8,688,524 B1 | 4/2014 | Ramalingam et al. |
| 8,700,457 B2 | 4/2014 | Craft |
| 8,713,168 B2 | 4/2014 | Heffernan et al. |
| 8,751,461 B2 | 6/2014 | Abraham et al. |
| 8,775,332 B1 | 7/2014 | Morris et al. |
| 8,831,362 B1 | 9/2014 | Steffens |
| 8,843,626 B2 | 9/2014 | Mazumdar et al. |
| 8,898,689 B2 | 11/2014 | Georgakis |
| 8,909,771 B2 | 12/2014 | Heath |
| 8,910,195 B1 | 12/2014 | Barney et al. |
| 8,930,701 B2 | 1/2015 | Burbank et al. |
| 8,954,536 B2 | 2/2015 | Kalus et al. |
| 8,973,023 B1 | 3/2015 | Rao et al. |
| 8,984,547 B2 | 3/2015 | Lambert et al. |
| 9,055,122 B2 | 6/2015 | Grecco et al. |
| 9,117,217 B2 | 8/2015 | Wilson et al. |
| 9,301,007 B2 | 3/2016 | Ramaswamy |
| 9,519,914 B2 | 12/2016 | Splaine et al. |
| 2002/0099609 A1 | 7/2002 | Nascenzi et al. |
| 2003/0006911 A1 | 1/2003 | Smith et al. |
| 2003/0037131 A1 | 2/2003 | Verma |
| 2003/0046385 A1 | 3/2003 | Vincent |
| 2003/0065770 A1 | 4/2003 | Davis et al. |
| 2003/0105604 A1 | 6/2003 | Ash et al. |
| 2003/0177488 A1 | 9/2003 | Smith et al. |
| 2003/0220901 A1 | 11/2003 | Carr et al. |
| 2004/0088212 A1 | 5/2004 | Hill |
| 2004/0107125 A1 | 6/2004 | Guheen et al. |
| 2004/0167763 A1 | 8/2004 | Liebman |
| 2004/0167928 A1 | 8/2004 | Anderson et al. |
| 2004/0186840 A1 | 9/2004 | Dettinger et al. |
| 2005/0144069 A1 | 6/2005 | Wiseman et al. |
| 2005/0166233 A1 | 7/2005 | Beyda et al. |
| 2005/0223093 A1 | 10/2005 | Hanson et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0112714 A1 | 5/2007 | Fairweather |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |

(56) References Cited

U.S. PATENT DOCUMENTS

| | | |
|---|---|---|
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0300675 A1 | 12/2009 | Shkedi |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoyen |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1 | 3/2012 | Perez et al. |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0158954 A1 | 6/2012 | Heffernan et al. |
| 2012/0166520 A1 | 6/2012 | Lindsay et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0215903 A1 | 8/2012 | Fleischman et al. |
| 2012/0239407 A1 | 9/2012 | Lynch et al. |
| 2012/0239809 A1 | 9/2012 | Mazumdar et al. |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyanage |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0212188 A1 | 8/2013 | Duterque et al. |
| 2013/0246389 A1 | 9/2013 | Osann, Jr. |
| 2013/0246609 A1 | 9/2013 | Topchy et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2014/0033317 A1 | 1/2014 | Barber |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0279074 A1 | 9/2014 | Chen et al. |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |

FOREIGN PATENT DOCUMENTS

| | | |
|---|---|---|
| CN | 101222348 | 7/2008 |
| CN | 101505247 | 8/2009 |
| CN | 101536503 | 9/2012 |
| CN | 102740140 | 10/2012 |
| CN | 101077014 | 9/2013 |
| CN | 104520839 | 4/2015 |
| CN | 104541513 | 4/2015 |
| CN | 104584564 | 4/2015 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002223427 | 8/2002 |
| JP | 2002344933 | 11/2002 |
| JP | 2002373152 | 12/2002 |
| JP | 2004504674 | 2/2004 |
| JP | 2006127320 | 5/2006 |
| JP | 2006127321 | 5/2006 |
| JP | 2006133959 | 5/2006 |

(56) References Cited

FOREIGN PATENT DOCUMENTS

| | | |
|---|---|---|
| JP | 2010039845 | 2/2010 |
| JP | 2010257448 | 11/2010 |
| JP | 2013544384 | 12/2013 |
| KR | 20020037980 | 5/2002 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 9810349 | 3/1998 |
| WO | 0041115 | 7/2000 |
| WO | 0152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010104285 | 9/2010 |
| WO | 2011097624 | 8/2011 |
| WO | 2012019643 | 2/2012 |
| WO | 2012040371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |

OTHER PUBLICATIONS

Korean Intellectual Property Office, "Notice of Allowance," issued in connection with Korean Patent Application No. 10-2014-7034079, dated May 25, 2017, 3 pages.

Japanese Patent Office, "Notice of Reasons for Rejection," issued in connection with Japanese Patent Application No. 2015-525657, dated Jun. 13, 2017, 6 pages.

Adam et al., "Privacy Preserving Integration of Health Care Data," AMIA 2007 Symposium Proceedings, retrieved from <http://www.ncbi.nlm.nih.gov/pmc/articles/PMC2655922/?report=abstract>, retrieved on Sep. 21, 2010, 6 pages.

Albanesius, "Facebook Issues Fix for Several Tracking Cookies," PCMag, retrieved from <http://pcmag.com/article2/0.2817.2393750.00.asp>, Sep. 28, 2011, 2 pages.

Anonymous, "Mental Poker," Wikipedia, Jan. 12, 2010, retrieved from <http://en.wikipedia.org/wiki/Mental_poker>, retrieved on Sep. 21, 2010, 5 pages.

Anonymous, "Measuring Conversions on Facebook Across Devices and in Mobile Apps," Facebook for Business, Aug. 14, 2014, retrieved from <http://www.facebook.com/business/news/cross-device-measurement>, 3 pages.

Anonymous, "Google Answers: Storing and Retrieving Non 3rd Party Cookies Across Multiple Domains," Jun. 30, 2006, retrieved from <http://www.answers.google.com/answers/threadview/id/742376.html/>, retrieved on May 4, 2016, 3 pages.

Anonymous, "SSP to DSP Cookie Syncing Explained," Ad Ops Insider, May 1, 2011, retrieved from <http://www.adopsinsider.com/ad-exchanges/cookie-syncing/>, retrieved on Jul. 18, 2016, 24 pages.

Arbitron Inc, et al., "The Infinite Dial 2011: Navigating Digital Platforms," 2011, 83 pages.

Braverman, "Are the Online Marketing Efforts of TV Shows and Programs Worthwhile?," Mar. 30, 2011, retrieved from <http://www.harrisinteractive.com/NewsRoom/HarrisPolls/tabid/447/ctl/>, retrieved on Jun. 12, 2014, 5 pages.

Canadian Intellectual Property Office, "Office Action," issued in connection with Canadian Patent Application No. 2,810,264 dated Nov. 27, 2014, 5 pages.

Canadian Intellectual Property Office, "Office Action," issued in connection with Canadian Patent Application No. 2,875,434 dated Dec. 4, 2015, 4 pages.

Canadian Intellectual Property Office, "Office Action," issued in connection with Canadian Patent Application No. 2,819,268, dated Nov. 24, 2014, 4 pages.

Canadian Intellectual Property Office, "Office Action," issued in connection with Canadian Patent Application No. 2,873,128, dated Jan. 7, 2015, 3 pages.

Canadian Intellectual Property Office, "Office Action," issued in connection with Canadian Patent Application No. 2,810,541, dated Jan. 20, 2015, 3 pages.

Cubrilovic, "Logging Out of Facebook is not enough," retrieved from <http://www.nikcub.appspot/com>, Sep. 25, 2011, 3 pages.

Danaher, "A Canonical Expansion Model for Multivariate Media Exposure Distributions: A Generalization of the Duplication of Viewing Law," Journal of Marketing Research, vol. 28, Aug. 1991, 7 pages.

Edwards, "Apple Wants More Advertisers to use its iPhone Tracking System," Business Insider, Jun. 13, 2013, retrieved from <http://www.businessinsider.com/apples-idfa-and-ifa-tracking-system-2013-6>, 2 pages.

Enoch et al., "Cracking the Cross-Media Code: How to Use Single-Source Measures to Examine Media Cannibalization and Convergence," Journal of Advertising Research, Jun. 2010, 13 pages.

European Patent Office, "Extended European Search Report," issued in connection with European Patent Application No. 14004028.8, dated Apr. 9, 2015, 7 pages.

European Patent Office, "Supplementary European Search Report," issued in connection with European Patent Application No. 14791226.5, dated Aug. 12, 2016, 1 page.

European Patent Office, "Extended European Search Report," issued in connection with European Patent Application No. 14791226.5, dated Jul. 27, 2016, 12 pages.

European Patent Office, "Extended European Search Report," issued in connection with European Patent Application No. 12760524.4, dated Aug. 18, 2014, 8 pages.

Fliptop, "Fliptop Person API Dcoumentation," retrieved from <http://developer.fliptop.com/documentation>, retrieved on May 7, 2013, 6 pages.

Fliptop, "Get, Keep and Grow Customers with Fliptop's Customer Intelligence Application," retrieved from <http://fliptop.com/features#social_matching>, retrieved on May 7, 2013, 3 pages.

Fliptop, "What is Fliptop?," retrieved from <http://fliptop.com/about_us>, retrieved on May 7, 2013, 1 page.

Goerg et al., "How Many People Visit YouTube?, Estimating Unobserved Events From Incomplete Panel Data Conditioned on Demographic Covariates," Google Inc., Apr. 27, 2015, 27 pages.

Goerg et al., "How Many People Visit YouTube?, Imputing Missing Events in Panels with Excess Zeros," Google Inc., 2015, 6 pages.

Headen et al., "The Duplication of Viewing Law and Television Media Schedule Evaluation," Journal of Marketing Research, vol. 16, Aug. 1979, 9 pages.

Hothorn et al, "Unbiased Recursive Partitioning: A Conditional Inference Framework," Journal of Computational and Geographical Statistics, vol. 15, No. 3, 2006, 21 pages.

Huang et al, "Modeling the Audience's Banner Ad Exposure for Internet Advertising Planning," Journal of Advertising Research, vol. 35, No. 2, Summer 2006, 15 pages.

International Bureau, "International Preliminary Report on Patentability," issued in connection with International Patent Application No. PCT/US2012/026760, dated Sep. 24, 2013, 4 pages.

International Bureau, "International Preliminary Report on Patentability," issued in connection with International Patent Application No. PCT/US2011/052623, dated Mar. 26, 2013, 5 pages.

(56) References Cited

OTHER PUBLICATIONS

International Bureau, "International Preliminary Report on Patentability," issued in connection with International Patent Application No. PCT/US2013/045211, dated Dec. 16, 2014, 8 pages.
International Bureau, "International Preliminary Report on Patentability," issued in connection with International Patent Application No. PCT/US2013/057045, dated Mar. 3, 2015, 6 pages.
International Searching Authority, "International Search Report and Written Opinion," issued in connection with International Patent Application No. PCT/US2014/037064, dated Sep. 12, 2014, 9 pages.
International Searching Authority, "International Search Report and Written Opinion," issued in connection with International Patent Application No. PCT/US2014/035683, dated Sep. 12, 2014, 13 pages.
International Searching Authority, "International Search Report and Written Opinion," issued in connection with International Patent Application No. PCT/US2013/045211, dated Feb. 25, 2014, 13 pages.
International Searching Authority, "International Search Report and Written Opinion," issued in connection with International Patent Application No. PCT/US2014/031342, dated Jul. 28, 2014, 13 pages.
International Searching Authority, "International Search Report and Written Opinion," issued in connection with International Patent Application No. PCT/US2014/034389, dated Sep. 5, 2014, 15 pages.
International Searching Authority, "International Search Report and Written Opinion," issued in connection with International Patent Application No. PCT/US2014/050551, dated Nov. 24, 2014, 11 pages.
International Searching Authority, "International Search Report," issued in connection with International Patent Application No. PCT/US2014/068165, dated Feb. 25, 2015, 3 pages.
International Searching Authority, "Written Opinion," issued in connection with International Patent Application No. PCT/US2014/068165, dated Feb. 25, 2015, 5 pages.
International Searching Authority, "International Search Report," issued in connection with International Patent Application No. PCT/US2014/068168, dated Mar. 2, 2015, 3 pages.
International Searching Authority, "Written Opinion," issued in connection with International Patent Application No. PCT/US2014/068168, dated Mar. 2, 2015, 5 pages.
International Searching Authority, "International Search Report," issued in connection with International Patent Application No. PCT/US2014/068621, dated Feb. 27, 2015, 3 pages.
International Searching Authority, "Written Opinion," issued in connection with International Patent Application No. PCT/US2014/068621, dated Feb. 27, 2015, 7 pages.
International Searching Authority, "International Search Report," issued in connection with International Patent Application No. PCT/US2014/068623, dated Mar. 23, 2015, 3 pages.
International Searching Authority, "Written Opinion," issued in connection with International Patent Application No. PCT/US2014/068623, dated Mar. 23, 2015, 8 pages.
International Searching Authority, "International Search Report," issued in connection with International Patent Application No. PCT/US2014/068202, dated Apr. 10, 2015, 3 pages.
International Searching Authority, "Written Opinion," issued in connection with International Patent Application No. PCT/US2014/068202, dated Apr. 10, 2015, 7 pages.
International Searching Authority, "International Search Report," issued in connection with International Patent Application No. PCT/US2014/035156, dated Aug. 25, 2014, 5 pages.
International Searching Authority, "Written Opinion," issued in connection with International Patent Application No. PCT/US2014/035156, dated Aug. 25, 2014, 5 pages.
International Searching Authority, "International Search Report," issued in connection with International Patent Application No. PCT/US2013/057045, dated Dec. 27, 2013, 3 pages.
International Searching Authority, "Written Opinion," issued in connection with International Patent Application No. PCT/US2013/057045, dated Dec. 27, 2013, 5 pages.
International Searching Authority, "International Search Report," issued in connection with International Patent Application No. PCT/US2013/025687, dated Jun. 2, 2013, 5 pages.
International Searching Authority, "Written Opinion," issued in connection with International Patent Application No. PCT/US2013/025687, dated Jun. 2, 2013, 5 pages.
International Searching Authority, "International Search Report," issued in connection with International Patent Application No. PCT/US2011/052623, dated Mar. 8, 2012, 3 pages.
International Searching Authority, "Written Opinion," issued in connection with International Patent Application No. PCT/US2011/052623, dated Mar. 8, 2012, 4 pages.
International Searching Authority, "International Search Report," issued in connection with International Patent Application No. PCT/US2011/065881, dated Jul. 9, 2012, 3 pages.
International Searching Authority, "Written Opinion," issued in connection with International Patent Application No. PCT/US2011/065881, dated Jul. 9, 2012, 6 pages.
International Searching Authority, "International Search Report and Written Opinion," issued in connection with International Patent Application No. PCT/US2012/026760, dated Jan. 2, 2013, 6 pages.
IP Australia, "Patent Examination Report No. 1," issued in connection with Australian Patent Application No. 2013204953, dated Dec. 23, 2014, 5 pages.
IP Australia, "Patent Examination Report No. 1," issued in connection with Australian Patent Application No. 2013204354, dated Nov. 14, 2014, 3 pages.
IP Australia, "Patent Examination Report No. 1," issued in connection with Australian Patent Application No. 2011374955, dated Sep. 25, 2014, 3 pages.
IP Australia, "Patent Examination Report No. 1," issued in connection with Australian Patent Application No. 2011305429, dated Apr. 17, 2014, 4 pages.
IP Australia, "Notice of Acceptance," issued in connection with Australian Patent Application No. 2011305429, dated Jul. 15, 2015, 2 pages.
IP Australia, "Notice of Grant," issued in connection with Australian Patent Application No. 2013204354, dated Jun. 16, 2016, 1 page.
IP Australia, "Patent Examination Report No. 1," issued in connection with Australian Patent Application No. 2013204865, dated Dec. 22, 2014, 3 pages.
IP Australia, "Patent Examination Report No. 1," issued in connection with Australian Patent Application No. 2014260163, dated Apr. 21, 2015, 3 pages.
IP Australia, "Notice of Grant," issued in connection with Australian Patent Application No. 2014260163, dated Aug. 18, 2016, 1 page.
IP Australia, "Notice of Acceptance," issued in connection with Australian Patent Application No. 2014260163, dated Apr. 22, 2016, 2 pages.
IP Australia, "Patent Examination Report No. 1," issued in connection with Australian Patent Application No. 2013203898, dated Nov. 27, 2014, 4 pages.
IP Australia, "Patent Examination Report No. 2," issued in connection with Australian Patent Application No. 2012231667, dated Feb. 10, 2015, 3 pages.
IP Australia, "Patent Examination Report No. 1," issued in connection with Australian Patent Application No. 2014262739, dated May 29, 2015, 4 pages.
IP Australia, "Patent Examination Report No. 1," issued in connection with Australian Patent Application No. 2011349435, dated Nov. 4, 2014, 3 pages.
IP Australia, "Patent Examination Report No. 1," issued in connection with Australian Patent Application No. 2013205736, dated Jun. 18, 2013, 2 pages.
Japan Patent Office, "Notice of Reasons for Rejection," issued in connection with Japanese Patent Application No. P2014-005867, dated Apr. 15, 2014, 10 pages.
Japan Patent Office, "Notice of Reasons for Rejection," issued in connection with Japanese Patent Application No. P2014-005867, dated Feb. 17, 2015, 6 pages.

(56) References Cited

OTHER PUBLICATIONS

Japan Patent Office, "Final Rejection," issued in connection with Japanese Patent Application No. P2014-005867, dated Aug. 26, 2014, 8 pages.
Japan Patent Office, "Notice of Reasons for Rejection," issued in connection with Japanese Patent Application No. P2015-525657, dated Apr. 5, 2016, 23 pages.
Japan Patent Office, "Notice of Reasons for Rejection," issued in connection with Japanese Patent Application No. P2013-546286, dated Aug. 26, 2014, 5 pages.
Japan Patent Office, "Notice of Reasons for Rejection," issued in connection with Japanese Patent Application No. P2015-078539, dated Jul. 14, 2015, 6 pages.
Japan Patent Office, "Notice of Reasons for Rejection," issued in connection with Japanese Patent Application No. P2015-0524512, dated Jun. 30, 2015, 6 pages.
Japan Patent Office, "Notice of Reasons for Rejection," issued in connection with Japanese Patent Application No. P2013-544887, dated Aug. 12, 2014, 16 pages.
Japan Patent Office, "Notice of Reasons for Rejection," issued in connection with Japanese Patent Application No. P2013-529435, dated Aug. 20, 2013, 4 pages.
JavaScript and AJAX Forum, Sep. 28, 2005, retrieved from <http://www.webmasterworld.com/forum91/4465.html> retrieved on Jun. 29, 2011, 4 pages.
Korean Intellectual Property Office, "Notice of Preliminary Rejection," issued in connection with Korean Patent Application No. 10-2014-7034079, dated Mar. 22, 2016, 7 pages.
Korean Intellectual Property Office, "Notice of Preliminary Rejection," issued in connection with Korean Patent Application No. 10-2014-7034079, dated Sep. 30, 2016, 5 pages.
Launder, "Media Journal: Nielsen to Test Online-TV Viewing Tool," The Wall Street Journal, Apr. 30, 2013, 2 pages.
Nielsen, "How Teens Use Media: A Nielsen Report on the Myths and Realities of Teen Media Trends," Jun. 2009, 17 pages.
Protalinski, "Facebook Fixes Cookie Behavior After Logging Out," retrieved from <http://www.zdnet.com/blog/facebook/facebook-fixes-cookie-behavior-after-logging-out/4120>, Sep. 27, 2011, 2 pages.
Protalinski, "Facebook Denies Cookie Tracking Allegations," retrieved from <http://www.zdnet.com/blog/facebook/facebook-denies-cookie-tracking-allegations/4044>, Sep. 25, 2011, 2 pages.
Protalinski, "US Congressmen ask FTC to Investigate Facebook Cookies," retrieved from <http://www.zdnet.com/blog/facebook/us-congressmen-ask-ftc-to-investigate-facebook-cookies/4218>, Sep. 28, 2011, 2 pages.
Rust et al., "A Comparative Study of Television Duplication Models," Journal for Advertising, vol. 10, No. 3, 1981, 6 pages.
State Intellectual Property Office of China, "First Notification of Office Action," issued in connection with Chinese Patent Application No. 201180061437.0, dated Mar. 7, 2014, 11 pages.
State Intellectual Property Office of China, "Second Notification of Office Action," issued in connection with Chinese Patent Application No. 201180061437.0, dated Nov. 15, 2014, 6 pages.
State Intellectual Property Office of China, "First Notification of Office Action," issued in connection with Chinese Patent Application No. 201180045957.2, dated Nov. 15, 2014, 20 pages.
State Intellectual Property Office of China, "Second Notification of Office Action," issued in connection with Chinese Patent Application No. 201180045957.2, dated Jul. 29, 2015, 5 pages.
The Nielsen Company, "Nielsen Unveils New Online Advertising Measurement," Sep. 27, 2010, retrieved from <http://nielsen.com/us/en/insights/press-room/2010/nielsen_unveils_newonlineadvertisingmeasurement.html>, retrieved on May 31, 2012, 3 pages.
United States Patent and Trademark Office, "Final Office Action," issued in connection with U.S. Appl. No. 14/025,575, dated Aug. 17, 2015, 34 pages.
United States Patent and Trademark Office, "Non-Final Office Action," issued in connection with U.S. Appl. No. 14/025,575, dated Apr. 16, 2015, 19 pages.
United States Patent and Trademark Office, "Notice of Allowance," issued in connection with U.S. Appl. No. 14/025,575, dated Sep. 12, 2016, 8 pages.
United States Patent and Trademark Office, "Notice of Allowance," issued in connection with U.S. Appl. No. 13/513,148, dated Nov. 5, 2012, 5 pages.
United States Patent and Trademark Office, "Non-Final Office Action," issued in connection with U.S. Appl. No. 13/396,071, dated May 9, 2014, 14 pages.
United States Patent and Trademark Office, "Notice of Allowance," issued in connection with U.S. Appl. No. 13/396,071, dated Oct. 24, 2014, 8 pages.
United States Patent and Trademark Office, "Non-Final Office Action," issued in connection with U.S. Appl. No. 14/014,050, dated May 28, 2015, 4 pages.
United States Patent and Trademark Office, "Non-Final Office Action," issued in connection with U.S. Appl. No. 14/014,050, dated Sep. 12, 2014, 10 pages.
United States Patent and Trademark Office, "Notice of Allowance," issued in connection with U.S. Appl. No. 13/915,381, dated Jun. 8, 2015, 7 pages.
United States Patent and Trademark Office, "Non-Final Office Action," issued in connection with U.S. Appl. No. 13/915,381, dated Jan. 30, 2015, 7 pages.
United States Patent and Trademark Office, "Non-Final Office Action," issued in connection with U.S. Appl. No. 14/463,309, dated Aug. 5, 2015, 10 pages.
United States Patent and Trademark Office, "Non-Final Office Action," issued in connection with U.S. Appl. No. 14/025,567, dated Aug. 6, 2015, 10 pages.
United States Patent and Trademark Office, "Non-Final Office Action," issued in connection with U.S. Appl. No. 14/025,567, dated Dec. 11, 2015, 24 pages.
United States Patent and Trademark Office, "Notice of Allowance," issued in connection with U.S. Appl. No. 14/500,297, dated May 21, 2015, 5 pages.
United States Patent and Trademark Office, "Non-Final Office Action," issued in connection with U.S. Appl. No. 14/500,297, dated Jan. 5, 2015, 6 pages.
United States Patent and Trademark Office, "Non-Final Office Action," issued in connection with U.S. Appl. No. 13/756,493, dated Nov. 19, 2014, 12 pages.
United States Patent and Trademark Office, "Notice of Allowance," issued in connection with U.S. Appl. No. 13/756,493, dated May 20, 2014, 11 pages.
United States Patent and Trademark Office, "Notice of Allowance," issued in connection with U.S. Appl. No. 13/756,493, dated Mar. 17, 2015, 5 pages.
United States Patent and Trademark Office, "Non-Final Office Action," issued in connection with U.S. Appl. No. 13/756,493, dated Jan. 17, 2014, 8 pages.
United States Patent and Trademark Office, "Notice of Allowance," issued in connection with U.S. Appl. No. 13/404,984, dated May 20, 2015, 10 pages.
United States Patent and Trademark Office, "Corrected Notice of Allowability," issued in connection with U.S. Appl. No. 13/690,915, dated Nov. 6, 2014, 6 pages.
United States Patent and Trademark Office, "Supplemental Notice of Allowability," issued in connection with U.S. Appl. No. 13/690,915, dated Jul. 8, 2014, 3 pages.
United States Patent and Trademark Office, "Notice of Allowance," issued in connection with U.S. Appl. No. 13/690,915, dated Jun. 24, 2014, 6 pages.
United States Patent and Trademark Office, "Notice of Allowance," issued in connection with U.S. Appl. No. 13/690,915, dated Jun. 5, 2015, 6 pages.
United States Patent and Trademark Office, "Notice of Allowance," issued in connection with U.S. Appl. No. 13/690,915, dated Apr. 9, 2014, 5 pages.

(56) References Cited

OTHER PUBLICATIONS

United States Patent and Trademark Office, "Final Office Action," issued in connection with U.S. Appl. No. 13/690,915, dated Dec. 20, 2013, 6 pages.
United States Patent and Trademark Office, "Non-Final Office Action," issued in connection with U.S. Appl. No. 13/690,915, dated Sep. 5, 2013, 13 pages.
United States Patent and Trademark Office, "Notice of Allowance," issued in connection with U.S. Appl. No. 13/995,864, dated Oct. 28, 2014, 9 pages.
United States Patent and Trademark Office, "Non-Final Office Action," issued in connection with U.S. Appl. No. 14/014,044, dated Jul. 2, 2015, 22 pages.
United States Patent and Trademark Office, "Notice of Allowance," issued in connection with U.S. Appl. No. 14/641,982, dated Sep. 2, 2015, 13 pages.
United States Patent and Trademark Office, "Final Office Action," issued in connection with U.S. Appl. No. 13/963,737, dated Sep. 21, 2015, 14 pages.
United States Patent and Trademark Office, "Non-Final Office Action," issued in connection with U.S. Appl. No. 13/209,292, dated Apr. 8, 2014, 14 pages.
United States Patent and Trademark Office, "Non-Final Office Action," issued in connection with U.S. Appl. No. 13/239,005, dated Jun. 4, 2013, 11 pages.
United States Patent and Trademark Office, "Notice of Allowance," issued in connection with U.S. Appl. No. 13/239,005, dated Nov. 27, 2013, 9 pages.
United States Patent and Trademark Office, "Non-Final Office Action," issued in connection with U.S. Appl. No. 13/691,175, dated Sep. 9, 2013, 7 pages.
United States Patent and Trademark Office, "Notice of Allowance," issued in connection with U.S. Appl. No. 13/691,175, dated May 9, 2014, 6 pages.
United States Patent and Trademark Office, "Notice of Allowance," issued in connection with U.S. Appl. No. 13/691,175, dated Jan. 27, 2014, 5 pages.
Coffey, "Internet Audience Measurement: A Practitioner's View," Journal of Interactive Advertising, vol. 1, No. 2, Spring 2001, 8 pages.
Rapleaf, "Fast. Simple. Secure." Rapleaf.com, retrieved from <http://www.rapleaf.com/why-rapleaf>, retrieved on May 7, 2013, 3 pages.
Rapleaf, "Frequently Asked Questions." Rapleaf.com, retrieved from <http://www.rapleaf.com/about-us/faq/#where>, retrieved on May 7, 2013, 3 pages.
Rapleaf, "The Consumer Data Marketplace." Rapleaf.com, retrieved from <http://www.rapleaf.com/under-the-hood/>, retrieved on May 7, 2013, 2 pages.
Sharma, "Nielsen Gets Digital to Track Online TV Viewers," Wallstreet Journal, Apr. 30, 2013, 3 pages.
Vega, "Nielsen Introduces New Ad Measurement Product," New York Times, Sep. 27, 2010, retrieved from <http://mediadecoder.blogs.nytimes.com/2010/09/27/nielsen-unveils-new->, retrieved on Oct. 4, 2011, 7 pages.
Vranica, "Nielsen Testing a New Web-Ad Metric," The Wall Street Journal, Sep. 23, 2010, retrieved from <http://online.wsj.com/article/SB10001424052748704814204575508100589715696.html?ru>, retrieved on Sep. 1, 2011, 2 pages.
State Intellectual Property Office of China, "2nd Notification of Office Action," issued in connection with Chinese Patent Application No. 201480001437.5, dated Nov. 29, 2017, 10 pages.
European Patent Office, "Communication pursuant to Article 94(3) EPC," issued in connection with European Patent Application No. 14791226.5, dated Nov. 30, 2017, 10 pages.
Canadian Intellectual Property Office, "Notice of Allowance," issued in connection with Canadian Patent Application No. 2,875,434, dated Jan. 11, 2017, 1 page.
Japanese Patent Office, "Decision to Grant a Patent" issued in connection with Japanese Patent Application No. 2015-525657, dated Jul. 11, 2017, 6 pages.
State Intellectual Property Office of China, "Notice of Decision of Granting Patent Right for Invention," issued in connection with Chinese Patent Application No. 201480001437.5, dated May 2, 2018, 5 pages.
Japan Patent Office, "Notice of Reasons for Rejection," issued in connection with Japanese Patent Application No. P2015-525657, dated Dec. 6, 2016, 8 pages.

RATINGS ENTITY IMPRESSIONS

| FREQUENCY | UUIDs (COOKIES) | IMPRESSION |
|---|---|---|
| 1 | 100,000 | 100,000 |
| 2 | 200,000 | 400,000 |
| 3 | 100,000 | 300,000 |
| 4 | 50,000 | 200,000 |
| 5 | 50,000 | 1,500,000 |
| TOTAL | 500,000 | 2,500,000 |

FIG. 4

DATABASE (DB) PROPRIETOR CAMPAIGN-LEVEL AGE/GENDER AND IMPRESSION COMPOSITION TABLE

| AGE/GENDER | IMPRESSIONS | FREQUENCY | IMPRESSION COMP | TIME |
|---|---|---|---|---|
| (SOURCE) | (DB PROPRIETOR) | (DB PROPRIETOR) | (DB PROPRIETOR) | (MIN) |
| M 13-18 | 1,000,000 | 4 | 33% | 1 |
| F 13-18 | 2,000,000 | 5 | 66% | 1 |
| ... | | | | |
| F 50+ | 0 | 0 | 0 | 1 |
| M 13-18 | 500,000 | 2 | 20% | 2 |
| F 13-18 | 2,000,000 | 5 | 80% | 2 |

FIG. 5

PANELIST CAMPAIGN-LEVEL AGE/GENDER AND IMPRESSION COMPOSITION TABLE

| AGE/GENDER | IMPRESSIONS | FREQUENCY | IMPRESSION COMP | TIME |
|---|---|---|---|---|
| (SOURCE) | (ONLINE+PC&TV) | (ONLINE+PC&TV) | (ONLINE+PC&TV) | (MIN) |
| M 13-18 | 750,000 | 3 | 31% | 1 |
| F 13-18 | 1,550,000 | 4 | 65% | 1 |
| ... | | | | |
| F 50+ | 0 | 0 | 0 | 1 |
| M 13-18 | 750,000 | 3 | 33% | 2 |
| F 13-18 | 1,500,000 | 4 | 66% | 2 |

| AGE/GENDER | IMPRESSION COMP | IMPRESSION COMP | ERROR WEIGHTED 702 | TIME |
|---|---|---|---|---|
| (SOURCE) | (RE PC&TV) | (DB PROPRIETOR) | ($\alpha IC_{(RE)} + (1-\alpha)IC_{(SN)}$) | (MIN) |
| M 13-18 | 31% | 33% | 32% | 1 |
| F 13-18 | 65% | 66% | 66% | 1 |
| ... | | | | |
| F 50+ | 0 | 0 | 0 | 1 |
| TOTAL | 100% | 100% | 100% | 1 |

COMBINED CAMPAIGN-LEVEL AGE/GENDER AND
IMPRESSION COMPOSITION TABLE

| AGE/GENDER 802 | IMPRESSIONS 804 | FREQUENCY 806 | REACH 808 | IMPRESSION COMP 810 | TIME 812 |
|---|---|---|---|---|---|
| (SOURCE) | (RATINGS ENTITY) | (DB PROPRIETOR) | (DERIVED) | (IMP COMP TABLE) | (MIN) |
| <12 | 56,000 | 3 | 18,666 | 2% | 1 |
| M 13-18 | 896,000 | 4 | 224,000 | 32% | 1 |
| F 13-18 | 1,848,000 | 5 | 369,600 | 66% | 1 |
| ... | | | | | |
| F 50+ | 0 | 0 | 0 | 0 | 1 |
| TOTAL | 2,800,000 | 4.6 | 612,266 | 100% | 1 |

AGE/GENDER IMPRESSIONS DISTRIBUTION TABLE

FIG. 8

METHODS AND APPARATUS TO DETERMINE RATINGS INFORMATION FOR ONLINE MEDIA PRESENTATIONS

RELATED APPLICATIONS

This patent arises from a continuation of U.S. patent application Ser. No. 14/025,575, filed Sep. 12, 2013, entitled "Methods and Apparatus to Determine Ratings Information for Online Media Presentations," which claims priority to U.S. Provisional Patent Application Ser. No. 61/817,829, filed Apr. 30, 2013, entitled "Methods and Apparatus to Determine Ratings Information for Online Media Presentations." The entirety of U.S. patent application Ser. No. 14/025,575 and U.S. Provisional Patent Application Ser. No. 61/817,829 are hereby incorporated herein by reference.

FIELD OF THE DISCLOSURE

The present disclosure relates generally to monitoring media and, more particularly, to methods and apparatus to determine ratings information for online media presentations.

BACKGROUND

Traditionally, audience measurement entities determine audience engagement levels for media programming based on registered panel members. That is, an audience measurement entity enrolls people who consent to being monitored into a panel. The audience measurement entity then monitors those panel members to determine media programs (e.g., television programs or radio programs, movies, DVDs, etc.) exposed to those panel members. In this manner, the audience measurement entity can determine exposure measures for different media content based on the collected media measurement data.

Techniques for monitoring user access to Internet resources such as web pages, advertisements and/or other content has evolved significantly over the years. Some known systems perform such monitoring primarily through server logs. In particular, entities serving content on the Internet can use known techniques to log the number of requests received for their content at their server.

BRIEF DESCRIPTION OF THE DRAWINGS

FIG. 4 depicts an example ratings entity impressions table showing quantities of impressions to monitored users.

FIG. 5 depicts an example campaign-level age/gender and impression composition per media period table generated by a database proprietor.

FIG. 6 depicts another example campaign-level age/gender and impression composition per media period table generated by a ratings entity.

FIG. 7 depicts an example combined campaign-level age/gender and impression composition per media period table based on the composition tables of FIGS. 5 and 6.

FIG. 8 depicts an example age/gender impressions distribution table showing impressions based on the composition per media period tables of FIGS. 5-7.

DETAILED DESCRIPTION

Figure 1:
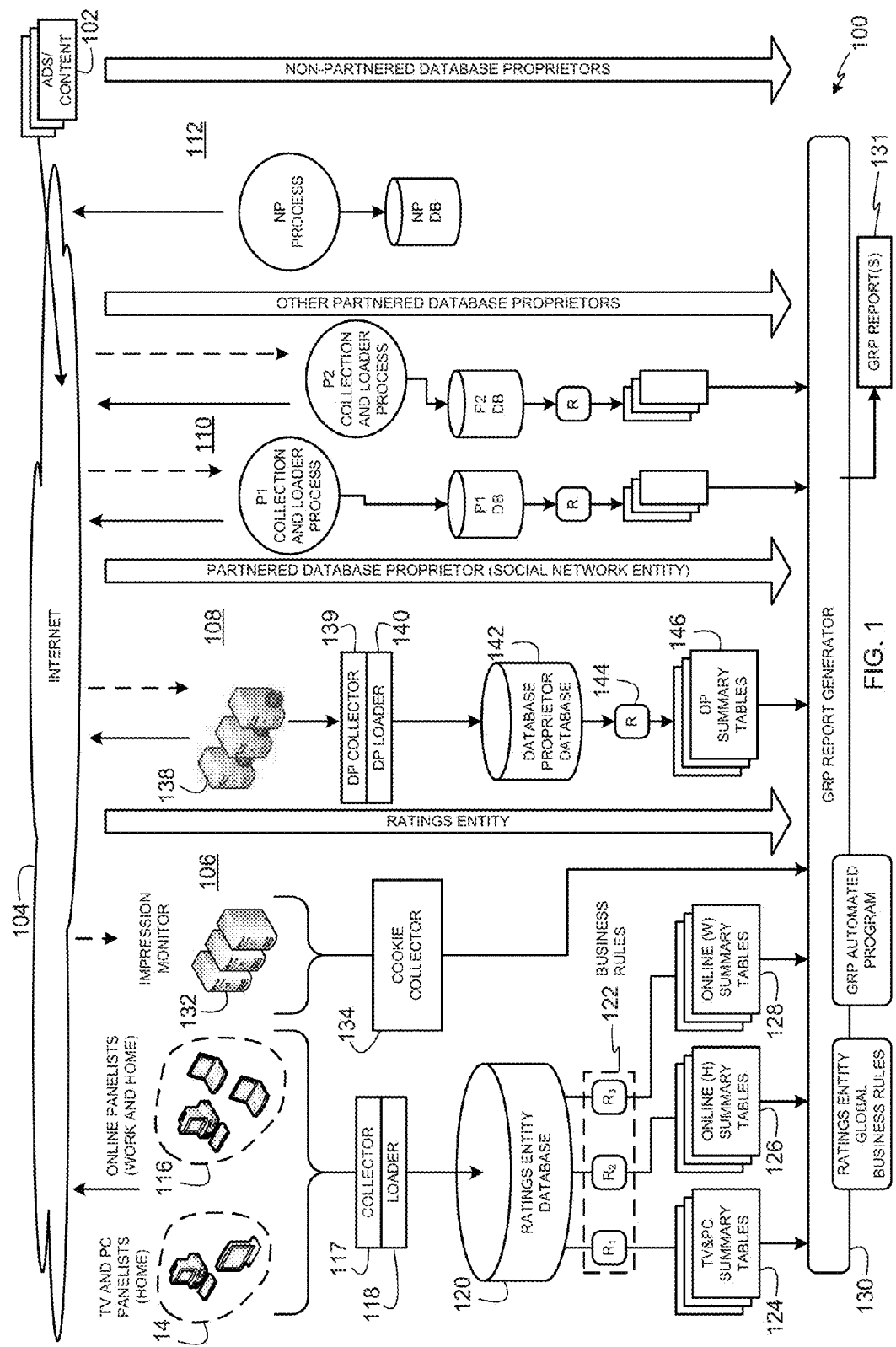
FIG. 1 depicts an example system that may be used to determine advertisement viewership using distributed demographic information.

Techniques for monitoring user access to Internet resources such as web pages, advertisements and/or other media (e.g., audio, video, interactive content, etc.) has evolved significantly over the years. At one point in the past, such monitoring was done primarily through server logs. In particular, entities serving content on the Internet would log the number of requests received for their content at their server. Basing Internet usage research on server logs is problematic for several reasons. For example, server logs can be tampered with either directly or via zombie programs which repeatedly request content from the server to increase the server log counts. Secondly, content is sometimes retrieved once, cached locally and then repeatedly viewed from the local cache without involving the server in the repeat viewings. Server logs cannot track these views of cached content. Thus, server logs are susceptible to both over-counting and under-counting errors.

The inventions disclosed in Blumenau, U.S. Pat. No. 6,108,637, fundamentally changed the way Internet monitoring is performed and overcame the limitations of the server side log monitoring techniques described above. For example, Blumenau disclosed a technique wherein Internet content to be tracked is tagged with beacon instructions. In particular, monitoring instructions are associated with the HTML of the content to be tracked. When a client requests the content, both the content and the beacon instructions are downloaded to the client. The beacon instructions are, thus, executed whenever the content is accessed, be it from a server or from a cache.

The beacon instructions cause monitoring data reflecting information about the access to the content to be sent from the client that downloaded the content to a monitoring entity. Typically, the monitoring entity is an audience measurement entity that did not provide the content to the client and who is a trusted third party for providing accurate usage statistics (e.g., The Nielsen Company, LLC). Advantageously, because the beaconing instructions are associated with the content and executed by the client application whenever the content is accessed, the monitoring information is provided to the audience measurement company irrespective of whether the client is a panelist of the audience measurement company.

It is important, however, to link demographics to the monitoring information. To address this issue, the audience measurement company establishes a panel of users who have agreed to provide their demographic information and to have their Internet browsing activities monitored. When an individual joins the panel, they provide detailed information concerning their identity and demographics (e.g., gender, race, income, home location, occupation, etc.) to the audience measurement company. The audience measurement entity sets a cookie on the panelist client device that enables the audience measurement entity to identify the panelist whenever the panelist accesses tagged content and, thus, sends monitoring information to the audience measurement entity.

Since most of the clients providing monitoring information from the tagged pages are not panelists and, thus, are unknown to the audience measurement entity, it is necessary to use statistical methods to impute demographic information based on the data collected for panelists to the larger population of users providing data for the tagged content. However, panel sizes of audience measurement entities remain small compared to the general population of users. Thus, a problem is presented as to how to increase panel sizes while ensuring the demographics data of the panel is accurate.

There are many database proprietors operating on the Internet. These database proprietors provide services to large numbers of subscribers. In exchange for the provision of the service, the subscribers register with the proprietor. As part of this registration, the subscribers provide detailed demographic information. Examples of such database proprietors include social network providers such as Facebook, Myspace, etc. These database proprietors set cookies on the devices of their subscribers to enable the database proprietor to recognize the user when they visit their website.

The protocols of the Internet make cookies inaccessible outside of the domain (e.g., Internet domain, domain name, etc.) on which they were set. Thus, a cookie set in the amazon.com domain is accessible to servers in the amazon.com domain, but not to servers outside that domain. Therefore, although an audience measurement entity might find it advantageous to access the cookies set by the database proprietors, they are unable to do so.

In view of the foregoing, an audience measurement company would like to leverage the existing databases of database proprietors to collect more extensive Internet usage and demographic data. However, the audience measurement entity is faced with several problems in accomplishing this end. For example, a problem is presented as to how to access the data of the database proprietors without compromising the privacy of the subscribers, the panelists, or the proprietors of the tracked content. Another problem is how to access this data given the technical restrictions imposed by the Internet protocols that prevent the audience measurement entity from accessing cookies set by the database proprietor. Example methods, apparatus and articles of manufacture disclosed herein solve these problems by extending the beaconing process to encompass partnered database proprietors and by using such partners as interim data collectors.

Example methods, apparatus and/or articles of manufacture disclosed herein accomplish this task by responding to beacon requests from clients (who may not be a member of an audience member panel and, thus, may be unknown to the audience member entity) accessing tagged content by redirecting the client from the audience measurement entity to a database proprietor such as a social network site partnered with the audience member entity. The redirection initiates a communication session between the client accessing the tagged content and the database proprietor. The database proprietor (e.g., Facebook) can access any cookie it has set on the client to thereby identify the client based on the internal records of the database proprietor. In the event the client is a subscriber of the database proprietor, the database proprietor logs the content impression in association with the demographics data of the client and subsequently forwards the log to the audience measurement company. In the event the client is not a subscriber of the database proprietor, the database proprietor redirects the client to the audience measurement company. The audience measurement company may then redirect the client to a second, different database proprietor that is partnered with the audience measurement entity. That second proprietor may then attempt to identify the client as explained above. This process of redirecting the client from database proprietor to database proprietor can be performed any number of times until the client is identified and the content exposure logged, or until all partners have been contacted without a successful identification of the client. The redirections all occur automatically so the user of the client is not involved in the various communication sessions and may not even know they are occurring.

The partnered database proprietors provide their logs and demographic information to the audience measurement entity which then compiles the collected data into statistical reports accurately identifying the demographics of persons accessing the tagged content. Because the identification of clients is done with reference to enormous databases of users far beyond the quantity of persons present in a conventional audience measurement panel, the data developed from this process is extremely accurate, reliable and detailed.

Significantly, because the audience measurement entity remains the first leg of the data collection process (e.g., receives the request generated by the beacon instructions from the client), the audience measurement entity is able to obscure the source of the content access being logged as well as the identity of the content itself from the database proprietors (thereby protecting the privacy of the content sources), without compromising the ability of the database proprietors to log impressions for their subscribers. Further, the Internet security cookie protocols are complied with because the only servers that access a given cookie are associated with the Internet domain (e.g., Facebook.com) that set that cookie.

Example methods, apparatus, and articles of manufacture described herein can be used to determine content impressions, advertisement impressions, content exposure, and/or advertisement exposure using demographic information, which is distributed across different databases (e.g., different website owners, service providers, etc.) on the Internet. Not only do example methods, apparatus, and articles of manufacture disclosed herein enable more accurate correlation of Internet advertisement exposure to demographics, but they also effectively extend panel sizes and compositions beyond persons participating in the panel of an audience measurement entity and/or a ratings entity to persons registered in other Internet databases such as the databases of social medium sites such as Facebook, Twitter, Google, etc. This extension effectively leverages the content tagging capabilities of the ratings entity and the use of databases of non-ratings entities such as social media and other websites to create an enormous, demographically accurate panel that results in accurate, reliable measurements of exposures to Internet content such as advertising and/or programming.

In illustrated examples disclosed herein, advertisement exposure is measured in terms of online Gross Rating Points. A Gross Rating Point (GRP) is a unit of measurement of audience size that has traditionally been used in the television ratings context. It is used to measure exposure to one or more programs, advertisements, or commercials, without regard to multiple exposures of the same advertising to individuals. In terms of television (TV) advertisements, one GRP is equal to 1% of TV households. While GRPs have traditionally been used as a measure of television viewership, example methods, apparatus, and articles of manufacture disclosed herein develop online GRPs for online advertising to provide a standardized metric that can be used across the Internet to accurately reflect online advertisement exposure. Such standardized online GRP measurements can provide greater certainty to advertisers that their online advertisement money is well spent. It can also facilitate cross-medium comparisons such as viewership of TV advertisements and online advertisements. Because the example methods, apparatus, and/or articles of manufacture disclosed herein associate viewership measurements with corresponding demographics of users, the information collected by example methods, apparatus, and/or articles of manufacture disclosed herein may also be used by advertisers to identify markets reached by their advertisements and/or to target particular markets with future advertisements.

Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. Unlike traditional techniques in which audience measurement entities rely solely on their own panel member data to collect demographics-based audience measurement, example methods, apparatus, and/or articles of manufacture disclosed herein enable an audience measurement entity to share demographic information with other entities that operate based on user registration models. As used herein, a user registration model is a model in which users subscribe to services of those entities by creating an account and providing demographic-related information about themselves. Sharing of demographic information associated with registered users of database proprietors enables an audience measurement entity to extend or supplement their panel data with substantially reliable demographics information from external sources (e.g., database proprietors), thus extending the coverage, accuracy, and/or completeness of their demographics-based audience measurements. Such access also enables the audience measurement entity to monitor persons who would not otherwise have joined an audience measurement panel. Any entity having a database identifying demographics of a set of individuals may cooperate with the audience measurement entity. Such entities may be referred to as "database proprietors" and include entities such as Facebook, Google, Yahoo!, MSN, Twitter, Apple iTunes, Experian, etc.

Example methods, apparatus, and/or articles of manufacture disclosed herein may be implemented by an audience measurement entity (e.g., any entity interested in measuring or tracking audience exposures to advertisements, content, and/or any other media) in cooperation with any number of database proprietors such as online web services providers to develop online GRPs. Such database proprietors/online web services providers may be social network sites (e.g., Facebook, Twitter, MySpace, etc.), multi-service sites (e.g., Yahoo!, Google, Experian, etc.), online retailer sites (e.g., Amazon.com, Buy.com, etc.), and/or any other web service(s) site that maintains user registration records.

To increase the likelihood that measured viewership is accurately attributed to the correct demographics, example methods, apparatus, and/or articles of manufacture disclosed herein use demographic information located in the audience measurement entity's records as well as demographic information located at one or more database proprietors (e.g., web service providers) that maintain records or profiles of users having accounts therewith. In this manner, example methods, apparatus, and/or articles of manufacture disclosed herein may be used to supplement demographic information maintained by a ratings entity (e.g., an audience measurement company such as The Nielsen Company of Schaumburg, Ill., United States of America, that collects media exposure measurements and/or demographics) with demographic information from one or more different database proprietors (e.g., web service providers).

The use of demographic information from disparate data sources (e.g., high-quality demographic information from the panels of an audience measurement company and/or registered user data of web service providers) results in improved reporting effectiveness of metrics for both online and offline advertising campaigns. Example techniques disclosed herein use online registration data to identify demographics of users and use server impression counts, tagging (also referred to as beaconing), and/or other techniques to track quantities of impressions attributable to those users. Online web service providers such as social networking sites (e.g., Facebook) and multi-service providers (e.g., Yahoo!, Google, Experian, etc.) (collectively and individually referred to herein as online database proprietors) maintain detailed demographic information (e.g., age, gender, geographic location, race, income level, education level, religion, etc.) collected via user registration processes. As used herein, an impression is defined to be an event in which a home or individual is exposed to media (e.g., an advertisement, content, a group of advertisements and/or a collection of content). In Internet advertising, a quantity of impressions or impression count is the total number of times media (e.g., content, an advertisement and/or an advertisement campaign) has been accessed by a web population (e.g., the number of times the media is accessed). As used herein, a demographic impression is defined to be an impression that is associated with a characteristic (e.g., a demographic characteristic) of the person exposed to the media.

Example methods, apparatus, and/or articles of manufacture disclosed herein also enable reporting TV GRPs and online GRPs in a side-by-side manner. For instance, techniques disclosed herein enable advertisers to report quantities of unique people or users that are reached individually and/or collectively by TV and/or online advertisements.

Example methods, apparatus, and/or articles of manufacture disclosed herein also collect impressions mapped to demographics data at various locations on the Internet. For example, an audience measurement entity collects impression data for its panel and automatically enlists one or more online demographics proprietors to collect impression data for their subscribers. By combining this collected impression data, the audience measurement entity can then generate demographic impression data and GRP metrics for different advertisement campaigns. These GRP metrics can be correlated or otherwise associated with particular demographic segments and/or markets that were reached.

Example methods and apparatus disclosed herein determine audience demographics for media being presented over periods of time, such as videos or audio. Because not all of the users who begin watching the video will watch the entire video, for example, the demographics of an audience for the first minute of a 30 minute video presented via the Internet may be different than the demographics of the audience for the 25th minute of the video.

Example methods and apparatus disclosed herein measure demographics for media occurring over a period of time by providing instructions to a client application (e.g., a web browser, an app, etc.) executing on a client computing device when media is loaded at the web browser. In some examples, the instructions cause the web browser to transmit a request (e.g., a pingback message) to an impression monitoring server at regular and/or irregular intervals (e.g., every minute, every 30 seconds, every 2 minutes, etc.). The example impression monitoring server identifies the requests from the web browser and, in combination with one or more database proprietors, matches the impression information for the media with demographics of the user of the web browser.

In an example, a user loads a web page from a web site publisher, in which the web page corresponds to a particular 60 minute video. As a part of or in addition to the example web page, the publisher provides beacon instructions and/or causes the web browser to make a pingback message to a beacon server. When the beacon instructions are loaded by the example web browser, the beacon instructions cause the web browser to issue pingback messages (e.g., HTTP requests, pings) to the impression monitoring server at designated intervals, such as once every minute. The example beacon instructions (or a redirect message from, for example, the impression monitoring server or a database proprietor) further cause the web browser to issue pingback messages to one or more database proprietors that collect and/or maintain demographic information about users. The database proprietor transmits demographic information about the user associated with the web browser for combination with the impression determined by the impression monitoring server. If the user closes the web page containing the video before the end of the video, the beacon instructions are stopped, and the web browser stops issuing the pingback messages to the impression monitoring server. By determining a number and/or content of the pingback messages received, the example impression monitor can determine that the user watched a particular length of the video.

Example methods and apparatus disclosed herein match impressions and/or duration impressions (e.g., impression information for a time period derived from a set of logged impressions) for the media at web browsers (e.g., the time period(s) in the media to which users were exposed via the web browsers) to the demographic information collected via the database proprietor. By matching the impressions and/or duration impressions to the demographics, example methods and apparatus disclosed herein determine demographic impression characteristics of the minute-by-minute audience (or period-by-period, where the period may be any length of time) of the video (e.g., the audience for the first minute, the audience for the second minute, etc.).

In some examples, the web page enables the user to skip to particular parts of the video (e.g., to pick up where they left off earlier). On detecting a jump request, the example beacon instructions cause the web browser to issue a request to the impression monitoring server including a time at which the jump request was made and a time relative to the video to which the user jumped the video. On receiving the requests, the example impression monitoring server determines the times at which the user watched the media. Thus, for example, the impression monitoring server may determine that a user watched the last 15 minutes of a video rather than the first 15 minutes of the video, or that the user watched intermittent portions or subsets of the video.

Example methods, apparatus, and articles of manufacture disclosed herein are described using cookies for storing information locally on a client device and/or providing such stored information to another party or device. However, example methods, apparatus, and articles of manufacture disclosed herein may additionally or alternatively utilize alternatives to cookies for storing and/or communicating the information. Examples of such alternatives include web storage, document object model (DOM) storage, local shared objects (also referred to as "Flash cookies"), media identifiers (e.g., iOS ad IDs), user identifiers (e.g., Apple user IDs, iCloud user IDs, Android user IDs), and/or device identifiers (Apple device IDs, Android device IDs, device serial numbers, media access control (MAC) addresses, etc.).

FIG. 1 depicts an example system 100 that may be used to determine media exposure (e.g., exposure to content and/or advertisements) based on demographic information collected by one or more database proprietors. "Distributed demographics information" is used herein to refer to demographics information obtained from at least two sources, at least one of which is a database proprietor such as an online web services provider. In the illustrated example, content providers and/or advertisers distribute advertisements 102 via the Internet 104 to users that access websites and/or online television services (e.g., web-based TV, Internet protocol TV (IPTV), etc.). The advertisements 102 may additionally or alternatively be distributed through broadcast television services to traditional non-Internet based (e.g., RF, terrestrial or satellite based) television sets and monitored for viewership using the techniques described herein and/or other techniques. Websites, movies, television and/or other programming is generally referred to herein as content. Advertisements are typically distributed with content. Traditionally, content is provided at little or no cost to the audience because it is subsidized by advertisers why pay to have their advertisements distributed with the content.

In the illustrated example, the advertisements 102 may form one or more ad campaigns and are encoded with identification codes (e.g., metadata) that identify the associated ad campaign (e.g., campaign ID), a creative type ID (e.g., identifying a Flash-based ad, a banner ad, a rich type ad, etc.), a source ID (e.g., identifying the ad publisher), and a placement ID (e.g., identifying the physical placement of the ad on a screen). The advertisements 102 are also tagged or encoded to include computer executable beacon instructions (e.g., Java, Javascript, or any other computer language or script) that are executed by web browsers that access the advertisements 102 on, for example, the Internet. Computer executable beacon instructions may additionally or alternatively be associated with content to be monitored. Thus, although this disclosure frequently speaks in the area of tracking advertisements, it is not restricted to tracking any particular type of media. On the contrary, it can be used to track content or advertisements of any type or form in a network. Irrespective of the type of content being tracked, execution of the beacon instructions causes the web browser to send one or more impression requests (e.g., referred to herein as beacon requests) to a specified server (e.g., the audience measurement entity). The beacon request may be implemented as an HTTP request. However, whereas a transmitted HTML request identifies a webpage or other resource to be downloaded, the beacon request includes the audience measurement information (e.g., ad campaign identification, content identifier, user identification information, timestamp, and/or jump location in the media) as its payload. The server to which the beacon request is directed is programmed to log the audience measurement data of the beacon request as an impression (e.g., an ad and/or content impressions depending on the nature of the media tagged with the beaconing instruction). For example, for static types of media such as banner advertisements, the impression may include a single impression count. In contrast, for dynamic types of media such as audio, video, and/or interactive media, a duration impression may include an impression associated with one or more period(s) of time corresponding to all or portion(s) (e.g., subset(s)) of the media.

In some example implementations, advertisements tagged with such beacon instructions may be distributed with Internet-based media content including, for example, web pages, streaming video, streaming audio, IPTV content, etc. and used to collect demographics-based impression data. As noted above, methods, apparatus, and/or articles of manufacture disclosed herein are not limited to advertisement monitoring but can be adapted to any type of content monitoring (e.g., web pages, movies, television programs, etc.). Example techniques that may be used to implement such beacon instructions are disclosed in Blumenau, U.S. Pat. No. 6,108,637, which is hereby incorporated herein by reference in its entirety.

Although example methods, apparatus, and/or articles of manufacture are described herein as using beacon instructions executed by web browsers to send beacon requests to specified impression collection servers, the example methods, apparatus, and/or articles of manufacture may additionally collect data with on-device meter systems that locally collect web browsing information without relying on content or advertisements encoded or tagged with beacon instructions. In such examples, locally collected web browsing behavior may subsequently be correlated with user demographic data based on user IDs as disclosed herein.

The example system 100 of FIG. 1 includes a ratings entity subsystem 106, a partner database proprietor subsystem 108 (implemented in this example by a social network service provider), other partnered database proprietor (e.g., web service provider) subsystems 110, and non-partnered database proprietor (e.g., web service provider) subsystems 112. In the illustrated example, the ratings entity subsystem 106 and the partnered database proprietor subsystems 108, 110 correspond to partnered business entities that have agreed to share demographic information and to capture impressions in response to redirected beacon requests as explained below. The partnered business entities may participate to advantageously have the accuracy and/or completeness of their respective demographic information confirmed and/or increased. The partnered business entities also participate in reporting impressions that occurred on their websites. In the illustrated example, the other partnered database proprietor subsystems 110 include components, software, hardware, and/or processes similar or identical to the partnered database proprietor subsystem 108 to collect and log impressions (e.g., advertisement and/or content impressions) and associate demographic information with such logged impressions.

The non-partnered database proprietor subsystems 112 correspond to business entities that do not participate in sharing of demographic information. However, the techniques disclosed herein do track impressions (e.g., advertising impressions and/or content impressions) attributable to the non-partnered database proprietor subsystems 112, and in some instances, one or more of the non-partnered database proprietor subsystems 112 also report unique user IDs (UUIDs) attributable to different impressions. Unique user IDs can be used to identify demographics using demographics information maintained by the partnered business entities (e.g., the ratings entity subsystem 106 and/or the database proprietor subsystems 108, 110).

The database proprietor subsystem 108 of the example of FIG. 1 is implemented by a social network proprietor such as Facebook. However, the database proprietor subsystem 108 may instead be operated by any other type of entity such as a web services entity that serves desktop/stationary computer users and/or mobile device users. In the illustrated example, the database proprietor subsystem 108 is in a first internet domain, and the partnered database proprietor subsystems 110 and/or the non-partnered database proprietor subsystems 112 are in second, third, fourth, etc. internet domains.

In the illustrated example of FIG. 1, the tracked content and/or advertisements 102 are presented to TV and/or PC (computer) panelists 114 and online only panelists 116. The panelists 114 and 116 are users registered on panels maintained by a ratings entity (e.g., an audience measurement company) that owns and/or operates the ratings entity subsystem 106. In the example of FIG. 1, the TV and PC panelists 114 include users and/or homes that are monitored for exposures to the content and/or advertisements 102 on TVs and/or computers. The online only panelists 116 include users that are monitored for exposure (e.g., content exposure and/or advertisement exposure) via online sources when at work or home. In some example implementations, TV and/or PC panelists 114 may be home-centric users (e.g., home-makers, students, adolescents, children, etc.), while online only panelists 116 may be business-centric users that are commonly connected to work-provided Internet services via office computers or mobile devices (e.g., mobile phones, smartphones, laptops, tablet computers, etc.).

To collect exposure measurements (e.g., content impressions and/or advertisement impressions) generated by meters at client devices (e.g., computers, mobile phones, smartphones, laptops, tablet computers, TVs, etc.), the ratings entity subsystem 106 includes a ratings entity collector 117 and loader 118 to perform collection and loading processes. The ratings entity collector 117 and loader 118 collect and store the collected exposure measurements obtained via the panelists 114 and 116 in a ratings entity database 120. The ratings entity subsystem 106 then processes and filters the exposure measurements based on business rules 122 and organizes the processed exposure measurements into TV&PC summary tables 124, online home (H) summary tables 126, and online work (W) summary tables 128. In the illustrated example, the summary tables 124, 126, and 128 are sent to a GRP report generator 130, which generates one or more GRP report(s) 131 to sell or otherwise provide to advertisers, publishers, manufacturers, content providers, and/or any other entity interested in such market research.

In the illustrated example of FIG. 1, the ratings entity subsystem 106 is provided with an impression monitor 132 that is configured to track exposure quantities (e.g., content impressions and/or advertisement impressions) corresponding to content and/or advertisements presented by client devices (e.g., web browsers executing on a computing device such as a personal computer, tablet computer, laptop or notebook computer, mobile device, game console, smart television, Internet appliance, and/or any other Internet-connected computing device, applications or "apps" such as applications downloaded from an "app store," or any other types of client devices) whether received from remote web servers or retrieved from local caches of the client devices. In some example implementations, the impression monitor 132 may be implemented using the SiteCensus system owned and operated by The Nielsen Company. In the illustrated example, identities of users associated with the exposure quantities are collected using cookies (e.g., Universally Unique Identifiers (UUIDs)) tracked by the impression monitor 132 when client devices present content and/or advertisements. Due to Internet security protocols, the impression monitor 132 can only collect cookies set in its domain. Thus, if, for example, the impression monitor 132 operates in the "Nielsen.com" domain, it can only collect cookies set by a Nielsen.com server. Thus, when the impression monitor 132 receives a beacon request from a given client, the impression monitor 132 only has access to cookies set on that client by a server in the, for example, Nielsen.com domain. To overcome this limitation, the impression monitor 132 of the illustrated example is structured to forward beacon requests to one or more database proprietors partnered with the audience measurement entity. Those one or more partners can recognize cookies set in their domain (e.g., Facebook.com) and therefore log impressions in association with the subscribers associated with the recognized cookies. This process is explained further below.

In the illustrated example, the ratings entity subsystem 106 includes a ratings entity cookie collector 134 to collect cookie information (e.g., user ID information) together with content IDs and/or ad IDs associated with the cookies from the impression monitor 132 and send the collected information to the GRP report generator 130. Again, the cookies collected by the impression monitor 132 are those set by server(s) operating in a domain of the audience measurement entity. In some examples, the ratings entity cookie collector 134 is configured to collect logged impressions (e.g., based on cookie information and ad or content IDs) from the impression monitor 132 and provide the logged impressions to the GRP report generator 130.

Figure 2:
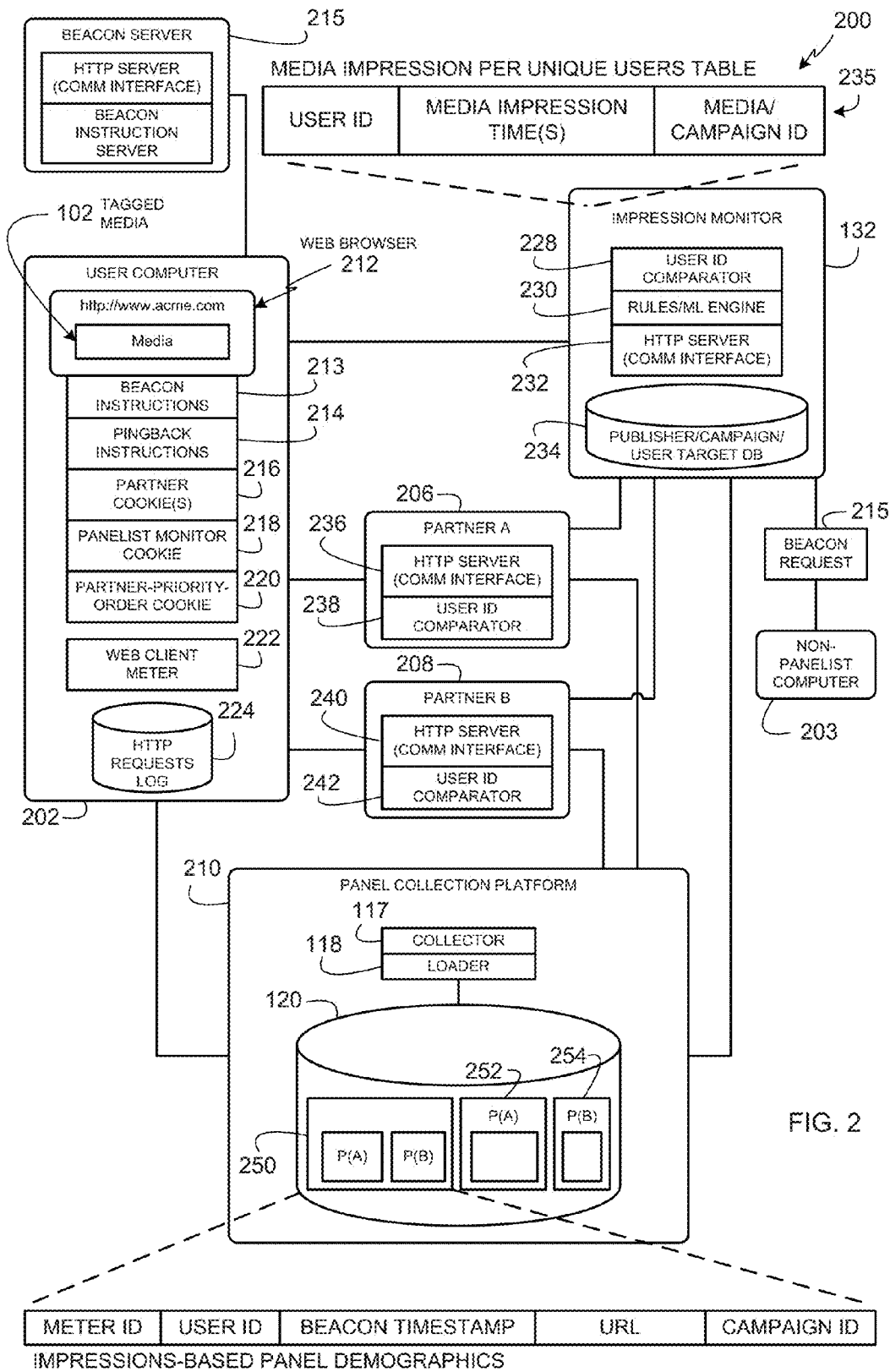
FIG. 2 depicts an example system that may be used to associate media exposure measurements with user demographic information based on demographics information distributed across user account records of different web service providers.
Figure 3:
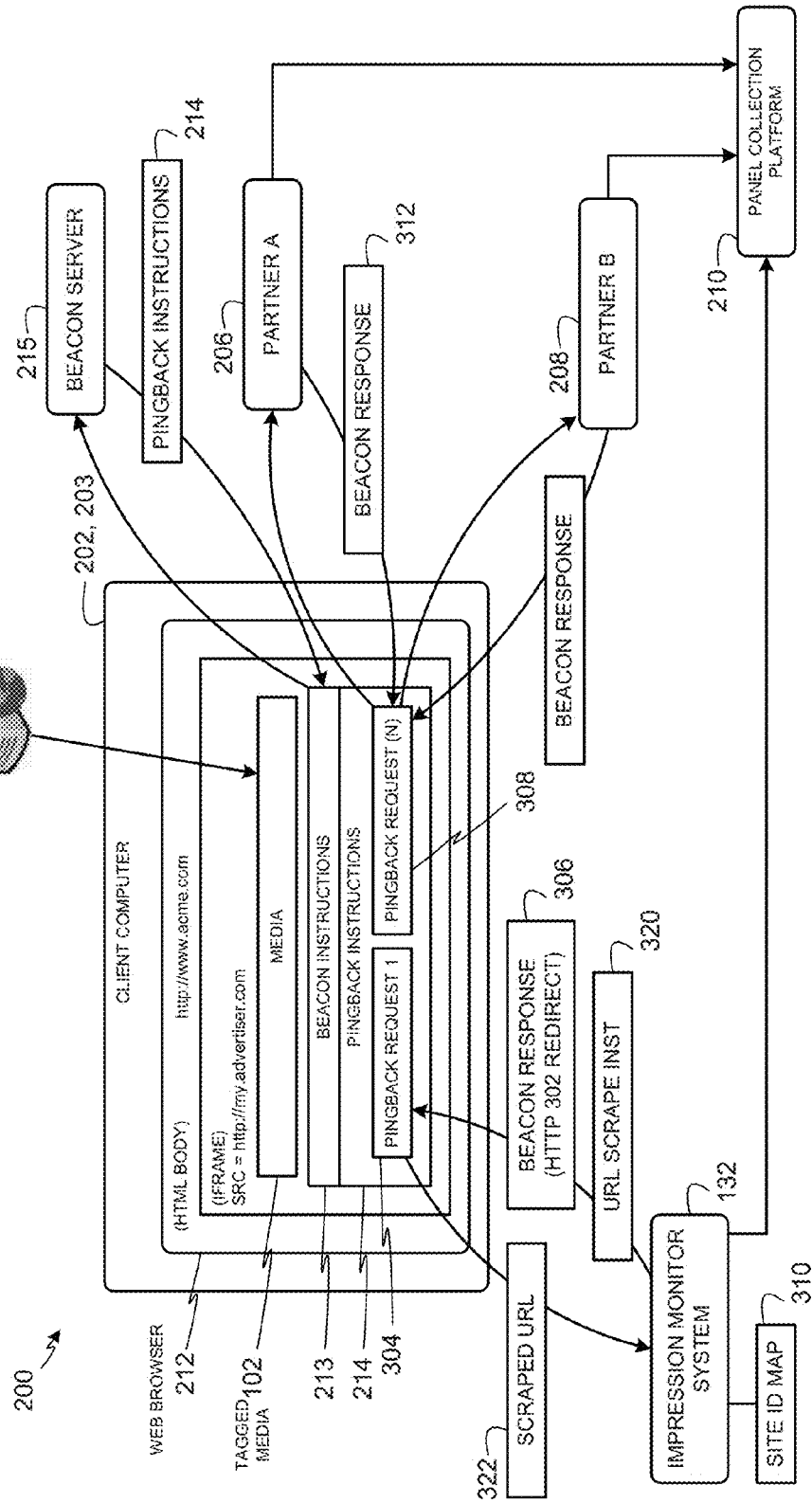
FIG. 3 is a communication flow diagram of an example manner in which a client application can report impressions to servers having access to demographic information for a user of that client application.

The operation of the impression monitor 132 in connection with client devices and partner sites is described below in connection with FIGS. 2 and 3. In particular, FIGS. 2 and 3 depict how the impression monitor 132 enables collecting user identities and tracking exposure quantities for content and/or advertisements exposed to those users. The collected data can be used to determine information about, for example, the effectiveness of advertisement campaigns.

For purposes of example, the following example involves a social network provider, such as Facebook, as the database proprietor. In the illustrated example, the database proprietor subsystem 108 includes servers 138 to store user registration information, perform web server processes to serve web pages (possibly, but not necessarily including one or more advertisements) to subscribers of the social network, to track user activity, and to track account characteristics. During account creation, the database proprietor subsystem 108 asks users to provide demographic information such as age, gender, geographic location, graduation year, quantity of group associations, and/or any other personal or demographic information. To automatically identify users on return visits to the webpage(s) of the social network entity, the servers 138 set cookies on client devices (e.g., computers and/or mobile devices of registered users, some of which may be panelists 114 and 116 of the audience measurement entity and/or may not be panelists of the audience measurement entity). The cookies may be used to identify users to track user visits to the webpages of the social network entity, to display those web pages according to the preferences of the users, etc. The cookies set by the database proprietor subsystem 108 may also be used to collect "domain specific" user activity. As used herein, "domain specific" user activity is user Internet activity occurring within the domain(s) of a single entity. Domain specific user activity may also be referred to as "intra-domain activity." The social network entity may collect intra-domain activity such as the number of web pages (e.g., web pages of the social network domain such as other social network member pages or other intra-domain pages) visited by each registered user and/or the types of devices such as mobile (e.g., smartphones) or stationary (e.g., desktop computers) devices used for such access. The servers 138 are also configured to track account characteristics such as the quantity of social connections (e.g., friends) maintained by each registered user, the quantity of pictures posted by each registered user, the quantity of messages sent or received by each registered user, and/or any other characteristic of user accounts.

The database proprietor subsystem 108 includes a database proprietor (DP) collector 139 and a DP loader 140 to collect user registration data (e.g., demographic data), intra-domain user activity data, inter-domain user activity data (as explained later) and account characteristics data. The collected information is stored in a database proprietor database 142. The database proprietor subsystem 108 processes the collected data using business rules 144 to create DP summary tables 146.

In the illustrated example, the other partnered database proprietor subsystems 110 may share with the audience measurement entity similar types of information as that shared by the database proprietor subsystem 108. In this manner, demographic information of people that are not registered users of the social network services provider may be obtained from one or more of the other partnered database proprietor subsystems 110 if they are registered users of those web service providers (e.g., Yahoo!, Google, Experian, etc.). Example methods, apparatus, and/or articles of manufacture disclosed herein advantageously use this cooperation or sharing of demographic information across website domains to increase the accuracy and/or completeness of demographic information available to the audience measurement entity. By using the shared demographic data in such a combined manner with information identifying the content and/or ads 102 to which users are exposed, example methods, apparatus, and/or articles of manufacture disclosed herein produce more accurate exposure-per-demographic results to enable a determination of meaningful and consistent GRPs for online advertisements.

As the system 100 expands, more partnered participants (e.g., like the partnered database proprietor subsystems 110) may join to share further distributed demographic information and advertisement viewership information for generating GRPs.

To preserve user privacy, the example methods, apparatus, and/or articles of manufacture described herein use double encryption techniques by each participating partner or entity (e.g., the subsystems 106, 108, 110) so that user identities are not revealed when sharing demographic and/or viewership information between the participating partners or entities. In this manner, user privacy is not compromised by the sharing of the demographic information as the entity receiving the demographic information is unable to identify the individual associated with the received demographic information unless those individuals have already consented to allow access to their information by, for example, previously joining a panel or services of the receiving entity (e.g., the audience measurement entity). If the individual is already in the receiving party's database, the receiving party will be able to identify the individual despite the encryption. However, the individual has already agreed to be in the receiving party's database, so consent to allow access to their demographic and behavioral information has previously already been received.

FIG. 2 depicts an example system 200 that may be used to associate exposure measurements with user demographic information based on demographics information distributed across user account records of different database proprietors (e.g., web service providers). The example system 200 enables the ratings entity subsystem 106 of FIG. 1 to locate a best-fit partner (e.g., the database proprietor subsystem 108 of FIG. 1 and/or one of the other partnered database proprietor subsystems 110 of FIG. 1) for each beacon request (e.g., a request from a client executing a tag associated with tagged media such as an advertisement or content that contains data identifying the media to enable an entity to log an exposure or impression). In some examples, the example system 200 uses rules and machine learning classifiers (e.g., based on an evolving set of empirical data) to determine a relatively best-suited partner that is likely to have demographics information for a user that triggered a beacon request. The rules may be applied based on a publisher level, a campaign/publisher level, or a user level. In some examples, machine learning is not employed and instead, the partners are contacted in some ordered fashion (e.g., Facebook, Myspace, then Yahoo!, etc.) until the user associated with a beacon request is identified or all partners are exhausted without an identification.

The ratings entity subsystem 106 receives and compiles the impression data from all available partners. The ratings entity subsystem 106 may weight the impression data based on the overall reach and demographic quality of the partner sourcing the data. For example, the ratings entity subsystem 106 may refer to historical data on the accuracy of a partner's demographic data to assign a weight to the logged data provided by that partner.

For rules applied at a publisher level, a set of rules and classifiers are defined that allow the ratings entity subsystem 106 to target the most appropriate partner for a particular publisher (e.g., a publisher of one or more of the advertisements or content 102 of FIG. 1). For example, the ratings entity subsystem 106 could use the demographic composition of the publisher and partner web service providers to select the partner most likely to have an appropriate user base (e.g., registered users that are likely to access content for the corresponding publisher).

For rules applied at a campaign level, for instances in which a publisher has the ability to target an ad campaign based on user demographics, the target partner site could be defined at the publisher/campaign level. For example, if an ad campaign is targeted at males aged between the ages of 18 and 25, the ratings entity subsystem 106 could use this information to direct a request to the partner most likely to have the largest reach within that gender/age group (e.g., a database proprietor that maintains a sports website, etc.).

For rules applied at the user level (or cookie level), the ratings entity subsystem 106 can dynamically select a preferred partner to identify the client and log the impression based on, for example, (1) feedback received from partners (e.g., feedback indicating that panelist user IDs did not match registered users of the partner site or indicating that the partner site does not have a sufficient number of registered users), and/or (2) user behavior (e.g., user browsing behavior may indicate that certain users are unlikely to have registered accounts with particular partner sites). In the illustrated example of FIG. 2, rules may be used to specify when to override a user level preferred partner with a publisher (or publisher campaign) level partner target.

Turning in detail to FIG. 2, a user device 202 represents a client device used by one or more of the panelists 114 and 116 of FIG. 1. As shown in the example of FIG. 2, the user device 202 may exchange communications with the impression monitor 132 of FIG. 1. In the illustrated example, a partner A 206 may be the database proprietor subsystem 108 of FIG. 1 and a partner B 208 may be one of the other partnered database proprietor subsystems 110 of FIG. 1. A panel collection platform 210 contains the ratings entity database 120 of FIG. 1 to collect ad and/or content exposure data (e.g., impression data or content impression data). Interim collection platforms are likely located at the partner A 206 and partner B 208 sites to store logged impressions, at least until the data is transferred to the audience measurement entity.

The user device 202 of the illustrated example executes a client application 212 that is directed to a host website (e.g., www.acme.com) that displays media 102 (e.g., audio, video, interactive media, streaming media, etc.). The media 102 (e.g., advertisements and/or content) is tagged with identifier information (e.g., a media ID, a creative type ID, a placement ID, a publisher source URL, etc.) and a beacon instruction 213. The example beacon instruction 213 causes the client application 212 to request repeated pingback instructions 214 (also referred to herein as pingback instructions) from a beacon server 215. The example client application 212 transmits a request including an identification of the media 102 to the beacon server 215, which generates and returns repeated pingback instructions 214 to the example panelist client device 202. In some examples, the beacon instructions 213 received with the tagged media 102 include the repeated pingback instructions 214.

When the repeated pingback instructions 214 are executed by the user client device 202, the repeated pingback instructions 214 cause the user client device 202 to send beacon requests (e.g., at designated intervals) to a remote server specified in the repeated pingback instructions 214. In the illustrated example, the specified server is a server of the audience measurement entity, namely, at the impression monitor 132. The repeated pingback instructions 214 may be implemented using Javascript or any other types of instructions or script executable via a client application (e.g., a web browser) including, for example, Java, HTML, etc. It should be noted that tagged webpages and/or advertisements are processed the same way by panelist and non-panelist client devices. In both systems, the repeated pingback instructions 214 are received in connection with the download of the tagged media 102 and cause a beacon request to be sent from the client (e.g., the user client device 202) that downloaded the tagged media 102 for the audience measurement entity. A non-panelist client device is shown at reference number 203. Although the client device 203 is not a panelist 114, 116, the impression monitor 132 may interact with the client 203 in the same manner as the impression monitor 132 interacts with the user client device 202, associated with one of the panelists 114, 116. As shown in FIG. 2, the non-panelist client device 203 also sends a beacon request 215 based on tagged content downloaded and presented on the non-panelist client device 203. As a result, in the following description user client device 202 and non-panelist client device 203 are referred to generically as a "client device."

In some examples, the client application 212 determines whether an impression qualification period has been achieved (e.g., a minimum viewing period) prior to sending a first pingback. The time duration (e.g., length) of the impression qualification period (e.g., the minimum period of viewing time) may be configurable based on, for example, characteristics of the tagged media (e.g., the length of the tagged media, the expected demographics of the viewers of the tagged media, etc.) and/or the preferences or requirements of the media publisher (e.g., the publisher does not consider the tagged media to effectively provide an impression until a certain length of the media has been viewed).

In the illustrated example, the client application 212 stores one or more partner cookie(s) 216 and a panelist monitor cookie 218. Each partner cookie 216 corresponds to a respective partner (e.g., the partners A 206 and B 208) and can be used only by the respective partner to identify a user of the user client device 202. The panelist monitor cookie 218 is a cookie set by the impression monitor 132 and identifies the user of the user client device 202 to the impression monitor 132. Each of the partner cookies 216 is created, set, or otherwise initialized in the user client device 202 when a user of the client device first visits a website of a corresponding partner (e.g., one of the partners A 206 and B 208) and/or when a user of the client device registers with the partner (e.g., sets up a Facebook account). If the user has a registered account with the corresponding partner, the user ID (e.g., an email address or other value) of the user is mapped to the corresponding partner cookie 216 in the records of the corresponding partner. The panelist monitor cookie 218 is created when the client (e.g., a panelist client device or a non-panelist client device) registers for the panel and/or when the client processes tagged media (e.g., content or advertisement). The panelist monitor cookie 218 of the user client device 202 may be set when the user registers as a panelist and is mapped to a user ID (e.g., an email address or other value) of the user in the records of the ratings entity. Although the non-panelist client device 203 is not part of a panel, a panelist monitor cookie similar to the panelist monitor cookie 218 is created in the non-panelist client device 203 when the non-panelist client device 203 processes tagged media. In this manner, the impression monitor 132 may collect impressions (e.g., ad impressions) associated with the non-panelist client device 203 even though a user of the non-panelist client device 203 is not registered in a panel and the ratings entity operating the impression monitor 132 will not have demographics for the user of the non-panelist client device 203.

In some examples, the client application 212 may also include a partner-priority-order cookie 220 that is set, adjusted, and/or controlled by the impression monitor 132 and includes a priority listing of the partners 206 and 208 (and/or other database proprietors) indicative of an order in which beacon requests and/or pingback messages should be sent to the partners 206, 208 and/or other database proprietors. For example, the impression monitor 132 may specify that the client device 202, 203 should first send beacon requests and/or pingback messages based on execution of the repeated pingback instructions 214 to partner A 206 and then to partner B 208 if partner A 206 indicates that the user of the client device 202, 203 is not a registered user of partner A 206. In this manner, the client device 202, 203 can use the repeated pingback instructions 214 in combination with the priority listing of the partner-priority-order cookie 220 to send an initial beacon request and/or pingback message to an initial partner and/or other initial database proprietor and one or more re-directed beacon requests and/or pingback messages to one or more secondary partners and/or other database proprietors until one of the partners 206 and 208 and/or other database proprietors confirms that the user of the user client device 202 is a registered user of the partner's or other database proprietor's services and is able to log an impression (e.g., a media impression, etc.) and provide demographic information for that user (e.g., demographic information stored in the database proprietor database 142 of FIG. 1), or until all partners have been tried without a successful match. In other examples, the partner-priority-order cookie 220 may be omitted and the beacon instructions 213 and/or repeated pingback instructions 214 may be configured to cause the client device 202, 203 to unconditionally send beacon requests and/or pingback messages to all available partners and/or other database proprietors so that all of the partners and/or other database proprietors have an opportunity to log an impression. In yet other examples, the repeated pingback instructions 214 may be configured to cause the client device 202, 203 to receive instructions from the impression monitor 132 on an order in which to send redirected beacon requests to one or more partners and/or other database proprietors.

In some examples in which an alternative to cookies are used (e.g., web storage, document object model (DOM) storage, local shared objects (also referred to as "Flash cookies"), media identifiers (e.g., iOS ad IDs), user identifiers (e.g., Apple user IDs, iCloud user IDs, Android user IDs), and/or device identifiers (Apple device IDs, Android device IDs, device serial numbers, media access control (MAC) addresses, etc.), the example client device 202, 203, the example beacon instructions 214, the example partners 206, 208, and/or the example impression monitor 132 cause the client device 202, 203 to store alternative data and/or to store data using an alternative format. For example, if the example system 200 utilizes web storage or DOM storage, the example beacon instructions 214 include scripting (e.g., Javascript) to cause the client device 202, 203 to store information such as a unique device identifier and/or to transmit stored information such as the unique device identifier to the impression monitor 132. Because local shared objects are similar to cookies, the example beacon instructions 214, the example partners 206, 208, the example impression monitor 132, and/or the example system 200 may be implemented in a manner similar to that described above using cookies. In examples in which media identifiers, user identifiers, and/or device identifiers are used, the example beacon instructions 214 may include an instruction to cause the client device 202, 203 to transmit a unique media identifier, user identifier, and/or device identifier of the client device 202, 203 to the example impression monitor 132. The example impression monitor 132 and/or the example partners 206 and/or 208 may use the non-cookie identifier to log the impression information and/or determine demographic information associated with the client device.

To monitor browsing behavior and track activity of the partner cookie(s) 216, the user client device 202 is provided with a web client meter 222. In addition, the user client device 202 is provided with an HTTP request log 224 in which the web client meter 222 may store or log HTTP requests in association with a meter ID of the web client meter 222, user IDs originating from the user client device 202, beacon request timestamps (e.g., timestamps indicating when the user client device 202 sent beacon requests such as the beacon requests 304 and 308 of FIG. 3), uniform resource locators (URLs) of websites that displayed advertisements, ad campaign IDs, and/or pingback messages. In the illustrated example, the web client meter 222 stores user IDs of the partner cookie(s) 216 and the panelist monitor cookie 218 in association with each logged HTTP request in the HTTP requests log 224. In some examples, the HTTP requests log 224 can additionally or alternatively store other types of requests such as file transfer protocol (FTP) requests and/or any other internet protocol requests. The web client meter 222 of the illustrated example can communicate such web browsing behavior or activity data in association with respective user IDs from the HTTP requests log 224 to the panel collection platform 210. In some examples, the web client meter 222 may also be advantageously used to log impressions for untagged content or advertisements. Unlike tagged advertisements and/or tagged content that include the beacon instructions 213 and/or repeated pingback instructions 214 causing a beacon request to be sent to the impression monitor 132 (and/or one or more of the partners 206, 208 and/or other database proprietors) identifying the impression for the tagged content to be sent to the audience measurement entity for logging, untagged advertisements and/or advertisements do not have such beacon instructions 213, and/or repeated pingback instructions 214 to create an opportunity for the impression monitor 132 to log an impression. In such instances, HTTP requests logged by the web client meter 222 can be used to identify any untagged content or advertisements that were rendered by the client application 212 on the user client device 202.

In the illustrated example, the impression monitor 132 is provided with a user ID comparator 228, a rules/machine learning (ML) engine 230, an HTTP server 232, and a publisher/campaign/user target database 234. The user ID comparator 228 of the illustrated example is provided to identify beacon requests from users that are panelists 114, 116. In the illustrated example, the HTTP server 232 is a communication interface via which the impression monitor 132 exchanges information (e.g., beacon requests, pingback messages, beacon responses, acknowledgements, failure status messages, etc.) with the client device 202, 203. The rules/ML engine 230 and the publisher/campaign/user target database 234 of the illustrated example enable the impression monitor 132 to target the 'best fit' partner (e.g., one of the partners 206 or 208) for each impression request (or beacon request and/or pingback message) received from the client device 202, 203. The 'best fit' partner is the partner most likely to have demographic data for the user(s) of the client device 202, 203 sending the impression request. The rules/ML engine 230 is a set of rules and machine learning classifiers generated based on evolving empirical data stored in the publisher/campaign/user target database 234. In the illustrated example, rules can be applied at the publisher level, publisher/campaign level, or user level. In addition, partners may be weighted based on their overall reach and demographic quality.

To target partners (e.g., the partners 206 and 208) at the publisher level of ad campaigns, the rules/ML engine 230 contains rules and classifiers that allow the impression monitor 132 to target the 'best fit' partner for a particular publisher of ad campaign(s). For example, the impression monitoring system 132 could use an indication of target demographic composition(s) of publisher(s) and partner(s) (e.g., as stored in the publisher/campaign/user target database 234) to select a partner (e.g., one of the partners 206, 208) that is most likely to have demographic information for a user of the client device 202, 203 requesting the impression.

To target partners (e.g., the partners 206 and 208) at the campaign level (e.g., a publisher has the ability to target ad campaigns based on user demographics), the rules/ML engine 230 of the illustrated example are used to specify target partners at the publisher/campaign level. For example, if the publisher/campaign/user target database 234 stores information indicating that a particular ad campaign is targeted at males aged 18 to 25, the rules/ML engine 230 uses this information to indicate a beacon request redirect and/or pingback message redirect to a partner most likely to have the largest reach within this gender/age group.

To target partners (e.g., the partners 206 and 208) at the cookie level, the impression monitor 132 updates target partner sites based on feedback received from the partners. Such feedback could indicate user IDs that did not correspond or that did correspond to registered users of the partner(s). In some examples, the impression monitor 132 could also update target partner sites based on user behavior. For example, such user behavior could be derived from analyzing cookie clickstream data corresponding to browsing activities associated with panelist monitor cookies (e.g., the panelist monitor cookie 218). In the illustrated example, the impression monitor 132 uses such cookie clickstream data to determine age/gender bias for particular partners by determining ages and genders of which the browsing behavior is more indicative. In this manner, the impression monitor 132 of the illustrated example can update a target or preferred partner for a particular user or client device 202, 203. In some examples, the rules/ML engine 230 specify when to override user-level preferred target partners with publisher or publisher/campaign level preferred target partners. For example such a rule may specify an override of user-level preferred target partners when the user-level preferred target partner sends a number of indications that it does not have a registered user corresponding to the client device 202, 203 (e.g., a different user on the client device 202, 203 begins using a different application having a different user ID in its partner cookie 216).

In the illustrated example, the impression monitor 132 logs impressions (e.g., ad impressions, content impressions, etc.) in a media impressions per unique users table 235 based on beacon requests (e.g., the beacon request 304 of FIG. 3) received from client devices (e.g., the client device 202, 203). In the illustrated example, the media impressions per unique users table 235 stores unique user IDs obtained from cookies (e.g., the panelist monitor cookie 218) in association with total impressions per day, including media impression time(s) (e.g., the time(s) at which beacon requests were received from the client devices 202, 203) and campaign/media IDs. For example, a campaign ID may be used for some types of media (e.g., static advertisements), while a media ID may be used for other types of media (e.g., dynamic media having a duration). In some examples, the media impressions per unique users table 235 includes both media ID and campaign ID information. In this manner, for each campaign/media ID, the impression monitor 132 logs the total impressions per day for all and/or portion(s) of the media that are attributable to a particular user or client device 202, 203. The example media impressions may be collapsed for a particular user ID and campaign/media ID to obtain an entry in the media impressions table 235 corresponding to a description of an impression for the user ID and the campaign/media ID.

Each of the partners 206 and 208 of the illustrated example employs an HTTP server 236 and 240 and a user ID comparator 238 and 242. In the illustrated example, the HTTP servers 236 and 240 are communication interfaces via which their respective partners 206 and 208 exchange information (e.g., beacon requests, beacon responses, acknowledgements, failure status messages, etc.) with the client device 202, 203. The user ID comparators 238 and 242 are configured to compare user cookies received from a client device 202, 203 against the cookie in their records to identify the client device 202, 203, if possible. In this manner, the user ID comparators 238 and 242 can be used to determine whether users of the user client device 202 have registered accounts with the partners 206 and 208. If so, the partners 206 and 208 can log impressions attributed to those users and associate those impressions with the demographics of the identified user (e.g., demographics stored in the database proprietor database 142 of FIG. 1). The example partners 206, 208 of FIG. 2 receive multiple beacon requests during a media impression at the client device 202, 203. The example partners 206, 208 may collapse multiple beacon requests into a single impression for the identified user and the media (e.g., a media identifier provided with the beacon request) in a manner similar to the media impressions table 235.

In the illustrated example, the panel collection platform 210 is used to identify registered users of the partners 206, 208 that are also panelists 114, 116. The panel collection platform 210 can then use this information to cross-reference demographic information stored by the ratings entity subsystem 106 for the panelists 114, 116 with demographic information stored by the partners 206 and 208 for their registered users. The ratings entity subsystem 106 can use such cross-referencing to determine the accuracy of the demographic information collected by the partners 206 and 208 based on the demographic information of the panelists 114 and 116 collected by the ratings entity subsystem 106.

In some examples, the example collector 117 of the panel collection platform 210 collects web-browsing activity information from the user client device 202. In such examples, the example collector 117 requests logged data from the HTTP requests log 224 of the user client device 202 and logged data collected by other panelist client devices (not shown). In addition, the collector 117 collects panelist user IDs from the impression monitor 132 that the impression monitor 132 tracks as having set in panelist client devices. Also, the collector 117 collects partner user IDs from one or more partners (e.g., the partners 206 and 208) that the partners track as having been set in panelist and non-panelist client devices. In some examples, to abide by privacy agreements of the partners 206, 208, the collector 117 and/or the database proprietors 206, 208 can use a hashing technique (e.g., a double-hashing technique) to hash the database proprietor cookie IDs.

In some examples, the loader 118 of the panel collection platform 210 analyzes and sorts the received panelist user IDs and the partner user IDs. In the illustrated example, the loader 118 analyzes received logged data from panelist client devices (e.g., from the HTTP requests log 224 of the user client device 202) to identify panelist user IDs (e.g., the panelist monitor cookie 218) associated with partner user IDs (e.g., the partner cookie(s) 216). In this manner, the loader 118 can identify which panelists (e.g., ones of the panelists 114 and 116) are also registered users of one or more of the partners 206 and 208 (e.g., the database proprietor subsystem 108 of FIG. 1 having demographic information of registered users stored in the database proprietor database 142). In some examples, the panel collection platform 210 operates to verify the accuracy of impressions collected by the impression monitor 132. In such some examples, the loader 118 filters the logged HTTP beacon requests from the HTTP requests log 224 that correlate with impressions of panelists logged by the impression monitor 132 and identifies HTTP beacon requests logged at the HTTP requests log 224 that do not have corresponding impressions logged by the impression monitor 132. In this manner, the panel collection platform 210 can provide indications of inaccurate impression logging by the impression monitor 132 and/or provide impressions logged by the web client meter 222 to fill-in impression data for panelists 114, 116 missed by the impression monitor 132.

In the illustrated example, the loader 118 stores overlapping users in an impressions-based panel demographics table 250. In the illustrated example, overlapping users are users that are panelist members 114, 116 and registered users of partner A 206 (noted as users P(A)) and/or registered users of partner B 208 (noted as users P(B)). (Although only two partners (A and B) are shown, this is for simplicity of illustration, any number of partners may be represented in the table 250. The impressions-based panel demographics table 250 of the illustrated example is shown storing meter IDs (e.g., of the web client meter 222 and web client meters of other client devices), user IDs (e.g., an alphanumeric identifier such as a user name, email address, etc. corresponding to the panelist monitor cookie 218 and panelist monitor cookies of other panelist client devices), beacon request timestamps (e.g., timestamps indicating when the user client device 202 and/or other panelist client devices sent beacon requests such as the beacon requests 304 and 308 of FIG. 3), uniform resource locators (URLs) of websites visited (e.g., websites that displayed advertisements), and ad campaign IDs. In addition, the loader 118 of the illustrated example stores partner user IDs that do not overlap with panelist user IDs in a partner A (P(A)) cookie table 252 and a partner B (P(B)) cookie table 254.

In some examples, the impression monitor 132 and/or the ratings entity divide (e.g., filter) the impression information and/or demographic impression information based on type(s) of media presented in an impression. For example, the impression monitor 132 may determine that an impression includes one or more advertisements as a first media type and programming content as a second media type. By dividing the impression based on the media type(s) present in the impression, the example impression monitor 132 and/or ratings entity can determine ratings information for only the first media type and/or only the second media type (and/or only for other media types present in the impression). For example, the example impression monitor 132 and/or ratings entity may ignore time spent viewing a first media type (e.g., advertisements) when calculating a volume of viewing of the second media type (e.g., content or program viewing) and/or may ignore time spent viewing the second media type when calculating a volume of viewing of the first media type. In other examples, the pingback instructions 214 provide the indication(s) of time ranges in the media, and the impression monitor 132 cross-references the time range(s) against a database of media that includes the time ranges for different media types in the media.

In some examples, the pingback instructions 214 cause the pingback requests 304, 308 to include indications of the type of media (e.g., advertisement, content, etc.) to facilitate the division or filtering of the media. The example pingback instructions 214 may include an indication of time range(s) in the media belonging to type(s) of media and/or other instructions to discern the types of media being presented (e.g., code reading instructions, signature matching instructions, or instructions to perform other types of media identification data collection and/or media classification).

Example processes performed by the example system 200 are described below in connection with the communications flow diagram of FIG. 3 and the flow diagrams of FIGS. 10, 11, and 12.

While an example manner of implementing the ratings entity subsystem 106 is illustrated in FIGS. 1 and 2, one or more of the elements, processes and/or devices illustrated in FIG. 1 may be combined, divided, re-arranged, omitted, eliminated and/or implemented in any other way. Further, the example impression monitor 132, the example rules/ML engine 230, the example HTTP server communication interface 232, the example publisher/campaign/user target database 232, the example GRP report generator 130, the example panel collection platform 210, the example collector 117, the example loader 118, the example ratings entity database 120 and/or, more generally, the example ratings entity subsystem 106 of FIGS. 1 and 2 may be implemented by hardware, software, firmware and/or any combination of hardware, software and/or firmware. Thus, for example, any of the example impression monitor 132, the example rules/ML engine 230, the example HTTP server communication interface 232, the example publisher/campaign/user target database 232, the example GRP report generator 130, the example panel collection platform 210, the example collector 117, the example loader 118, the example ratings entity database 120 and/or, more generally, the example ratings entity subsystem 106 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example impression monitor 132, the example rules/ML engine 230, the example HTTP server communication interface 232, the example publisher/campaign/user target database 232, the example GRP report generator 130, the example panel collection platform 210, the example collector 117, the example loader 118, and/or the example ratings entity database 120 is/are hereby expressly defined to include a tangible computer readable storage device or storage disk such as a memory, a digital versatile disk (DVD), a compact disk (CD), a Blu-ray disk, etc. storing the software and/or firmware. Further still, the example ratings entity subsystem 106 of FIGS. 1 and 2 may include one or more elements, processes and/or devices in addition to, or instead of, those illustrated in FIGS. 1 and 2, and/or may include more than one of any or all of the illustrated elements, processes and devices.

Turning to FIG. 3, an example communication flow diagram shows an example manner in which the example system 200 of FIG. 2 logs impressions by clients (e.g., clients 202, 203). The example chain of events shown in FIG. 3 occurs when a client 202, 203 accesses tagged media (e.g., a tagged advertisement, tagged content, etc.). Thus, the events of FIG. 3 begin when a client sends an HTTP request to a server for media, which, in this example, is tagged to forward an impression to the ratings entity. In the illustrated example of FIG. 3, the client application 212 of the client 202, 203 receives the requested media (e.g., the tagged media 102, which may be an ad and/or content) from a publisher (e.g., publisher 302). It is to be understood that the client 202, 203 often requests a webpage containing media of interest (e.g., www.weather.com) and the requested webpage contains media that are downloaded and rendered within the webpage. The ads may come from different servers than the originally requested content. Thus, the requested media 102 of FIG. 3 contains beacon instructions 213 that cause the client 202, 203 to request repeated pingback instructions 214 (e.g., from the beacon server 215) as part of the process of rendering the webpage originally requested by the client 202, 203. The example client application 212 transmits a request based on the beacon instructions 213 to the beacon server 215, which returns the repeated pingback instructions 214.

For purposes of the following illustration, it is assumed that the advertisement 102 is tagged with the beacon instructions 214. The example beacon instructions 214 cause the client application 212 of the client 202 or 203 to send a beacon request 304 to the impression monitor 132 when the tagged ad is accessed. In some examples, the beacon instructions 214 cause the client application 212 to request and receive pingback instructions 214 from the beacon server 215. In the illustrated example, the client application 212 sends the beacon request 304 and/or a pingback message using an HTTP request addressed to the URL of the impression monitor 132 at, for example, a first internet domain. The beacon request 304 and/or the pingback message includes a campaign ID, a media ID, a creative type ID, and/or a placement ID associated with the media 102. In addition, the example beacon request 304 and/or the pingback message includes a document referrer (e.g., www.acme.com), a timestamp of the impression, and a publisher site ID (e.g., the URL http://my.advertiser.com of the ad publisher 302). In addition, if the client application 212 of the client 202 or 203 contains the panelist monitor cookie 218, the beacon request 304 and/or the pingback message will include the panelist monitor cookie 218. In other example implementations, the cookie 218 may not be passed until the client 202 or 203 receives a request sent by a server of the impression monitor 132 in response to, for example, the impression monitor 132 receiving the beacon request 304 and/or the pingback message. The example client application 212 sends additional beacon requests 304 and/or pingback messages at intervals determined by the beacon instructions 213 and/or the repeated pingback instructions 214. For example, the beacon instructions 213 and/or the repeated pingback instructions 214 may cause the client application 212 to send a beacon request every minute (or other time period) while the media 102 is loaded and/or being played in the client application 212.

In some examples, the beacon instructions 213 and/or the repeated pingback instructions 214 further cause the client application 212 to send the beacon request 304 in response to certain events, such as user manipulation and/or interaction with the media 102. For example, the beacon instructions 213 and/or the repeated pingback instructions 214 may cause the client application 212 to send the beacon request 304 and/or the pingback message when a user jumps to a location in (e.g., a particular time within) the media 102. For example, the user may wish to resume playback of a video at a location (e.g., 10:00 minutes from the beginning of the video, etc.) where the user previously stopped viewing the media. In some other examples, a user may wish to skip a portion of media (e.g., skip a currently-playing song). The example beacon instructions 213 and/or the repeated pingback instructions 214 cause the client application 212 to include the time to which the user jumped in the media 102, the skip request, and/or another user interaction in the beacon request 304 and/or the pingback message.

In response to receiving the beacon request 304 and/or the pingback message, the impression monitor 132 logs an impression by recording the media identification information (and any other relevant identification information), the timestamp, and/or any other information contained in the beacon request 304 and/or the pingback message (e.g., a jump time, a skip request, etc.). In the illustrated example, the impression monitor 132 logs the impression regardless of whether the beacon request 304 and/or the pingback message indicated a user ID (e.g., based on the panelist monitor cookie 218) that matched a user ID of a panelist member (e.g., one of the panelists 114 and 116 of FIG. 1). However, if the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor 132. If the user ID does not correspond to a panelist of the impression monitor 132, the impression monitor 132 will still benefit from logging an impression even though it will not have a user ID record (and, thus, corresponding demographics) for the impression reflected in the beacon request 304 and/or the pingback message. When beacon requests 304 and/or pingback messages for a media ID and a particular client device 202, 203 have not been received for a threshold time, the example impression monitor 132 generates a duration impression for the media based on the logged impressions (e.g., based on the beacon requests 304 and/or the pingback messages) received for the media ID from the client device 202, 203. The example duration impression includes estimated time(s) presented by the client device 202, 203 based on the logged impressions (e.g., based on contiguous playback, jumping within the media, pausing the media, skipping portions of media, etc.).

In the illustrated example of FIG. 3, to compare or supplement panelist demographics (e.g., for accuracy or completeness) of the impression monitor 132 with demographics at partner sites and/or to enable a partner site to attempt to identify the client and/or log the impression, the impression monitor 132 returns a beacon response message 306 (e.g., a first beacon response) to the client application 212 of the client 202, 203 including an HTTP 302 redirect message and a URL of a participating partner at, for example, a second internet domain. In the illustrated example, the HTTP 302 redirect message instructs the client application 212 of the client 202, 203 to send a second pingback message 308 to the particular partner (e.g., one of the partners A 206 or B 208). In other examples, instead of using an HTTP 302 redirect message, redirects may instead be implemented using, for example, an iframe source instructions (e.g., <iframe src=" ">) or any other instruction that can instruct a client application to send a subsequent beacon request and/or pingback message (e.g., the second beacon request and/or pingback message 308) to a partner. In the illustrated example, the impression monitor 132 determines the partner specified in the beacon response 306 using its rules/ML engine 230 (FIG. 2) based on, for example, empirical data indicative of which partner should be preferred as being most likely to have demographic data for the user ID. In other examples, the same partner is always identified in the first redirect message and that partner always redirects the client 202, 203 to the same second partner when the first partner does not log the impression. In other words, a set hierarchy of partners is defined and followed such that the partners are "daisy chained" together in the same predetermined order rather than them trying to guess a most likely database proprietor to identify an unknown client 203.

Prior to sending the beacon response 306 to the client application of the client 202, 203, the impression monitor 132 of the illustrated example replaces a site ID (e.g., a URL) of the ad publisher 302 with a modified site ID (e.g., a substitute site ID) which is discernable only by the impression monitor 132 as corresponding to the ad publisher 302. In some example implementations, the impression monitor 132 may also replace the host website ID (e.g., www.acme.com) with another modified site ID (e.g., a substitute site ID) which is discernable only by the impression monitor 132 as corresponding to the host website. In this way, the source(s) of the ad and/or the host content are masked from the partners. In the illustrated example, the impression monitor 132 maintains a publisher ID mapping table 310 that maps original site IDs of ad publishers with modified (or substitute) site IDs created by the impression monitor 132 to obfuscate or hide ad publisher identifiers from partner sites. In some examples, the impression monitor 132 also stores the host website ID in association with a modified host website ID in a mapping table. In addition, the impression monitor 132 encrypts all of the information received in the pingback message 304 and the modified site ID to prevent any intercepting parties from decoding the information. The impression monitor 132 of the illustrated example sends the encrypted information in the beacon response 306 to the client application 212. In the illustrated example, the impression monitor 132 uses an encryption that can be decrypted by the selected partner site specified in the HTTP 302 redirect.

In some examples, the impression monitor 132 also sends a URL scrape instruction 320 to the client device 202, 302. In such examples, the URL scrape instruction 320 causes the client device 202, 203 to "scrape" the URL of the webpage or website associated with the tagged advertisement 102. For example, the client device 202, 203 may perform scraping of web page URLs by reading text rendered or displayed at a URL address bar of the client application 212. The client device 202, 203 then sends a scraped URL 322 to the impression monitor 132. In the illustrated example, the scraped URL 322 indicates the host website (e.g., http://www.acme.com) that was visited by a user of the client device 202, 203 and in which the tagged advertisement 102 was displayed. In the illustrated example, the tagged advertisement 102 is displayed via an ad iFrame having a URL 'my.advertiser.com,' which corresponds to an ad network (e.g., the publisher 302) that serves the tagged advertisement 102 on one or more host websites. However, in the illustrated example, the host website indicated in the scraped URL 322 is 'www.acme.com,' which corresponds to a website visited by a user of the client device 202, 203.

URL scraping is particularly useful under circumstances in which the publisher is an ad network from which an advertiser bought advertisement space/time. In such instances, the ad network dynamically selects from subsets of host websites (e.g., www.caranddriver.com, www.espn.com, www.allrecipes.com, etc.) visited by users on which to display ads via ad iFrames. However, the ad network cannot foretell definitively the host websites on which the ad will be displayed at any particular time. In addition, the URL of an ad iFrame in which the tagged advertisement 102 is being rendered may not be useful to identify the topic of a host website (e.g., www.acme.com in the example of FIG. 3) rendered by the client application 212. As such, the impression monitor 132 may not know the host website in which the ad iFrame is displaying the tagged advertisement 102.

The URLs of host websites (e.g., www.caranddriver.com, www.espn.com, www.allrecipes.com, etc.) can be useful to determine topical interests (e.g., automobiles, sports, cooking, etc.) of user(s) of the client device 202, 203. In some examples, audience measurement entities can use host website URLs to correlate with user/panelist demographics and interpolate logged impressions to larger populations based on demographics and topical interests of the larger populations and based on the demographics and topical interests of users/panelists for which impressions were logged. Thus, in the illustrated example, when the impression monitor 132 does not receive a host website URL or cannot otherwise identify a host website URL based on the beacon request and/or pingback message 304, the impression monitor 132 sends the URL scrape instruction 320 to the client device 202, 203 to receive the scraped URL 322. In the illustrated example, if the impression monitor 132 can identify a host website URL based on the beacon request and/or pingback message 304, the impression monitor 132 does not send the URL scrape instruction 320 to the client device 202, 203, thereby, conserving network and computer bandwidth and resources.

In response to receiving the beacon response 306, the client application of the client 202, 203 sends the beacon request 308 and/or pingback message to the specified partner site, which is the partner A 206 (e.g., a second internet domain) in the illustrated example. The beacon request 308 and/or pingback message includes the encrypted parameters from the beacon response 306. The partner A 206 (e.g., Facebook) decrypts the encrypted parameters and determines whether the client device 202, 203 matches a registered user of services offered by the partner A 206. This determination involves requesting the client 202, 203 to pass any cookie (e.g., one of the partner cookies 216 of FIG. 2) it stores that had been set by partner A 206 and attempting to match the received cookie against the cookies stored in the records of partner A 206. If a match is found, partner A 206 has positively identified a client 202, 203. Accordingly, the partner A 206 site logs an impression in association with the demographics information of the identified client. This log (which includes the undetectable source identifier) is subsequently provided to the ratings entity for processing into GRPs as discussed below. In the event partner A 206 is unable to identify the client 202, 203 in its records (e.g., no matching cookie), the partner A 206 does not log an impression.

In some example implementations, if the user ID does not match a registered user of the partner A 206, the partner A 206 may return a beacon response 312 (e.g., a second beacon response) including a failure or non-match status or may not respond at all, thereby terminating the process of FIG. 3. However, in the illustrated example, if partner A 206 cannot identify the client 202, 203, partner A 206 returns a second HTTP 302 redirect message in the beacon response 312 (e.g., the second beacon response) to the client 202, 203. For example, if the partner A site 206 has logic (e.g., similar to the rules/ml engine 230 of FIG. 2) to specify another partner (e.g., partner B 208 or any other partner) which may likely have demographics for the user ID, then the beacon response 312 may include an HTTP 302 redirect (or any other suitable instruction to cause a redirected communication) along with the URL of the other partner (e.g., at a third internet domain). Alternatively, in the daisy chain approach discussed above, the partner A site 206 may always redirect to the same next partner or database proprietor (e.g., partner B 208 at, for example, a third internet domain or a non-partnered database proprietor subsystem 110 of FIG. 1 at a third internet domain) whenever it cannot identify the client 202, 203. When redirecting, the partner A site 206 of the illustrated example encrypts the ID, timestamp, referrer, etc. parameters using an encryption that can be decoded by the next specified partner.

As a further alternative, if the partner A site 206 does not have logic to select a next best suited partner likely to have demographics for the user ID and is not effectively daisy chained to a next partner by storing instructions that redirect to a partner entity, the beacon response 312 can redirect the client 202, 203 to the impression monitor 132 with a failure or non-match status. In this manner, the impression monitor 132 can use its rules/ML engine 230 to select a next-best suited partner to which the client application of the client 202, 203 should send a beacon request and/or pingback message (or, if no such logic is provided, simply select the next partner in a hierarchical (e.g., fixed) list). In the illustrated example, the impression monitor 132 selects the partner B site 208, and the client application of the client 202, 203 sends a beacon request and/or pingback message to the partner B site 208 with parameters encrypted in a manner that can be decrypted by the partner B site 208. The partner B site 208 then attempts to identify the client 202, 203 based on its own internal database. If a cookie obtained from the client 202, 203 matches a cookie in the records of partner B 208, partner B 208 has positively identified the client 202, 203 and logs the impression in association with the demographics of the client 202, 203 for later provision to the impression monitor 132. In the event that partner B 208 cannot identify the client 202, 203, the same process of failure notification or further HTTP 302 redirects may be used by the partner B 208 to provide a next other partner site an opportunity to identify the client and so on in a similar manner until a partner site identifies the client 202, 203 and logs the impression, until all partner sites have been exhausted without the client being identified, or until a predetermined number of partner sites failed to identify the client 202, 203.

Using the process illustrated in FIG. 3, impressions (e.g., media impressions, etc.) can be mapped to corresponding demographics on a minute-by-minute basis for media. Furthermore, impressions can be mapped to the corresponding demographics even when the impressions are not triggered by panel members associated with the audience measurement entity (e.g., ratings entity subsystem 106 of FIG. 1). During an impression collection or merging process, the panel collection platform 210 of the ratings entity can collect distributed impressions logged by (1) the impression monitor 132 and (2) any participating partners (e.g., partners 206, 208), and determine the demographics for individual portions of the media. As a result, the example methods and apparatus disclosed herein deliver comprehensive, TV-comparable overnight metrics for online programming campaigns, provide similar overnight audience data, including unique audience, stream counts and reach by age and gender for TV programming viewed online, and offer a more holistic view of the online and TV audience for both programming content and associated ad campaigns. Example methods and apparatus provide duration weighting of video and reporting of TV-comparable ratings. The data collected using example methods and apparatus disclosed herein covers a larger population with richer demographics information than has heretofore been possible. Consequently, generating accurate, consistent, and meaningful online GRPs is possible by pooling the resources of the distributed databases as described above. The example structures of FIGS. 2 and 3 generate online GRPs based on a large number of combined demographic databases distributed among unrelated parties (e.g., Nielsen and Facebook). The end result appears as if users attributable to the logged impressions were part of a large virtual panel formed of registered users of the audience measurement entity because the selection of the participating partner sites can be tracked as if they were members of the audience measurement entities panels 114, 116. This is accomplished without violating the cookie privacy protocols of the Internet.

Periodically or aperiodically, the impression data collected by the partners (e.g., partners 206, 208) is provided to the ratings entity via a panel collection platform 210. As discussed above, some user IDs may not match panel members of the impression monitor 132, but may match registered users of one or more partner sites. During a data collecting and merging process to combine demographic and impression data from the ratings entity subsystem 106 and the partner subsystem(s) 108 and 110 of FIG. 1, user IDs of some impressions logged by one or more partners may match user IDs of impressions logged by the impression monitor 132, while others (most likely many others) will not match. In some example implementations, the ratings entity subsystem 106 may use the demographics-based impressions from matching user ID logs provided by partner sites to assess and/or improve the accuracy of its own demographic data, if necessary. For the demographics-based impressions associated with non-matching user ID logs, the ratings entity subsystem 106 may use the impressions (e.g., advertisement impressions, content impressions, etc.) to derive demographics-based online GRPs even though such impressions are not associated with panelists of the ratings entity subsystem 106. The example ratings entity applies the demographics of an impression to the portions of the media that were determined to have been presented at the client devices based on the pingback messages and corresponding impression information.

As briefly mentioned above, example methods, apparatus, and/or articles of manufacture disclosed herein may be configured to preserve user privacy when sharing demographic information (e.g., account records or registration information) between different entities (e.g., between the ratings entity subsystem 106 and the database proprietor subsystem 108). In some example implementations, a double encryption technique may be used based on respective secret keys for each participating partner or entity (e.g., the subsystems 106, 108, 110). For example, the ratings entity subsystem 106 can encrypt its user IDs (e.g., email addresses) using its secret key and the database proprietor subsystem 108 can encrypt its user IDs using its secret key. For each user ID, the respective demographics information is then associated with the encrypted version of the user ID. Each entity then exchanges their demographics lists with encrypted user IDs. Because neither entity knows the other's secret key, they cannot decode the user IDs, and thus, the user IDs remain private. Each entity then proceeds to perform a second encryption of each encrypted user ID using their respective keys. Each twice-encrypted (or double encrypted) user ID (UID) will be in the form of E1(E2(UID)) and E2(E1(UID)), where E1 represents the encryption using the secret key of the ratings entity subsystem 106 and E2 represents the encryption using the secret key of the database proprietor subsystem 108. Under the rule of commutative encryption, the encrypted user IDs can be compared on the basis that E1(E2(UID))=E2(E1(UID)). Thus, the encryption of user IDs present in both databases will match after the double encryption is completed. In this manner, matches between user records of the panelists and user records of the database proprietor (e.g., identifiers of registered social network users) can be compared without the partner entities needing to reveal user IDs to one another.

The ratings entity subsystem 106 performs a daily impressions and UUID (cookies) totalization based on impressions and cookie data collected by the impression monitor 132 of FIG. 1 and the impressions logged by the partner sites. In the illustrated example, the ratings entity subsystem 106 may perform the daily impressions and UUID (cookies) totalization based on cookie information collected by the ratings entity cookie collector 134 of FIG. 1 and the logs provided to the panel collection platform 210 by the partner sites. FIG. 4 depicts an example ratings entity impressions table 400 showing quantities of impressions to monitored users. Similar tables could be compiled for one or more of advertisement impressions, content impressions, or other impressions. In the illustrated example, the ratings entity impressions table 400 is generated by the ratings entity subsystem 106 for an advertisement campaign (e.g., one or more of the advertisements 102 of FIG. 1) to determine frequencies of impressions per day for each user.

To track frequencies of impressions per unique user per day, the ratings entity impressions table 400 is provided with a frequency column 402. A frequency of 1 indicates one exposure per day of an ad in an ad campaign to a unique user, while a frequency of 4 indicates four exposures per day of one or more ads in the same ad campaign to a unique user. To track the quantity of unique users to which impressions are attributable, the ratings impressions table 400 is provided with a UUIDs column 404. A value of 100,000 in the UUIDs column 404 is indicative of 100,000 unique users. Thus, the first entry of the ratings entity impressions table 400 indicates that 100,000 unique users (i.e., UUIDs=100,000) were exposed once (i.e., frequency=1) in a single day to a particular one of the advertisements 102.

To track impressions based on exposure frequency and UUIDs, the ratings entity impressions table 400 is provided with an impressions column 406. Each impression count stored in the impressions column 406 is determined by multiplying a corresponding frequency value stored in the frequency column 402 with a corresponding UUID value stored in the UUID column 404. For example, in the second entry of the ratings entity impressions table 400, the frequency value of two is multiplied by 200,000 unique users to determine that 400,000 impressions are attributable to a particular one of the advertisements 102.

Turning to FIG. 5, in the illustrated example, each of the partnered database proprietor subsystems 108, 110 of the partners 206, 208 generates and reports a database proprietor ad campaign-level age/gender and impression composition table 500 to the GRP report generator 130 of the ratings entity subsystem 106 on a daily basis. Similar tables can be generated for content and/or other media. Additionally or alternatively, media in addition to advertisements may be added to the table 500. In the illustrated example, the partners 206, 208 tabulate the impression distribution by age and gender composition as shown in FIG. 5. For example, referring to FIG. 1, the database proprietor database 142 of the partnered database proprietor subsystem 108 stores logged impressions and corresponding demographic information of registered users of the partner A 206, and the database proprietor subsystem 108 of the illustrated example processes the impressions and corresponding demographic information using the rules 144 to generate the DP summary tables 146 including the database proprietor ad campaign-level age/gender and impression composition table 500.

The age/gender and impression composition table 500 is provided with an age/gender column 502, an impressions column 504, a frequency column 506, an impression composition column 508, and a time period or media portion (e.g., subset) column 510. The age/gender column 502 of the illustrated example indicates the different age/gender demographic groups. The impressions column 504 of the illustrated example stores values indicative of the total impressions for a particular one of the advertisements 102 (FIG. 1) for corresponding age/gender demographic groups. The frequency column 506 of the illustrated example stores values indicative of the frequency of exposure per user for the one of the advertisements 102 that contributed to the impressions in the impressions column 504. The impressions composition column 508 of the illustrated example stores the percentage of impressions for each of the age/gender demographic groups. The example time period column 510 specifies the portion or subset of the media for which the ratings are applicable. As an example, the impressions for the 30$^{th}$ minute of the media represented by the table 500 are different than the impressions for the 1$^{st}$ minute of the media.

In some examples, the database proprietor subsystems 108, 110 may perform demographic accuracy analyses and adjustment processes on its demographic information before tabulating final results of impression-based demographic information in the database proprietor campaign-level age/gender and impression composition table. This can be done to address a problem facing online audience measurement processes in that the manner in which registered users represent themselves to online data proprietors (e.g., the partners 206 and 208) is not necessarily veridical (e.g., truthful and/or accurate). In some instances, example approaches to online measurement that leverage account registrations at such online database proprietors to determine demographic attributes of an audience may lead to inaccurate demographic-exposure results if they rely on self-reporting of personal/demographic information by the registered users during account registration at the database proprietor site. There may be numerous reasons for why users report erroneous or inaccurate demographic information when registering for database proprietor services. The self-reporting registration processes used to collect the demographic information at the database proprietor sites (e.g., social media sites) does not facilitate determining the veracity of the self-reported demographic information. To analyze and adjust inaccurate demographic information, the ratings entity subsystem 106 and the database proprietor subsystems 108, 110 may use example methods, systems, apparatus, and/or articles of manufacture disclosed in U.S. patent application Ser. No. 13/209,292, filed on Aug. 12, 2011, and titled "Methods and Apparatus to Analyze and Adjust Demographic Information," which is hereby incorporated herein by reference in its entirety.

Turning to FIG. 6, in the illustrated example, the ratings entity subsystem 106 generates a panelist ad campaign-level age/gender and impression composition table 600 on a daily basis. Similar tables can be generated for content and/or other media. Additionally or alternatively, media in addition to advertisements may be added to the table 600. The example ratings entity subsystem 106 tabulates the impression distribution by age and gender composition as shown in FIG. 6 in the same manner as described above in connection with FIG. 5. As shown in FIG. 6, the panelist ad campaign-level age/gender and impression composition table 600 also includes an age/gender column 602, an impressions column 604, a frequency column 606, an impression composition column 608, and a time period or media portion column 610. In the illustrated example of FIG. 6, the impressions are calculated based on the PC and TV panelists 114 and online panelists 116.

After creating the campaign-level age/gender and impression composition tables 500 and 600 of FIGS. 5 and 6, the ratings entity subsystem 106 creates a combined campaign-level age/gender and impression composition table 700 shown in FIG. 7. In particular, the ratings entity subsystem 106 combines the impression composition percentages from the impression composition columns 508 and 608 of FIGS. 5 and 6 to compare the age/gender impression distribution differences between the ratings entity panelists and the social network users on, for example, a minute-by-minute basis.

As shown in FIG. 7, the combined campaign-level age/gender and impression composition table 700 includes an error weighted column 702, which stores mean squared errors (MSEs) indicative of differences between the impression compositions of the ratings entity panelists and the users of the database proprietor (e.g., social network users). Weighted MSEs can be determined using Equation 4 below.

$$\text{Weighted MSE}=(\alpha^*IC_{(RE)}+(1-\alpha)IC_{(DP)}) \quad \text{Equation 4}$$

In Equation 4 above, a weighting variable ($\alpha$) represents the ratio of MSE(SN)/MSE(RE) or some other function that weights the compositions inversely proportional to their MSE. As shown in Equation 4, the weighting variable ($\alpha$) is multiplied by the impression composition of the ratings entity ($IC_{(RE)}$) to generate a ratings entity weighted impression composition ($\alpha^*IC_{(RE)}$). The impression composition of the database proprietor (e.g., a social network) ($IC_{(DP)}$) is then multiplied by a difference between one and the weighting variable ($\alpha$) to determine a database proprietor weighted impression composition (($1-\alpha$)$IC_{(DP)}$).

In the illustrated example, the ratings entity subsystem 106 can smooth or correct the differences between the impression compositions by weighting the distribution of MSE. The MSE values account for sample size variations or bounces in data caused by small sample sizes. The example table 700 may further include the impressions information for other time periods of the media (e.g., minutes 2, 3, 4, etc.).

Turning to FIG. 8, the ratings entity subsystem 106 determines reach and error-corrected impression compositions in an age/gender impressions distribution table 800. The age/gender impressions distribution table 800 includes an age/gender column 802, an impressions column 804, a frequency column 806, a reach column 808, an impressions composition column 810, and a time period or media portion column 812. The impressions column 804 stores error-weighted impressions values corresponding to impressions tracked by the ratings entity subsystem 106 (e.g., the impression monitor 132 and/or the panel collection platform 210 based on impressions logged by the web client meter 222). In particular, the values in the impressions column 804 are derived by multiplying weighted MSE values from the error weighted column 702 of FIG. 7 with corresponding impressions values from the impressions column 604 of FIG. 6.

The frequency column 806 stores frequencies of impressions as tracked by the database proprietor subsystem 108. The frequencies of impressions are imported into the frequency column 806 from the frequency column 506 of the database proprietor campaign-level age/gender and impression composition table 500 of FIG. 5. For age/gender groups missing from the table 500, frequency values are taken from the ratings entity campaign-level age/gender and impression composition table 600 of FIG. 6. For example, the database proprietor campaign-level age/gender and impression composition table 500 does not have a less than 12 (<12) age/gender group. Thus, a frequency value of 3 is taken from the ratings entity campaign-level age/gender and impression composition table 600.

The reach column 808 stores reach values representing reach of one or more of the content and/or advertisements 102 (FIG. 1) for each age/gender group. The reach values are determined by dividing respective impressions values from the impressions column 804 by corresponding frequency values from the frequency column 806. The impressions composition column 810 stores values indicative of the percentage of impressions per age/gender group. In the illustrated example, the final total frequency in the frequency column 806 is equal to the total impressions divided by the total reach. The example table 800 may further include the impressions information for other time periods of the media (e.g., minutes 2, 3, 4, etc.).

The time period or media portion column 812 indicates the time period or portion or subset of the media (e.g., the first minute, the second minute, the first 30 seconds, the second 30 seconds, the first $1/10^{th}$ of the media, the second $1/10^{th}$ of the media, etc.). The example table 800 may be organized by the time period column 812, and each time period in the media can be measured for individual ones of the demographic groups (e.g., age/gender groups). Thus, the example ratings entity subsystem 106 generates the table 800 to describe the characteristics of the minute-by-minute audience (or period-by-period audience, where the period may be any length of time or percentage) of the media.

Flowcharts representative of example machine readable instructions for implementing the example ratings entity subsystem 106 are shown in FIGS. 9, 10, 11, 12, and 14-16. In this example, the machine readable instructions comprise programs for execution by a processor such as the processor 1812 shown in the example processor platform 1800 discussed below in connection with FIG. 18. The programs may be embodied in software stored on a tangible computer readable storage medium such as a CD-ROM, a floppy disk, a hard drive, a digital versatile disk (DVD), a Blu-ray disk, or a memory associated with the processor 1812, but the entire programs and/or parts thereof could alternatively be executed by a device other than the processor 1812 and/or embodied in firmware or dedicated hardware. Further, although the example programs are described with reference to the flowchart illustrated in FIGS. 9, 10, 11, 12, and 14-16, many other methods of implementing the example ratings entity subsystem 106 may alternatively be used. For example, the order of execution of the blocks may be changed, and/or some of the blocks described may be changed, eliminated, or combined.

As mentioned above, the example processes of FIGS. 9, 10, 11, 12, and 14-16 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 9, 10, 11, 12, and 14-16 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
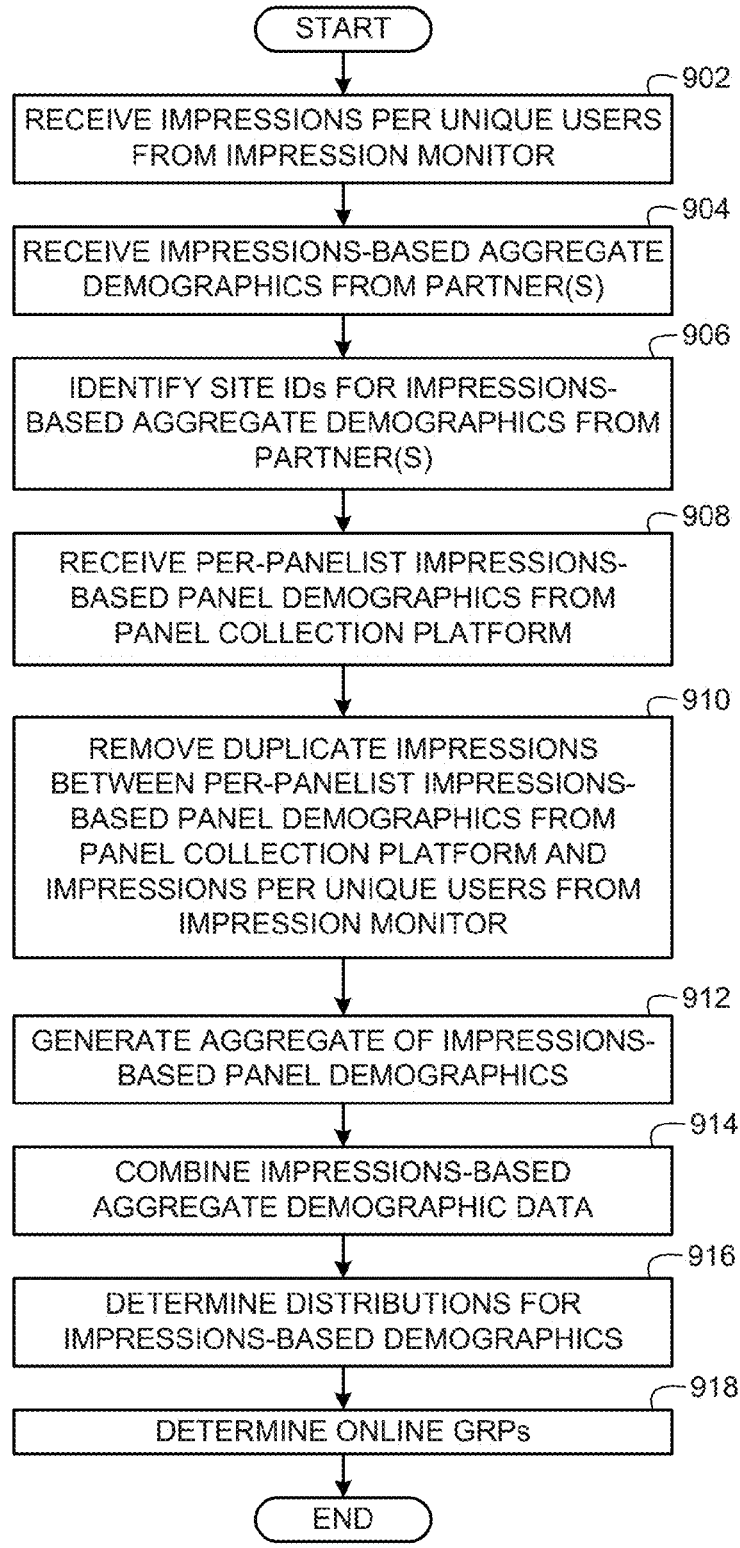
FIG. 9 is a flow diagram representative of example machine readable instructions that may be executed to identify demographics attributable to impressions.

Turning in detail to FIG. 9, the ratings entity subsystem 106 of FIG. 1 may perform the depicted process to collect demographics and impression data from partners and to assess the accuracy and/or adjust its own demographics data of its panelists 114, 116. The example process of FIG. 9 collects demographics and impression data for registered users of one or more partners (e.g., the partners 206 and 208 of FIGS. 2 and 3) that overlap with panelist members (e.g., the panelists 114 and 116 of FIG. 1) of the ratings entity subsystem 106 as well as demographics and impression data from partner sites that correspond to users that are not registered panel members of the ratings entity subsystem 106. The collected data is combined with other data collected at the ratings entity to determine online GRPs. The example process of FIG. 9 is described in connection with the example system 100 of FIG. 1 and the example system 200 of FIG. 2.

Initially, the GRP report generator 130 (FIG. 1) receives impressions per unique users 235 (FIG. 2) from the impression monitor 132 (block 902). The GRP report generator 130 receives impressions-based aggregate demographics (e.g., the partner campaign-level age/gender and impression composition table 500 of FIG. 5) from one or more partner(s) (block 904). In the illustrated example, user IDs of registered users of the partners 206, 208 are not received by the GRP report generator 130. Instead, the partners 206, 208 remove user IDs and aggregate impressions-based demographics in the partner campaign-level age/gender and impression composition table 500 at demographic bucket levels (e.g., males aged 13-18, females aged 13-18, etc.). However, for instances in which the partners 206, 208 also send user IDs to the GRP report generator 130, such user IDs are exchanged in an encrypted format based on, for example, the double encryption technique described above.

For examples in which the impression monitor 132 modifies site IDs and sends the modified site IDs in the beacon response 306, the partner(s) log impressions based on those modified site IDs. In such examples, the impressions collected from the partner(s) at block 904 are impressions logged by the partner(s) against the modified site IDs. When the ratings entity subsystem 106 receives the impressions with modified site IDs, GRP report generator 130 identifies site IDs for the impressions received from the partner(s) (block 906). For example, the GRP report generator 130 uses the site ID map 310 (FIG. 3) generated by the impression monitor system 132 during the beacon receive and response process (e.g., discussed above in connection with FIG. 3) to identify the actual site IDs corresponding to the modified site IDs in the impressions received from the partner(s).

The GRP report generator 130 receives per-panelist impressions-based demographics (e.g., the impressions-based panel demographics table 250 of FIG. 2) from the panel collection platform 210 (block 908). In the illustrated example, per-panelist impressions-based demographics are impressions logged in association with respective user IDs of panelist 114, 116 (FIG. 1) as shown in the impressions-based panel demographics table 250 of FIG. 2.

The GRP report generator 130 removes duplicate impressions between the per-panelist impressions-based panel demographics 250 received at block 908 from the panel collection platform 210 and the impressions per unique users 235 received at block 902 from the impression monitor 132 (block 910). In this manner, duplicate impressions logged by both the impression monitor 132 and the web client meter 222 (FIG. 2) will not skew GRPs generated by the GRP generator 130. In addition, by using the per-panelist impressions-based panel demographics 250 from the panel collection platform 210 and the impressions per unique users 235 from the impression monitor 132, the GRP generator 130 has the benefit of impressions from redundant systems (e.g., the impression monitor 132 and the web client meter 222). In this manner, if one of the systems (e.g., one of the impression monitor 132 or the web client meter 222) misses one or more impressions, the record(s) of such impression(s) can be obtained from the logged impressions of the other system (e.g., the other one of the impression monitor 132 or the web client meter 222).

The GRP report generator 130 generates an aggregate of the impressions-based panel demographics 250 (block 912). For example, the GRP report generator 130 aggregates the impressions-based panel demographics 250 into demographic bucket levels (e.g., males aged 13-18, females aged 13-18, etc.) to generate the panelist ad campaign-level age/gender and impression composition table 600 of FIG. 6.

In some examples, the GRP report generator 130 does not use the per-panelist impressions-based panel demographics from the panel collection platform 210. In such instances, the ratings entity subsystem 106 does not rely on web client meters such as the web client meter 222 of FIG. 2 to determine GRP using the example process of FIG. 9. Instead in such instances, the GRP report generator 130 determines impressions of panelists based on the impressions per unique users 235 received at block 902 from the impression monitor 132 and uses the results to aggregate the impressions-based panel demographics at block 912. For example, as discussed above in connection with FIG. 2, the impressions per unique users table 235 stores panelist user IDs in association with total impressions and campaign IDs. As such, the GRP report generator 130 may determine impressions of panelists based on the impressions per unique users 235 without using the impression-based panel demographics 250 collected by the web client meter 222.

The GRP report generator 130 combines the impressions-based aggregate demographic data from the partner(s) 206, 208 (received at block 904) and the panelists 114, 116 (generated at block 912) its demographic data with received demographic data (block 914). For example, the GRP report generator 130 of the illustrated example combines the impressions-based aggregate demographic data to form the combined campaign-level age/gender and impression composition table 700 of FIG. 7.

The GRP report generator 130 determines distributions for the impressions-based demographics of block 914 (block 916). In the illustrated example, the GRP report generator 130 stores the distributions of the impressions-based demographics in the age/gender impressions distribution table 800 of FIG. 8. In addition, the GRP report generator 130 generates online GRPs based on the impressions-based demographics (block 918). In the illustrated example, the GRP report generator 130 uses the GRPs to create one or more of the GRP report(s) 131. In some examples, the ratings entity subsystem 106 sells or otherwise provides the GRP report(s) 131 to advertisers, publishers, content providers, manufacturers, and/or any other entity interested in such market research. The example process of FIG. 9 then ends.

Figure 10:
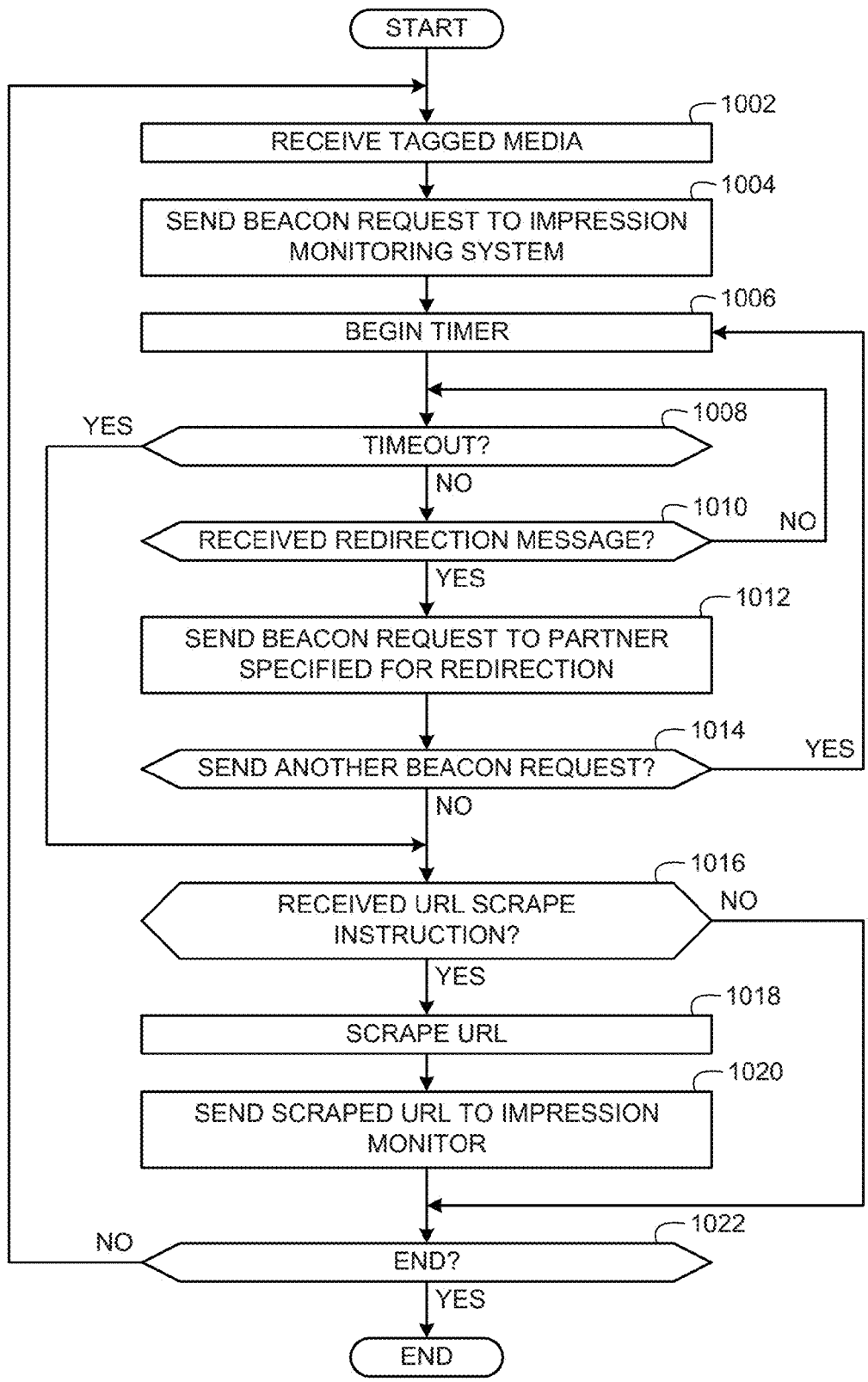
FIG. 10 is a flow diagram representative of example machine readable instructions that may be executed by a client device to route beacon requests to web service providers to log impressions.

Turning now to FIG. 10, the depicted example flow diagram may be performed by a client device 202, 203 (FIGS. 2 and 3) to route beacon requests (e.g., the beacon requests 304, 308 of FIG. 3) to web service providers to log demographics-based impressions. Initially, the client device 202, 203 receives tagged content and/or a tagged advertisement 102 (block 1002) and sends the beacon request 304 to the impression monitor 132 (block 1004) to give the impression monitor 132 (e.g., at a first internet domain) an opportunity to log an impression for the client device 202, 203. The client device 202, 203 begins a timer (block 1006) based on a time for which to wait for a response from the impression monitor 132.

If a timeout has not expired (block 1008), the client device 202, 203 determines whether it has received a redirection message (block 1010) from the impression monitor 132 (e.g., via the beacon response 306 of FIG. 3). If the client device 202, 203 has not received a redirection message (block 1010), control returns to block 1008. Control remains at blocks 1008 and 1010 until either (1) a timeout has expired, in which case control advances to block 1016 or (2) the client device 202, 203 receives a redirection message.

If the client device 202, 203 receives a redirection message at block 1010, the client device 202, 203 sends the beacon request 308 to a partner specified in the redirection message (block 1012) to give the partner an opportunity to log an impression for the client device 202, 203. During a first instance of block 1012 for a particular tagged advertisement (e.g., the tagged advertisement 102), the partner (or in some examples, non-partnered database proprietor 110) specified in the redirection message corresponds to a second internet domain. During subsequent instances of block 1012 for the same tagged advertisement, as beacon requests are redirected to other partner or non-partnered database proprietors, such other partner or non-partnered database proprietors correspond to third, fourth, fifth, etc. internet domains. In some examples, the redirection message(s) may specify an intermediary(ies) (e.g., an intermediary(ies) server(s) or sub-domain server(s)) associated with a partner(s) and/or the client device 202, 203 sends the beacon request 308 to the intermediary(ies) based on the redirection message(s) as described below in conjunction with FIG. 13.

The client device 202, 203 determines whether to attempt to send another beacon request to another partner (block 1014). For example, the client device 202, 203 may be configured to send a certain number of beacon requests in parallel (e.g., to send beacon requests to two or more partners at roughly the same time rather than sending one beacon request to a first partner at a second internet domain, waiting for a reply, then sending another beacon request to a second partner at a third internet domain, waiting for a reply, etc.) and/or to wait for a redirection message back from a current partner to which the client device 202, 203 sent the beacon request at block 1012. If the client device 202, 203 determines that it should attempt to send another beacon request to another partner (block 1014), control returns to block 1006.

If the client device 202, 203 determines that it should not attempt to send another beacon request to another partner (block 1014) or after the timeout expires (block 1008), the client device 202, 203 determines whether it has received the URL scrape instruction 320 (FIG. 3) (block 1016). If the client device 202, 203 did not receive the URL scrape instruction 320 (block 1016), control advances to block 1022. Otherwise, the client device 202, 203 scrapes the URL of the host website rendered by the client application 212 (block 1018) in which the tagged content and/or advertisement 102 is displayed or which spawned the tagged content and/or advertisement 102 (e.g., in a pop-up window). The client device 202, 203 sends the scraped URL 322 to the impression monitor 132 (block 1020). Control then advances to block 1022, at which the client device 202, 203 determines whether to end the example process of FIG. 10. For example, if the client device 202, 203 is shut down or placed in a standby mode or if its client application 212 (FIGS. 2 and 3) is shut down, the client device 202, 203 ends the example process of FIG. 10. If the example process is not to be ended, control returns to block 1002 to receive another content and/or tagged ad. Otherwise, the example process of FIG. 10 ends.

In some examples, real-time redirection messages from the impression monitor 132 may be omitted from the example process of FIG. 10, in which cases the impression monitor 132 does not send redirect instructions to the client device 202, 203. Instead, the client device 202, 203 refers to its partner-priority-order cookie 220 to determine partners (e.g., the partners 206 and 208) to which it should send redirects and the ordering of such redirects. In some examples, the client device 202, 203 sends redirects substantially simultaneously to all partners listed in the partner-priority-order cookie 220 (e.g., in seriatim, but in rapid succession, without waiting for replies). In such some examples, block 1010 is omitted and at block 1012, the client device 202, 203 sends a next partner redirect based on the partner-priority-order cookie 220. In some such examples, blocks 1006 and 1008 may also be omitted, or blocks 1006 and 1008 may be kept to provide time for the impression monitor 132 to provide the URL scrape instruction 320 at block 1016.

Figure 11:
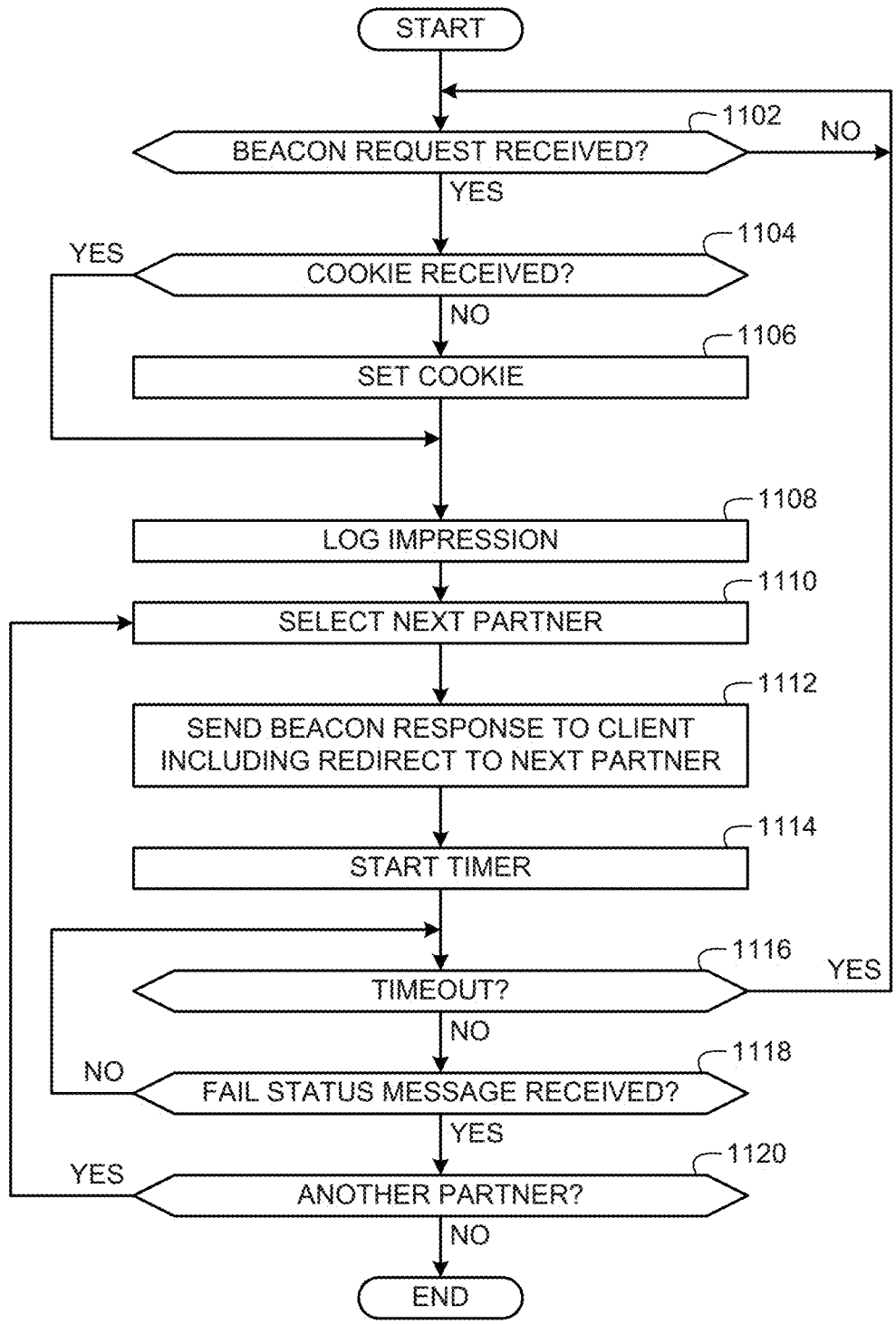
FIG. 11 is a flow diagram representative of example machine readable instructions that may be executed by a panelist monitoring system to log impressions and/or redirect beacon requests to web service providers to log impressions.

Turning to FIG. 11, the example flow diagram may be performed by the impression monitor 132 (FIGS. 2 and 3) to log impressions and/or redirect beacon requests to web service providers (e.g., database proprietors) to log impressions. Initially, the impression monitor 132 waits until it has received a beacon request (e.g., the beacon request 304 of FIG. 3) (block 1102). The impression monitor 132 of the illustrated example receives beacon requests via the HTTP server 232 of FIG. 2. When the impression monitor 132 receives a beacon request (block 1102), it determines whether a cookie (e.g., the panelist monitor cookie 218 of FIG. 2) was received from the client device 202, 203 (block 1104). For example, if a panelist monitor cookie 218 was previously set in the client device 202, 203, the beacon request sent by the client device 202, 203 to the panelist monitoring system will include the cookie.

If the impression monitor 132 determines at block 1104 that it did not receive the cookie in the beacon request (e.g., the cookie was not previously set in the client device 202, 203, the impression monitor 132 sets a cookie (e.g., the panelist monitor cookie 218) in the client device 202, 203 (block 1106). For example, the impression monitor 132 may use the HTTP server 232 to send back a response to the client device 202, 203 to 'set' a new cookie (e.g., the panelist monitor cookie 218).

After setting the cookie (block 1106) or if the impression monitor 132 did receive the cookie in the beacon request (block 1104), the impression monitor 132 logs an impression (block 1108). The impression monitor 132 of the illustrated example logs an impression in the impressions per unique users table 235 of FIG. 2. As discussed above, the impression monitor 132 logs the impression regardless of whether the beacon request corresponds to a user ID that matches a user ID of a panelist member (e.g., one of the panelists 114 and 116 of FIG. 1). However, if the user ID comparator 228 (FIG. 2) determines that the user ID (e.g., the panelist monitor cookie 218) matches a user ID of a panelist member (e.g., one of the panelists 114 and 116 of FIG. 1) set by and, thus, stored in the record of the ratings entity subsystem 106, the logged impression will correspond to a panelist of the impression monitor 132. For such examples in which the user ID matches a user ID of a panelist, the impression monitor 132 of the illustrated example logs a panelist identifier with the impression in the impressions per unique users table 235 and subsequently an audience measurement entity associates the known demographics of the corresponding panelist (e.g., a corresponding one of the panelists 114, 116) with the logged impression based on the panelist identifier. Such associations between panelist demographics (e.g., the age/gender column 602 of FIG. 6) and logged impression data are shown in the panelist ad campaign-level age/gender and impression composition table 600 of FIG. 6. If the user ID comparator 228 (FIG. 2) determines that the user ID does not correspond to a panelist 114, 116, the impression monitor 132 will still benefit from logging an impression (e.g., an ad impression or content impression) even though it will not have a user ID record (and, thus, corresponding demographics) for the impression reflected in the beacon request 304.

The impression monitor 132 selects a next partner (block 1110). For example, the impression monitor 132 may use the rules/ML engine 230 (FIG. 2) to select one of the partners 206 or 208 of FIGS. 2 and 3 at random or based on an ordered listing or ranking of the partners 206 and 208 for an initial redirect in accordance with the rules/ML engine 230 (FIG. 2) and to select the other one of the partners 206 or 208 for a subsequent redirect during a subsequent execution of block 1110.

The impression monitor 132 sends a beacon response (e.g., the beacon response 306) to the client device 202, 203 including an HTTP 302 redirect (or any other suitable instruction to cause a redirected communication) to forward a beacon request (e.g., the beacon request 308 of FIG. 3) to a next partner (e.g., the partner A 206 of FIG. 2) (block 1112) and starts a timer (block 1114). The impression monitor 132 of the illustrated example sends the beacon response 306 using the HTTP server 232. In the illustrated example, the impression monitor 132 sends an HTTP 302 redirect (or any other suitable instruction to cause a redirected communication) at least once to allow at least a partner site (e.g., one of the partners 206 or 208 of FIGS. 2 and 3) to also log an impression for the same advertisement (or content). However, in other example implementations, the impression monitor 132 may include rules (e.g., as part of the rules/ML engine 230 of FIG. 2) to exclude some beacon requests from being redirected. The timer set at block 1114 is used to wait for real-time feedback from the next partner in the form of a fail status message indicating that the next partner did not find a match for the client device 202, 203 in its records.

If the timeout has not expired (block 1116), the impression monitor 132 determines whether it has received a fail status message (block 1118). Control remains at blocks 1116 and 1118 until either (1) a timeout has expired, in which case control returns to block 1102 to receive another beacon request or (2) the impression monitor 132 receives a fail status message.

If the impression monitor 132 receives a fail status message (block 1118), the impression monitor 132 determines whether there is another partner to which a beacon request should be sent (block 1120) to provide another opportunity to log an impression. The impression monitor 132 may select a next partner based on a smart selection process using the rules/ML engine 230 of FIG. 2 or based on a fixed hierarchy of partners. If the impression monitor 132 determines that there is another partner to which a beacon request should be sent, control returns to block 1110. Otherwise, the example process of FIG. 11 ends.

In some examples, real-time feedback from partners may be omitted from the example process of FIG. 11 and the impression monitor 132 does not send redirect instructions to the client device 202, 203. Instead, the client device 202, 203 refers to its partner-priority-order cookie 220 to determine partners (e.g., the partners 206 and 208) to which it should send redirects and the ordering of such redirects. In some examples, the client device 202, 203 sends redirects simultaneously to all partners listed in the partner-priority-order cookie 220. In such some examples, blocks 1110, 1114, 1116, 1118, and 1120 are omitted and at block 1112, the impression monitor 132 sends the client device 202, 203 an acknowledgement response without sending a next partner redirect.

Figure 12:
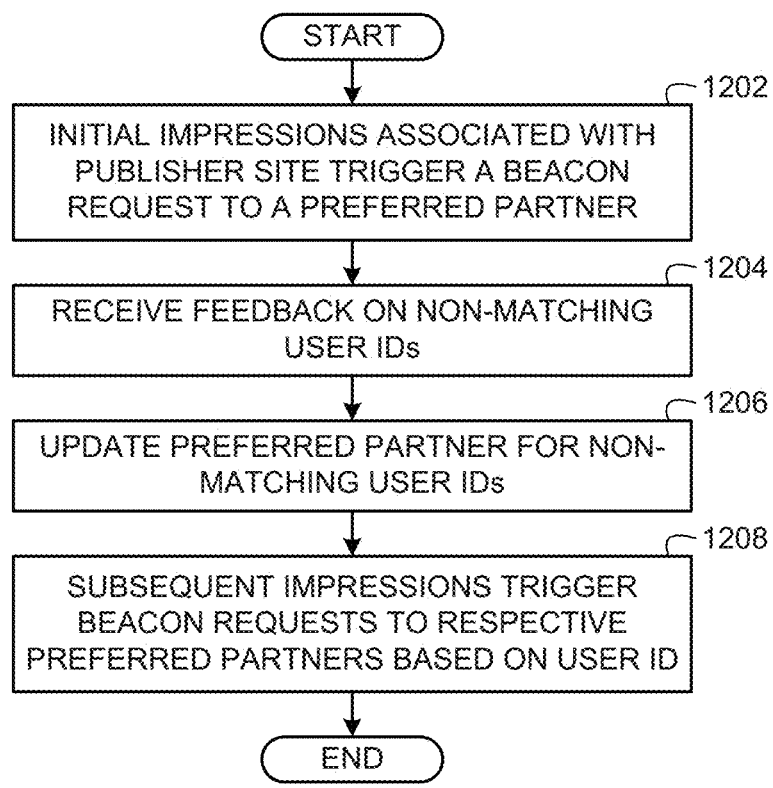
FIG. 12 is a flow diagram representative of example machine readable instructions that may be executed to dynamically designate preferred web service providers from which to request demographics attributable to impressions.

Turning now to FIG. 12, the example flow diagram may be executed to dynamically designate preferred web service providers (or preferred partners) from which to request logging of impressions using the example redirection beacon request processes of FIGS. 10 and 11. The example process of FIG. 12 is described in connection with the example system 200 of FIG. 2. Initial impressions associated with content and/or ads delivered by a particular publisher site (e.g., the publisher 302 of FIG. 3) trigger the beacon instructions 214 (FIG. 2) (and/or beacon instructions at other devices) to request logging of impressions at a preferred partner (block 1202). In this illustrated example, the preferred partner is initially the partner A site 206 (FIGS. 2 and 3). The impression monitor 132 (FIGS. 1, 2, and 3) receives feedback on non-matching user IDs from the preferred partner 206 (block 1204). The rules/ML engine 230 (FIG. 2) updates the preferred partner for the non-matching user IDs (block 1206) based on the feedback received at block 1204. In some examples, during the operation of block 1206, the impression monitor 132 also updates a partner-priority-order of preferred partners in the partner-priority-order cookie 220 of FIG. 2. Subsequent impressions trigger the beacon instructions 214 (and/or beacon instructions at other devices 202, 203) to send requests for logging of impressions to different respective preferred partners specifically based on each user ID (block 1208). That is, some user IDs in the panelist monitor cookie 218 and/or the partner cookie(s) 216 may be associated with one preferred partner, while others of the user IDs are now associated with a different preferred partner as a result of the operation at block 1206. The example process of FIG. 12 then ends.

Figure 13:
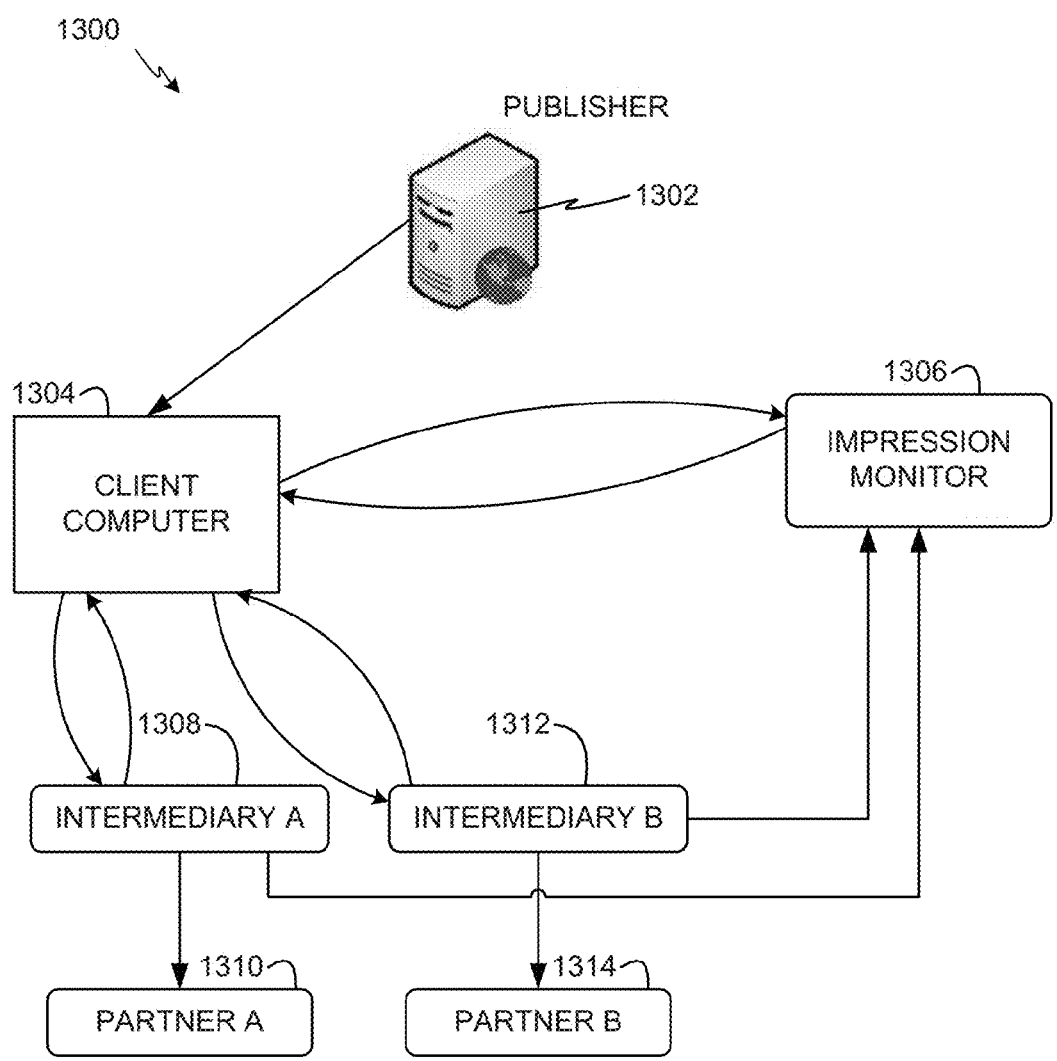
FIG. 13 depicts an example system that may be used to determine advertising exposure based on demographic information collected by one or more database proprietors.

FIG. 13 depicts an example system 1300 that may be used to determine media (e.g., content and/or advertising) exposure based on information collected by one or more database proprietors. The example system 1300 is another example of the systems 200 and 300 illustrated in FIGS. 2 and 3 in which an intermediary 1308, 1312 is provided between a client device 1304 and a partner 1310, 1314. Persons of ordinary skill in the art will understand that the description of FIGS. 2 and 3 and the corresponding flow diagrams of FIGS. 8-12 are applicable to the system 1300 with the inclusion of the intermediary 1308, 1312.

According to the illustrated example, a publisher 1302 transmits an advertisement or other media content to the client device 1304. The publisher 1302 may be the publisher 302 described in conjunction with FIG. 3. The client device 1304 may be the panelist client device 202 or the non-panelist device 203 described in conjunction with FIGS. 2 and 3 or any other client device. The advertisement or other media content includes a beacon that instructs the client device to send a request to an impression monitor 1306 as explained above.

The impression monitor 1306 may be the impression monitor 132 described in conjunction with FIGS. 1-3. The impression monitor 1306 of the illustrated example receives beacon requests from the client device 1304 and transmits redirection messages to the client device 1304 to instruct the client to send a request to one or more of the intermediary A 1308, the intermediary B 1312, or any other system such as another intermediary, a partner, etc. The impression monitor 1306 also receives information about partner cookies from one or more of the intermediary A 1308 and the intermediary B 1312.

In some examples, the impression monitor 1306 may insert into a redirection message an identifier of a client that is established by the impression monitor 1306 and identifies the client device 1304 and/or a user thereof. For example, the identifier of the client may be an identifier stored in a cookie that has been set at the client by the impression monitor 1306 or any other entity, an identifier assigned by the impression monitor 1306 or any other entity, etc. The identifier of the client may be a unique identifier, a semi-unique identifier, etc. In some examples, the identifier of the client may be encrypted, obfuscated, or varied to prevent tracking of the identifier by the intermediary 1308, 1312 or the partner 1310, 1314. According to the illustrated example, the identifier of the client is included in the redirection message to the client device 1304 to cause the client device 1304 to transmit the identifier of the client to the intermediary 1308, 1312 when the client device 1304 follows the redirection message. For example, the identifier of the client may be included in a URL included in the redirection message to cause the client device 1304 to transmit the identifier of the client to the intermediary 1308, 1312 as a parameter of the request that is sent in response to the redirection message.

The intermediaries 1308, 1312 of the illustrated example receive redirected beacon requests from the client device 1304 and transmit information about the requests to the partners 1310, 1314. The example intermediaries 1308, 1312 are made available on a content delivery network (e.g., one or more servers of a content delivery network) to ensure that clients can quickly send the requests without causing substantial interruption in the access of content from the publisher 1302.

In examples disclosed herein, a cookie set in a domain (e.g., "partnerA.com") is accessible by a server of a sub-domain (e.g., "intermediary.partnerA.com") corresponding to the domain (e.g., the root domain "partnerA.com") in which the cookie was set. In some examples, the reverse is also true such that a cookie set in a sub-domain (e.g., "intermediary.partnerA.com") is accessible by a server of a root domain (e.g., the root domain "partnerA.com") corresponding to the sub-domain (e.g., "intermediary.partnerA.com") in which the cookie was set. As used herein, the term domain (e.g., Internet domain, domain name, etc.) includes the root domain (e.g., "domain.com") and sub-domains (e.g., "a.domain.com," "b.domain.com," "c.d.domain.com," etc.).

To enable the example intermediaries 1308, 1312 to receive cookie information associated with the partners 1310, 1314 respectively, sub-domains of the partners 1310, 1314 are assigned to the intermediaries 1308, 1312. For example, the partner A 1310 may register an internet address associated with the intermediary A 1308 with the sub-domain in a domain name system associated with a domain for the partner A 1310. Alternatively, the sub-domain may be associated with the intermediary in any other manner. In such examples, cookies set for the domain name of partner A 1310 are transmitted from the client device 1304 to the intermediary A 1308 that has been assigned a sub-domain name associated with the domain of partner A 1310 when the client 1304 transmits a request to the intermediary A 1308.

The example intermediaries 1308, 1312 transmit the beacon request information including a campaign ID and received cookie information to the partners 1310, 1314 respectively. This information may be stored at the intermediaries 1308, 1312 so that it can be sent to the partners 1310, 1314 in a batch. For example, the received information could be transmitted near the end of the day, near the end of the week, after a threshold amount of information is received, etc. Alternatively, the information may be transmitted immediately upon receipt. The campaign ID may be encrypted, obfuscated, varied, etc. to prevent the partners 1310, 1314 from recognizing the content to which the campaign ID corresponds or to otherwise protect the identity of the content A lookup table of campaign ID information may be stored at the impression monitor 1306 so that impression information received from the partners 1310, 1314 can be correlated with the content.

The intermediaries 1308, 1312 of the illustrated example also transmit an indication of the availability of a partner cookie to the impression monitor 1306. For example, when a redirected beacon request is received at the intermediary A 1308, the intermediary A 1308 determines if the redirected beacon request includes a cookie for partner A 1310. The intermediary A 1308 sends the notification to the impression monitor 1306 when the cookie for partner A 1310 was received. Alternatively, intermediaries 1308, 1312 may transmit information about the availability of the partner cookie regardless of whether a cookie is received. Where the impression monitor 1306 has included an identifier of the client in the redirection message and the identifier of the client is received at the intermediaries 1308, 1312, the intermediaries 1308, 1312 may include the identifier of the client with the information about the partner cookie transmitted to the impression monitor 1306. The impression monitor 1306 may use the information about the existence of a partner cookie to determine how to redirect future beacon requests. For example, the impression monitor 1306 may elect not to redirect a client to an intermediary 1308, 1312 that is associated with a partner 1310, 1314 with which it has been determined that a client does not have a cookie. In some examples, the information about whether a particular client has a cookie associated with a partner may be refreshed periodically to account for cookies expiring and new cookies being set (e.g., a recent login or registration at one of the partners).

The intermediaries 1308, 1312 may be implemented by a server associated with a content metering entity (e.g., a content metering entity that provides the impression monitor 1306). Alternatively, intermediaries 1308, 1312 may be implemented by servers associated with the partners 1310, 1314 respectively. In other examples, the intermediaries may be provided by a third-party such as a content delivery network.

In some examples, the intermediaries 1308, 1312 are provided to prevent a direct connection between the partners 1310, 1314 and the client device 1304, to prevent some information from the redirected beacon request from being transmitted to the partners 1310, 1314 (e.g., to prevent a REFERRER_URL from being transmitted to the partners 1310, 1314), to reduce the amount of network traffic at the partners 1310, 1314 associated with redirected beacon requests, and/or to transmit to the impression monitor 1306 real-time or near real-time indications of whether a partner cookie is provided by the client device 1304.

In some examples, the intermediaries 1308, 1312 are trusted by the partners 1310, 1314 to prevent confidential data from being transmitted to the impression monitor 1306. For example, the intermediary 1308, 1312 may remove identifiers stored in partner cookies before transmitting information to the impression monitor 1306.

The partners 1310, 1314 receive beacon request information including the campaign ID and cookie information from the intermediaries 1308, 1312. The partners 1310, 1314 determine identity and demographics for a user of the client device 1304 based on the cookie information. The example partners 1310, 1314 track impressions for the campaign ID based on the determined demographics associated with the impression. Based on the tracked impressions, the example partners 1310, 1314 generate reports (previously described). The reports may be sent to the impression monitor 1306, the publisher 1302, an advertiser that supplied an ad provided by the publisher 1302, a media content hub, or other persons or entities interested in the reports.

Figure 14:
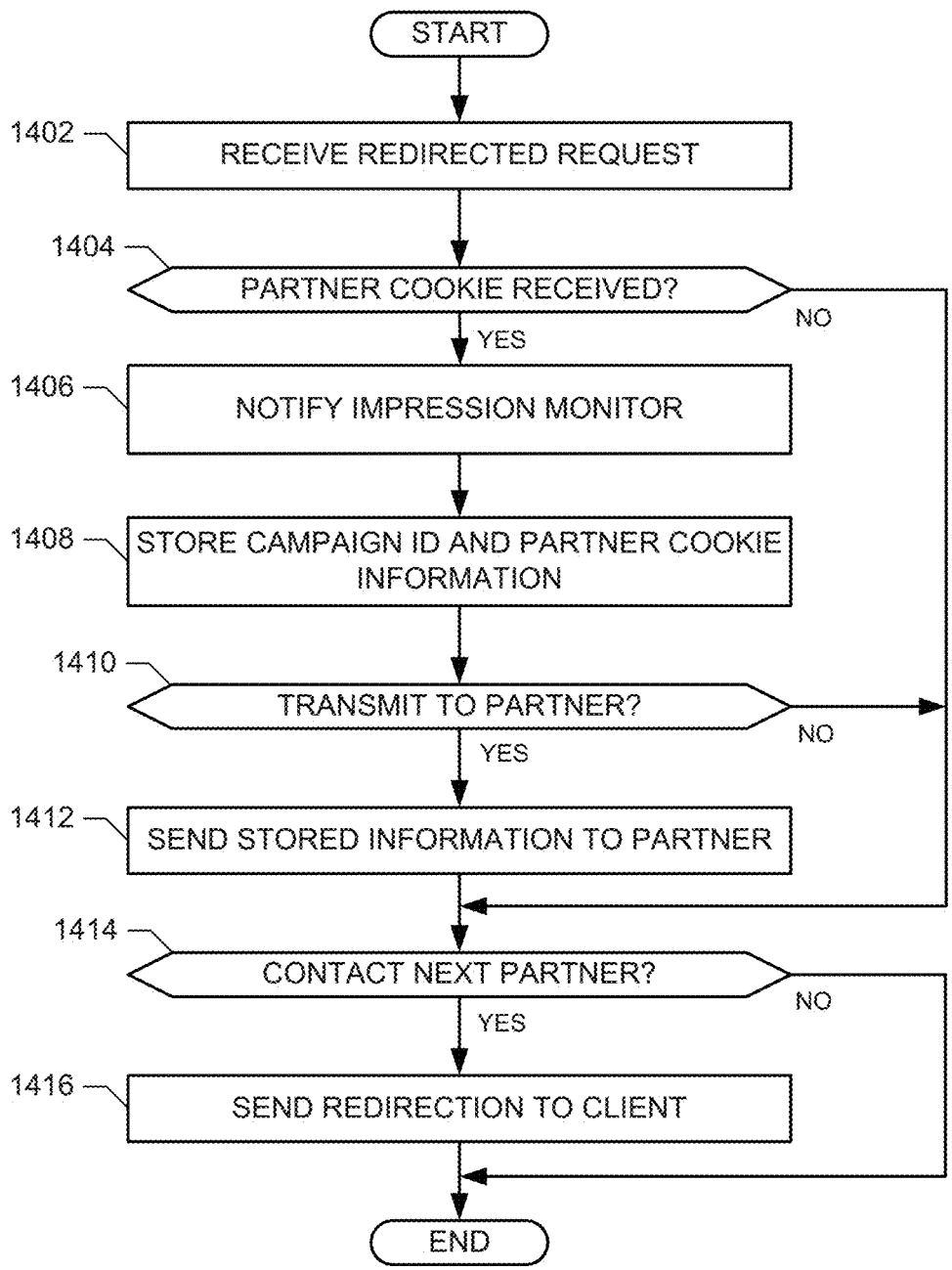
FIG. 14 is a flow diagram representative of example machine readable instructions that may be executed to process a redirected request at an intermediary.

FIG. 14 is a flow diagram representative of example machine readable instructions that may be executed to process a redirected request at an intermediary. The example process of FIG. 14 is described in connection with the example intermediary A 1308. Some or all of the blocks may additionally or alternatively be performed by one or more of the example intermediary B 1312, the partners 1310, 1314 of FIG. 13 or by other partners described in conjunction with FIGS. 1-3.

According to the illustrated example, intermediary A 1308 receives a redirected beacon request from the client device 1304 (block 1402). The intermediary A 1308 determines if the client device 1304 transmitted a cookie associated with partner A 1310 in the redirected beacon request (block 1404). For example, when the intermediary A 1308 is assigned a domain name that is a sub-domain of partner A 1310, the client device 1304 will transmit a cookie set by partner A 1310 to the intermediary A 1308.

When the redirected beacon request does not include a cookie associated with partner A 1310 (block 1404), control proceeds to block 1412 which is described below. When the redirected beacon request includes a cookie associated with partner A 1310 (block 1404), the intermediary A 1308 notifies the impression monitor 1306 of the existence of the cookie (block 1406). The notification may additionally include information associated with the redirected beacon request (e.g., a source URL, a campaign ID, etc.), an identifier of the client, etc. According to the illustrated example, the intermediary A 1308 stores a campaign ID included in the redirected beacon request and the partner cookie information (block 1408). The intermediary A 1308 may additionally store other information associated with the redirected beacon request such as, for example, a source URL, a referrer URL, etc.

The example intermediary A 1308 then determines if stored information should be transmitted to the partner A 1310 (block 1408). For example, the intermediary A 1308 may determine that information should be transmitted immediately, may determine that a threshold amount of information has been received, may determine that the information should be transmitted based on the time of day, etc. When the intermediary A 1308 determines that the information should not be transmitted (block 1408), control proceeds to block 1412. When the intermediary A 1308 determines that the information should be transmitted (block 1408), the intermediary A 1308 transmits stored information to the partner A 1310. The stored information may include information associated with a single request, information associated with multiple requests from a single client, information associated with multiple requests from multiple clients, etc.

According to the illustrated example, the intermediary A 1308 then determines if a next intermediary and/or partner should be contacted by the client device 1304 (block 1412). The example intermediary A 1308 determines that the next partner should be contacted when a cookie associated with partner a 1310 is not received. Alternatively, the intermediary A 1308 may determine that the next partner should be contacted whenever a redirected beacon request is received, associated with the partner cookie, etc.

When the intermediary A 1308 determines that the next partner (e.g., intermediary B 1314) should be contacted (block 1412), the intermediary A 1308 transmits a beacon redirection message to the client device 1304 indicating that the client device 1304 should send a request to the intermediary B 1312. After transmitting the redirection message (block 1414) or when the intermediary A 1308 determines that the next partner should not be contacted (block 1412), the example process of FIG. 14 ends.

While the example of FIG. 14 describes an approach where each intermediary 1308, 1312 selectively or automatically transmits a redirection message identifying the next intermediary 1308, 1312 in a chain, other approaches may be implemented. For example, the redirection message from the impression monitor 1306 may identify multiple intermediaries 1308, 1312. In such an example, the redirection message may instruct the client device 1304 to send a request to each of the intermediaries 1308, 1312 (or a subset) sequentially, may instruct the client device 1304 to send requests to each of the intermediaries 1308, 1312 in parallel (e.g., using JavaScript instructions that support requests executed in parallel), etc.

While the example of FIG. 14 is described in conjunction with intermediary A, some or all of the blocks of FIG. 14 may be performed by the intermediary B 1312, one or more of the partners 1310, 1314, any other partner described herein, or any other entity or system. Additionally or alternatively, multiple instances of FIG. 14 (or any other instructions described herein) may be performed in parallel at any number of locations.

Figure 15:
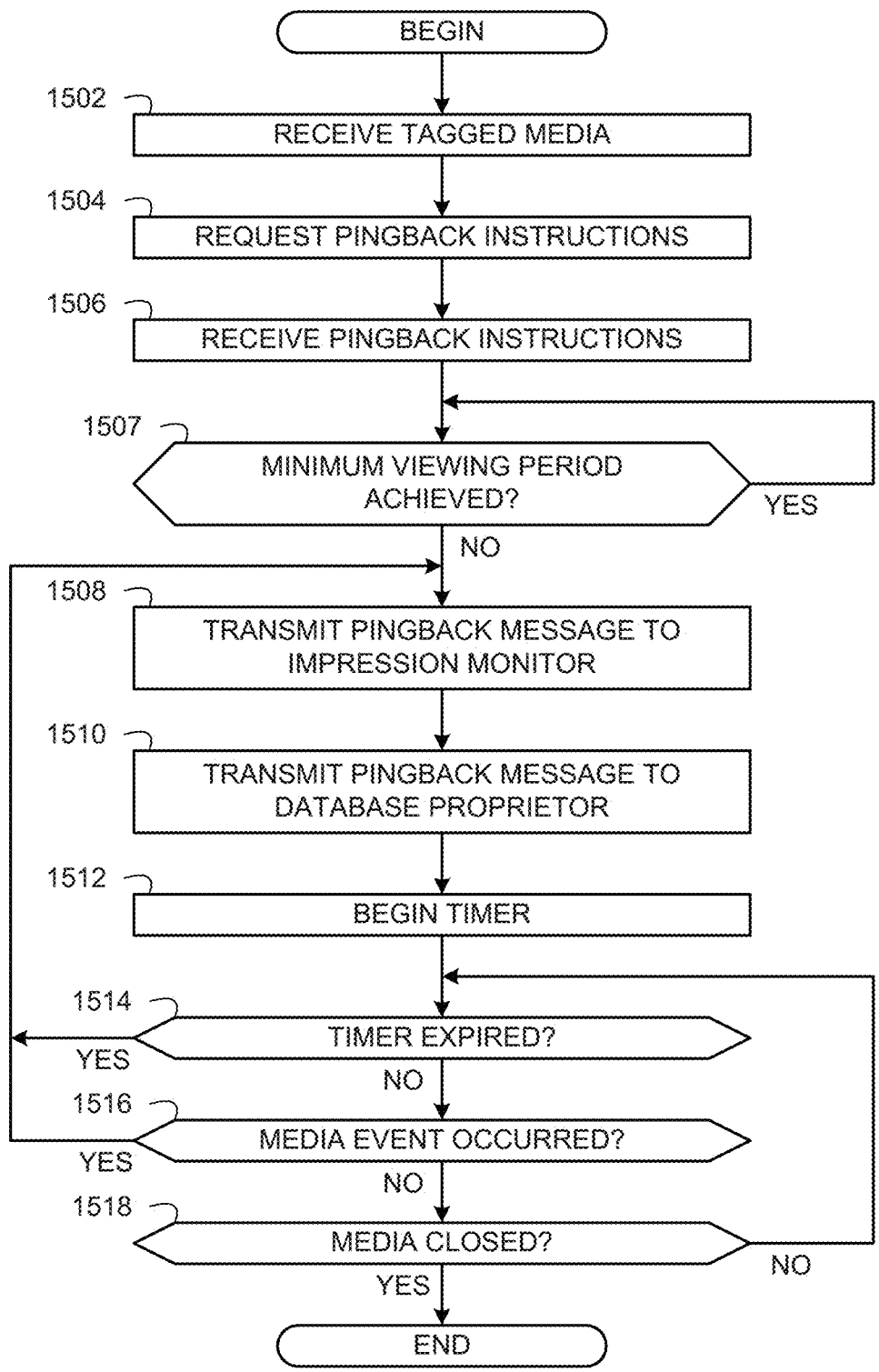
FIG. 15 is a flow diagram representative of example machine readable instructions that may be executed by a client device to transmit beacon requests to an impression monitor and a database proprietor.

Turning now to FIG. 15, the depicted example flow diagram may be performed by a client device 202, 203 (FIGS. 2 and 3) to transmit pingback messages (e.g., the pingback messages 304, 308 of FIG. 3) to an impression monitor and a database proprietor.

The example client device 202 of FIG. 3 receives tagged media (e.g., a web page including the tagged media 102) (block 1502). The example client application 212 requests repeated pingback instructions 214 (e.g., from the beacon server 215 of FIG. 3 based on the beacon instructions 213) (block 1504). The example client application 212 receives the repeated pingback instructions (e.g., the repeated pingback instructions 214 of FIG. 3) (block 1506).

The example client application 212 determines whether a threshold (e.g., minimum viewing period) has been achieved (block 1507). For example, the repeated pingback instructions 214 may require that a minimum period of viewing time (e.g., an impression qualification period) occurs prior to sending a first pingback. While the minimum viewing period has not been achieved, control continues to loop to block 1507. The minimum period of viewing time may be configurable based on, for example, characteristics of the tagged media (e.g., the length of the tagged media, the expected demographics of the viewers of the tagged media, etc.) and/or the preferences or requirements of the media publisher (e.g., the publisher does not consider the tagged media to be effectively provide an impression until a certain length of the media has been viewed).

When the minimum viewing period has been achieved (block 1507), the example client application 212 transmits a pingback message (e.g., the pingback message 306 of FIG. 3) to an impression monitor (e.g., the impression monitor 132 of FIG. 3) (block 1508). The example pingback message includes a cookie corresponding to the ratings entity (e.g., a user ID), an identifier of the media (e.g., a media ID), a timestamp, and/or an event (if applicable). The example client application 212 also transmits a pingback message (e.g., the pingback message 308 of FIG. 3) to a database proprietor (e.g., partner A 206, partner B 208 of FIG. 3) (block 1510). The example pingback message 308 includes a cookie corresponding to the database proprietor (e.g., a user ID), a media ID, and/or a timestamp.

The example client application 212 begins a timer (e.g., a countdown timer). The example timer provides an interval time for the client application 212 to transmit pingback messages. In some examples, the client application 212 has different timers for the pingback messages to the impression monitor 132 and to the database proprietor(s) 206, 208. In some examples, the impression server redirects the client application 212 to the database proprietor and, thus, only one timer is employed (i.e., the timer triggers a request to the impression server, which causes a redirect to the database proprietor). The example client application 212 determines whether the timer is expired (block 1514). If the timer is not expired (block 1514), the example client application 212 determines whether a media event has occurred (block 1516). Example media events include pausing the media, jumping to a location in the media, and/or skipping portions of media. If a media event has occurred (block 1516) and/or if the timer has expired (block 1514), control returns to block 1508 to transmit pingback messages(s).

If a media event has not occurred (block 1516) and the timer has not expired (block 1514), the example client application 212 determines whether the media is closed (block 1518). For example, the media may be closed when the user stops the media, navigates to different media, and/or closes the application (e.g., browser window and/or tab) in which the media was being presented. If the media is not closed (block 1518), control returns to block 1514. When the media is closed (block 1518), the example instructions of FIG. 15 end.

Figure 16:
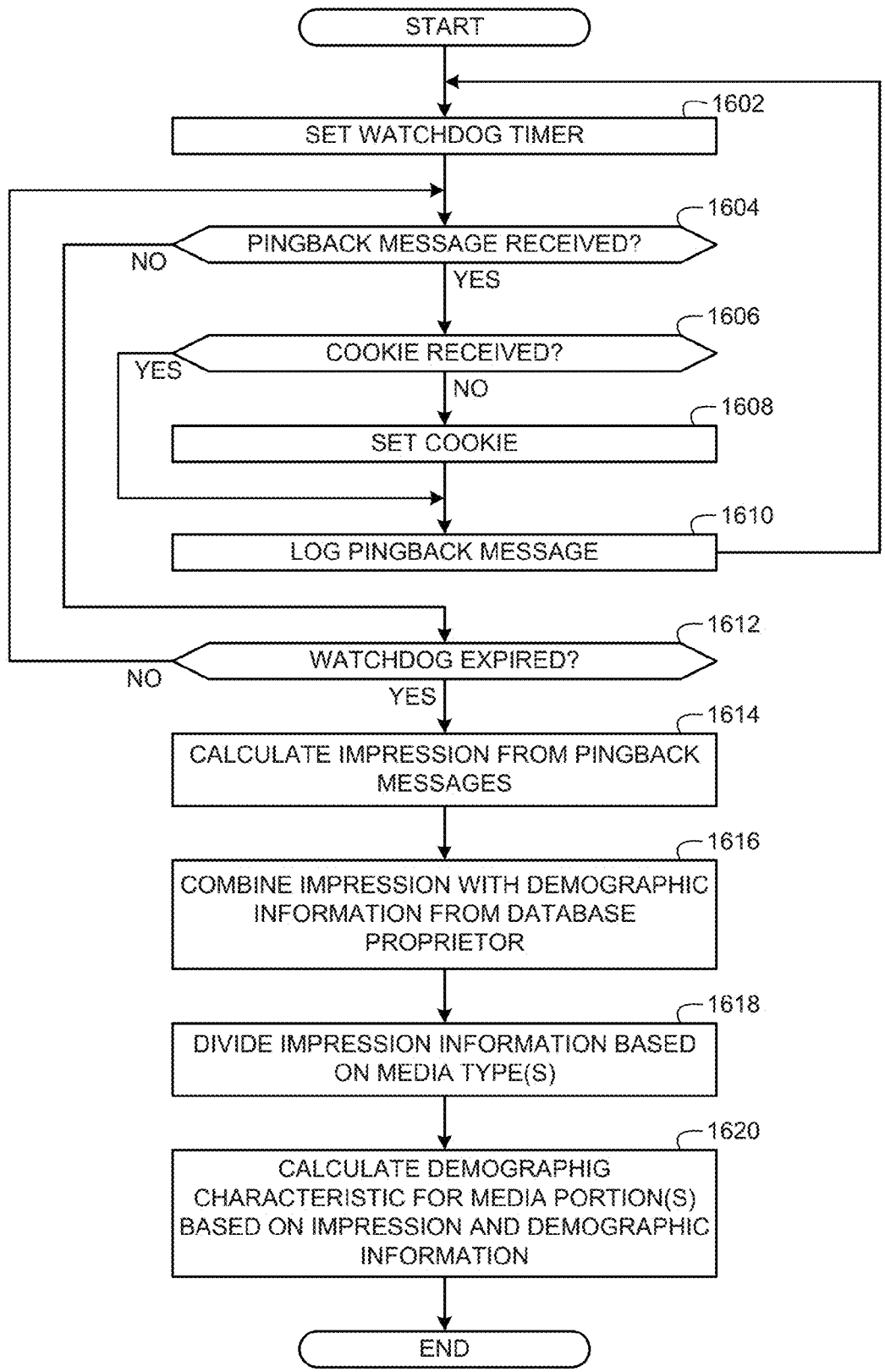
FIG. 16 is a flow diagram representative of example machine readable instructions that may be executed by a panelist monitoring system to log beacon requests and/or to calculate ratings information based on the beacon requests and demographic information.

Turning to FIG. 16, the example flow diagram may be performed by the impression monitor 132 (FIGS. 2 and 3) to log pingbacks (e.g., pingback messages) and/or to calculate ratings information based on the pingback messages and demographic information. The example client application 212 sets a watchdog timer (block 1602). The example watchdog timer determines when a sufficient time has passed without a pingback message such that the impression can be calculated from received pingback messages. The impression monitor 132 waits until it has received a pingback message (e.g., the pingback message 304 of FIG. 3) (block 1604). The impression monitor 132 of the illustrated example receives pingback messages via the HTTP server 232 of FIG. 2. When the impression monitor 132 receives a pingback message (block 1604), it determines whether a cookie (e.g., the panelist monitor cookie 218 of FIG. 2) was received from the client device 202, 203 (block 1606). For example, if a panelist monitor cookie 218 was previously set in the client device 202, 203, the pingback message sent by the client device 202, 203 to the panelist monitoring system will include the cookie.

If the impression monitor 132 determines at block 1606 that it did not receive the cookie in the pingback message (e.g., the cookie was not previously set in the client device 202, 203, the impression monitor 132 sets a cookie (e.g., the panelist monitor cookie 218) in the client device 202, 203 (block 1608). For example, the impression monitor 132 may use the HTTP server 232 to send back a response to the client device 202, 203 to 'set' a new cookie (e.g., the panelist monitor cookie 218).

After setting the cookie (block 1608) or if the impression monitor 132 did receive the cookie in the pingback message (block 1606), the impression monitor 132 logs the pingback message (block 1610). The impression monitor 132 of the illustrated example logs a pingback message in the media impressions table 235 of FIG. 2. As discussed above, the impression monitor 132 logs the pingback message regardless of whether the pingback message corresponds to a user ID that matches a user ID of a panelist member (e.g., one of the panelists 164 and 166 of FIG. 1). However, if the user ID comparator 228 (FIG. 2) determines that the user ID (e.g., the panelist monitor cookie 218) matches a user ID of a panelist member (e.g., one of the panelists 164 and 166 of FIG. 1) set by and, thus, stored in the record of the ratings entity subsystem 106, the logged pingback message will correspond to a panelist of the impression monitor 132. For such examples in which the user ID matches a user ID of a panelist, the impression monitor 132 of the illustrated example logs a panelist identifier with the pingback message in the media impressions table 235 and subsequently an audience measurement entity associates the known demographics of the corresponding panelist (e.g., a corresponding one of the panelists 164, 166) with the logged pingback message based on the panelist identifier. Such associations between panelist demographics (e.g., the age/gender column 602 of FIG. 6) and logged impression data are shown in the panelist ad campaign-level age/gender and impression composition table 600 of FIG. 6. If the user ID comparator 228 (FIG. 2) determines that the user ID does not correspond to a panelist 164, 166, the impression monitor 132 will still benefit from logging a pingback message (e.g., a media impression) even though it will not have a user ID record (and, thus, corresponding demographics) for the impression reflected in the pingback message 304. After logging the pingback message (block 1610), control returns to block 1602 to reset the watchdog timer.

When a pingback message is not received (block 1604), the example impression monitor 132 determines whether the watchdog timer is expired (block 1612). If the watchdog timer is not expired (block 1612), control returns to block 1604 to determine whether a pingback message is received.

When the watchdog timer is expired (block 1612), the example impression monitor 132 calculates an impression from the pingback messages (block 1614). For example, the impression monitor 132 of FIG. 3 determines the portions of the media that were presented to the user based on the information in the pingback messages, including any jumps or other events, and portions of contiguous viewing (e.g., determined from sequential pingback messages at designated intervals).

The example impression monitor 132 and/or a ratings entity combines the impression with demographic information from a database proprietor (e.g., the partner(s) A, B 206, 208 of FIG. 3) (block 1616).

The example impression monitor 132 and/or the ratings entity divides the impression information (e.g., duration impression information) based on type(s) of media presented in a duration impression (block 1618). For example, the impression monitor 132 may determine that a duration impression is associated with one or more advertisements as a first media type and is associated with program content as a second media type. By dividing the time periods associated with a duration impression based on the media type(s) present in the duration impression, the example impression monitor 132 and/or ratings entity can determine separate ratings information for separate media types Additionally and/or alternatively, the example impression monitor 132 and/or the example ratings entity can determine ratings information for media type(s) of interest (e.g., only the first media type, only the second media type, only for additional media types presented in the duration impression, and/or any combination of two or more media type(s)). For example, the example impression monitor 132 and/or ratings entity may ignore time spent viewing a first media type (e.g., advertisements) when calculating a volume of viewing of the second media type (e.g., content or program viewing) and/or may ignore time spent viewing the second media type when calculating a volume of viewing of the first media type.

The resulting divided and/or undivided duration impression information includes the portions that were presented at the client device and the demographics associated with the client device. The example impression monitor 132 and/or a ratings entity calculates the demographic characteristic for the media portion(s) (and/or media type(s) of the media portion(s)) based on the duration impression and the demographic information (block 1620). For example, the impression monitor 132 may determine a first demographic characteristic for a first media type in the media and determine a second demographic characteristic for a second media type in the media. In some examples, the impression monitor 132 and/or a ratings entity calculate granular minute-by-minute ratings information (e.g., unique audience and corresponding demographic groups) using the duration impression and the demographic information in combination with the duration impressions and demographic information for other devices on which the media was presented.

Figure 17:
FIG. 17 depicts an example impression log to log impressions for a user ID and a media ID.

FIG. 17 depicts an example impression log 1700 to log impressions for a user ID and a media ID. The example impression log 1700 of FIG. 17 logs a timestamp, a media ID, a user ID, and an event for received pingback messages. The example timestamp indicates a time at which the pingback message was generated. In the example impression log 1700 of FIG. 17, the entries are ordered sequentially by timestamp. The example entries are grouped based on the user ID and the media ID. The example entries further specify an event, if such information is provided in the corresponding pingback message. The example impression monitor 132 and/or the ratings entity determines that the entries in the example log correspond to one duration impression of the media. The example impression monitor 132 further determines that the duration impression does not apply to certain portions (e.g., certain minutes) of the media (e.g., one minute and 40 seconds into playback, playback was skipped to the 4 minute, 30 second mark of the media, implying that the period from 1 minute, 41 seconds to 4 minutes, 29 seconds was skipped). As a result, the duration impression and the demographics corresponding to the user ID are not included in the ratings of the skipped portion(s).

Figure 18:
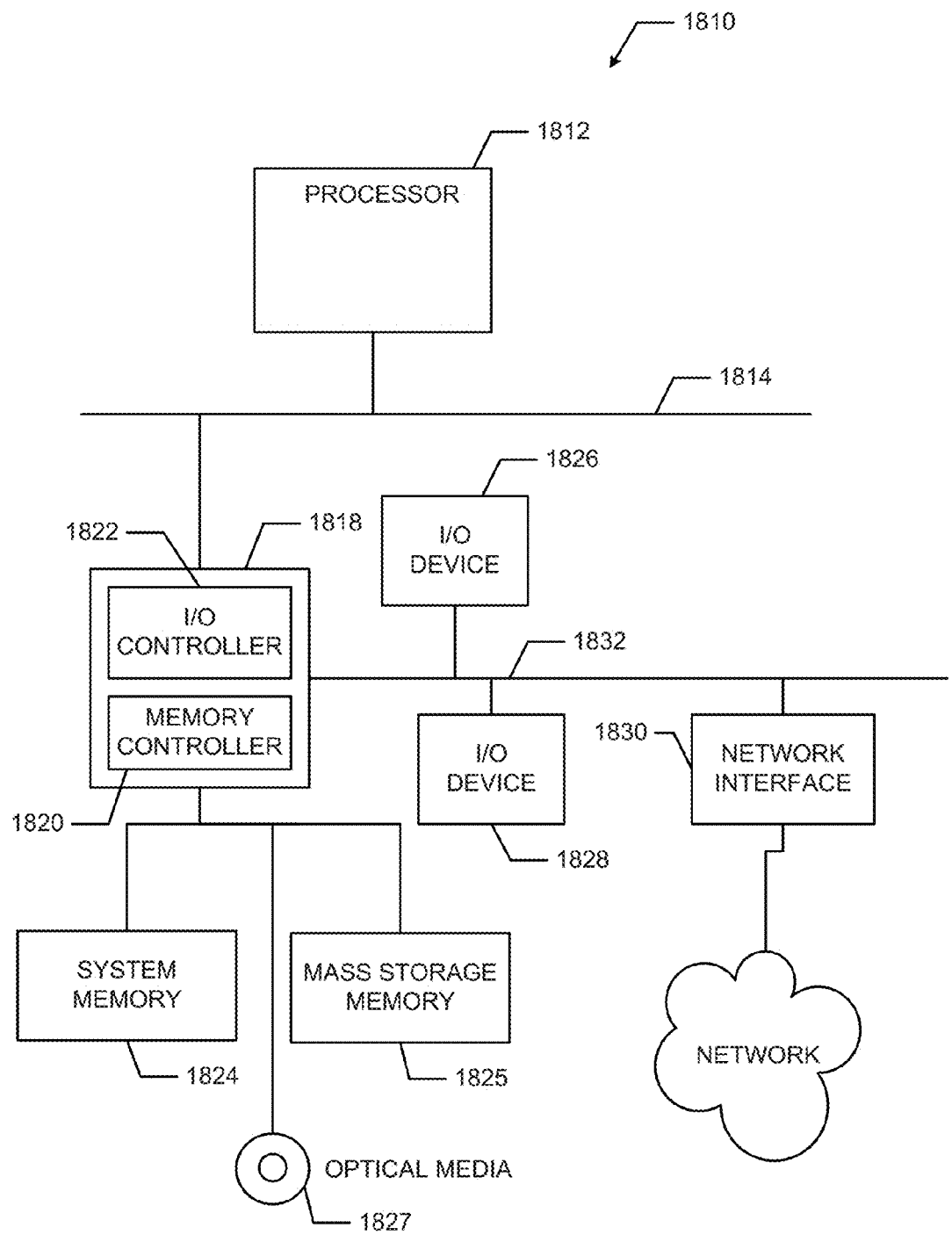
FIG. 18 is an example processor system that can be used to execute the example instructions of FIGS. 9, 10, 11, 12, 14, 15, and/or 16 to implement the example apparatus and systems described herein.

FIG. 18 is a block diagram of an example processor system 1810 that may be used to implement the example apparatus, methods, articles of manufacture, and/or systems disclosed herein. As shown in FIG. 18, the processor system 1810 includes a processor 1812 that is coupled to an interconnection bus 1814. The processor 1812 may be any suitable processor, processing unit, or microprocessor. Although not shown in FIG. 18, the system 1810 may be a multi-processor system and, thus, may include one or more additional processors that are identical or similar to the processor 1812 and that are communicatively coupled to the interconnection bus 1814.

The processor 1812 of FIG. 18 is coupled to a chipset 1818, which includes a memory controller 1820 and an input/output (I/O) controller 1822. A chipset provides I/O and memory management functions as well as a plurality of general purpose and/or special purpose registers, timers, etc. that are accessible or used by one or more processors coupled to the chipset 1818. The memory controller 1820 performs functions that enable the processor 1812 (or processors if there are multiple processors) to access a system memory 1824, a mass storage memory 1825, and/or an optical media 1827.

In general, the system memory 1824 may include any desired type of volatile and/or non-volatile memory such as, for example, static random access memory (SRAM), dynamic random access memory (DRAM), flash memory, read-only memory (ROM), etc. The mass storage memory 1825 may include any desired type of mass storage device including hard disk drives, optical drives, tape storage devices, etc. The optical media 1827 may include any desired type of optical media such as a digital versatile disc (DVD), a compact disc (CD), or a Blu-ray optical disc. The instructions of any of FIGS. 9-12 and 14-16 may be stored on any of the tangible media represented by the system memory 1824, the mass storage device 1825, and/or any other media.

The I/O controller 1822 performs functions that enable the processor 1812 to communicate with peripheral input/output (I/O) devices 1826 and 1828 and a network interface 1830 via an I/O bus 1832. The I/O devices 1826 and 1828 may be any desired type of I/O device such as, for example, a keyboard, a video display or monitor, a mouse, etc. The network interface 1830 may be, for example, an Ethernet device, an asynchronous transfer mode (ATM) device, an 802.11 device, a digital subscriber line (DSL) modem, a cable modem, a cellular modem, etc. that enables the processor system 1810 to communicate with another processor system.

While the memory controller 1820 and the I/O controller 1822 are depicted in FIG. 18 as separate functional blocks within the chipset 1818, the functions performed by these blocks may be integrated within a single semiconductor circuit or may be implemented using two or more separate integrated circuits.

Although the foregoing discloses the use of cookies for transmitting identification information from clients to servers, any other system for transmitting identification information from clients to servers or other devices may be used. For example, identification information or any other information provided by any of the cookies disclosed herein may be provided by an Adobe Flash® client identifier, identification information stored in an HTML5 datastore, etc. The methods and apparatus described herein are not limited to implementations that employ cookies.

U.S. Pat. No. 8,370,489 is hereby incorporated by reference in its entirety.

Although the above discloses example methods, apparatus, systems, and articles of manufacture including, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the following describes example methods, apparatus, systems, and articles of manufacture, the examples provided are not the only ways to implement such methods, apparatus, systems, and articles of manufacture.

Although certain example methods, apparatus, systems, and articles of manufacture have been disclosed herein, the scope of coverage of this patent is not limited thereto. To the contrary, this patent covers all methods, apparatus, systems, and articles of manufacture fairly falling within the scope of the claims either literally or under the doctrine of equivalents.

What is claimed is:

1. An audience measurement entity device, comprising:
   a communications interface to:
   transmit first instructions which, when executed by a client device, cause the client device to transmit messages in response to presentations of portions of media; and
   transmit a second message to the client device in response to a beacon request sent by the client device or in response to one of first messages sent by the client device based on the first instructions, ones of the first messages corresponding to different ones of the portions of the media presented at the client device, the second message to cause the client device to transmit a third message to a database proprietor, the third message to cause the database proprietor to transmit demographic information associated with the client device; and a processor to:
- determine, based on one of the first messages and the demographic information, a first demographic characteristic associated with a first one of the portions of the media presented at the client device;
- determine numbers of impressions for respective ones of the portions of the media based on the first messages and based on fourth messages from other client devices; and
- determine respective demographic characteristics corresponding to the impressions based on the first demographic characteristic, the first messages, and the fourth messages.

2. The device as defined in claim 1, wherein the communications interface is to receive the demographic information based on a cookie provided to the client device by the audience measurement entity device, the first messages including the cookie.

3. The device as defined in claim 1, further including a rules engine to select the database proprietor, the communications interface to transmit the second message as a redirect message to the client device.

4. The device as defined in claim 1, wherein the media includes content and an advertisement, the first one of the portions of the media including the advertisement, and the processor is to determine the first demographic characteristic associated with the first one of the portions of the media by determining the first demographic characteristic associated with only the advertisement.

5. The device as defined in claim 1, wherein at least a first one of the first messages includes a time referenced to a designated point in the media, the processor to identify a first one of the impressions for one of the portions of the media based on the time and based on at least a second one of the first messages.

6. The device as defined in claim 1, wherein the portions of the media correspond to discrete intervals of the media, and ones of the first messages correspond to respective ones of the discrete intervals.

7. The device as defined in claim 1, wherein the processor is to determine the respective demographic characteristics corresponding to the impressions by determining ones of the impressions that are attributable to a demographic group.

8. A method, comprising:
- transmitting, by a logic circuit of an audience measurement entity, first instructions which, when executed by a client device, cause the client device to transmit messages in response to presentations of portions of media;
- transmitting, by the logic circuit of the audience measurement entity, a second message to the client device in response to a beacon request sent by the client device or in response to one of first messages sent by the client device based on the first instructions, ones of the first messages corresponding to different ones of the portions of the media presented at the client device, the second message to cause the client device to transmit a third message to a database proprietor, the third message to cause the database proprietor to transmit demographic information associated with the client device;
- determining, by executing second instructions with the logic circuit of the audience measurement entity, a first demographic characteristic associated with a first one of the portions of the media presented at the client device based on one of the first messages and the demographic information;
- determining, by executing third instructions with the logic circuit of the audience measurement entity, numbers of impressions for respective ones of the portions of the media based on the first messages and based on fourth messages from other client devices; and
- determining, by executing fourth instructions with the logic circuit of the audience measurement entity, respective demographic characteristics corresponding to the impressions based on the first demographic characteristic, the first messages, and the fourth messages.

9. The method as defined in claim 8, further including obtaining the demographic information based on a cookie provided to the client device by the audience measurement entity, the first messages including the cookie.

10. The method as defined in claim 8, wherein the transmitting of the second message includes transmitting the second message as a redirect message to the client device.

11. The method as defined in claim 8, wherein the media includes content and an advertisement, the first one of the portions of the media including the advertisement, and the determining of the first demographic characteristic associated with the first one of the portions of the media includes determining the first demographic characteristic associated with only the advertisement.

12. The method as defined in claim 8, wherein at least a first one of the first messages includes a time referenced to a designated point in the media, the method further including determining a first one of the impressions for one of the portions of the media based on the time and based on at least a second one of the first messages.

13. The method as defined in claim 8, wherein the portions of the media correspond to discrete intervals of the media, and ones of the first messages correspond to respective ones of the discrete intervals.

14. The method as defined in claim 8, wherein the determining of the respective demographic characteristics corresponding to the impressions includes determining ones of the impressions that are attributable to a demographic group.

15. A tangible computer readable storage medium comprising first computer readable instructions which, when executed, cause a logic circuit of an audience measurement entity to at least:
- transmit second instructions which, when executed by a client device, cause the client device to transmit messages in response to presentations of portions of media;
- transmit a second message to the client device in response to a beacon request sent by the client device or in response to one of first messages sent by the client device based on the second instructions, ones of the first messages corresponding to different ones of the portions of the media presented at the client device, the second message to cause the client device to transmit a third message to a database proprietor, the third message to cause the database proprietor to transmit demographic information associated with the client device;
- determine a first demographic characteristic associated with a first one of the portions of the media presented at the client device based on one of the first messages and the demographic information;
- determine numbers of impressions for respective ones of the portions of the media based on the first messages and based on fourth messages from other client devices; and determine respective demographic characteristics corresponding to the impressions based on the first demographic characteristic, the first messages, and the fourth messages.

16. The storage medium as defined in claim 15, wherein the first computer readable instructions, when executed, further cause the logic circuit of the audience measurement entity to access the demographic information based on a cookie provided to the client device by the audience measurement entity, the first messages including the cookie.

17. The storage medium as defined in claim 15, wherein the media includes content and an advertisement, the first one of the portions of the media including the advertisement, and the first instructions are to cause the logic circuit to determine the first demographic characteristic associated with the first one of the portions of the media by determining the first demographic characteristic associated with only the advertisement.

18. The storage medium as defined in claim 15, wherein at least a first one of the first messages includes a time referenced to a designated point in the media, the first instructions to further cause the logic circuit to determine a first one of the impressions for one of the portions of the media based on the time and based on at least a second one of the first messages.

19. The storage medium as defined in claim 15, wherein the portions of the media correspond to discrete intervals of the media, and ones of the first messages correspond to respective ones of the discrete intervals.

20. The storage medium as defined in claim 15, wherein the first instructions are further to cause the logic circuit to determine the respective demographic characteristics corresponding to the impressions by determining ones of the impressions that are attributable to a demographic group.

* * * * *